United States Patent
Altonen et al.

(10) Patent No.: US 8,901,769 B2
(45) Date of Patent: Dec. 2, 2014

(54) LOAD CONTROL SYSTEM HAVING AN ENERGY SAVINGS MODE

(75) Inventors: Gregory Altonen, Easton, PA (US); William Bryce Fricke, Emmaus, PA (US); Elliot G. Jacoby, Glenside, PA (US); Michael W. Pessina, Allentown, PA (US); Walter S. Zaharchuk, Macungie, PA (US); Joel S. Spira, Coopersburg, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 1060 days.

(21) Appl. No.: 12/845,016

(22) Filed: Jul. 28, 2010

(65) Prior Publication Data

US 2011/0031806 A1 Feb. 10, 2011

Related U.S. Application Data

(60) Provisional application No. 61/230,001, filed on Jul. 30, 2009, provisional application No. 61/239,988, filed on Sep. 4, 2009.

(51) Int. Cl.

| | |
|---|---|
| H02J 1/00 | (2006.01) |
| H02J 3/14 | (2006.01) |
| H05B 37/02 | (2006.01) |
| E06B 9/68 | (2006.01) |
| H04L 12/14 | (2006.01) |

(52) U.S. Cl.
CPC .............. *H05B 37/0227* (2013.01); *Y02B 20/40* (2013.01); *E06B 9/68* (2013.01); *H04L 12/14* (2013.01)
USPC .......................................................... 307/31

(58) Field of Classification Search
USPC ...................................................... 307/31, 32
See application file for complete search history.

(56) References Cited

U.S. PATENT DOCUMENTS

| | | |
|---|---|---|
| 3,962,600 A | 6/1976 | Pittman |
| 4,075,699 A | 2/1978 | Schneider et al. |

(Continued)

FOREIGN PATENT DOCUMENTS

| | | |
|---|---|---|
| CN | 101377275 A | 3/2009 |
| WO | 02/21231 | 3/2002 |

(Continued)

OTHER PUBLICATIONS

Lee, E.S. et al, Integrated Performance of an Automated Venetian Blind/Electric Lighting System in a Full-Scale Private Office, Proceedings of the ASHRAE/DOE/BTECC Conference, LBNL-41443, Sep. 1998, 26 pages, Lawrence Berkeley National Laboratory, Berkeley, California.

(Continued)

*Primary Examiner* — Carlos Amaya
(74) *Attorney, Agent, or Firm* — Ostrolenk Faber LLP

(57) ABSTRACT

A load control system for a building having a lighting load, a window, and a heating and cooling system comprises a lighting control device for controlling the amount of power delivered to the lighting load, a daylight control device, such as a motorized window treatment, for adjusting the amount of natural light to be admitted through a window, and a temperature control device for controlling a setpoint temperature of the heating and cooling system to thus control a present temperature in the building. The load control system may also comprise a controllable electrical receptacle for turning on and off a plug-in electrical load connected thereto. The lighting control device, the daylight control device, the temperature control device, and the controllable receptacle are controlled so as to decrease a total power consumption of the load control system in response to a received demand response command.

57 Claims, 30 Drawing Sheets

(56) References Cited

U.S. PATENT DOCUMENTS

| | | |
|---|---|---|
| 4,236,101 A | 11/1980 | Luchaco |
| 4,336,902 A | 6/1982 | Neal |
| 4,341,345 A | 7/1982 | Hammer et al. |
| 4,345,162 A | 8/1982 | Hammer et al. |
| 4,347,575 A | 8/1982 | Gurr et al. |
| 4,538,218 A | 8/1985 | Watson |
| 4,742,956 A | 5/1988 | Zelczer |
| 4,847,781 A | 7/1989 | Brown, III et al. |
| 5,168,170 A | 12/1992 | Hartig |
| 5,237,169 A | 8/1993 | Grehant |
| 5,357,170 A | 10/1994 | Luchaco et al. |
| 5,413,161 A | 5/1995 | Corazzini |
| 5,436,510 A | 7/1995 | Gilbert |
| 5,532,560 A | 7/1996 | Element et al. |
| 5,566,084 A | 10/1996 | Cmar |
| 5,648,656 A | 7/1997 | Begemann et al. |
| 5,663,621 A | 9/1997 | Popat |
| 5,734,230 A | 3/1998 | Edwards et al. |
| 5,839,654 A | 11/1998 | Weber |
| 5,848,054 A | 12/1998 | Mosebrook et al. |
| 5,905,442 A | 5/1999 | Mosebrook et al. |
| 5,982,103 A | 11/1999 | Mosebrook et al. |
| 6,029,092 A | 2/2000 | Stein |
| 6,064,949 A | 5/2000 | Werner et al. |
| 6,066,843 A | 5/2000 | Scheremeta |
| 6,084,231 A | 7/2000 | Popat |
| 6,225,760 B1 | 5/2001 | Moan |
| 6,260,765 B1 | 7/2001 | Natale et al. |
| 6,349,883 B1 | 2/2002 | Simmons et al. |
| 6,480,803 B1 | 11/2002 | Pierret et al. |
| 6,528,957 B1 | 3/2003 | Luchaco |
| 6,583,573 B2 | 6/2003 | Bierman |
| 6,700,224 B2 | 3/2004 | Biskup, Sr. et al. |
| 6,803,728 B2 | 10/2004 | Balasubramaniam et al. |
| 6,816,811 B2 | 11/2004 | Seem |
| 6,842,668 B2 | 1/2005 | Carson et al. |
| 6,862,498 B2 | 3/2005 | Davis et al. |
| 6,891,478 B2 | 5/2005 | Gardner |
| 6,961,642 B2 | 11/2005 | Horst |
| 6,980,080 B2 | 12/2005 | Christensen et al. |
| 6,983,783 B2 | 1/2006 | Carmen, Jr. et al. |
| 6,993,417 B2 | 1/2006 | Osann, Jr. |
| 7,010,363 B2 | 3/2006 | Donnelly et al. |
| 7,019,276 B2 | 3/2006 | Cloutier et al. |
| 7,024,336 B2 | 4/2006 | Salsbury et al. |
| 7,031,880 B1 | 4/2006 | Seem et al. |
| 7,035,719 B2 | 4/2006 | Howard et al. |
| 7,085,627 B2 | 8/2006 | Bamberger et al. |
| 7,089,066 B2 | 8/2006 | Hesse et al. |
| 7,111,952 B2 | 9/2006 | Veskovic |
| 7,155,296 B2 | 12/2006 | Klasson et al. |
| 7,193,201 B2 | 3/2007 | Motte |
| 7,211,968 B2 | 5/2007 | Adamson et al. |
| 7,243,044 B2 | 7/2007 | McCalla |
| 7,289,936 B2 | 10/2007 | Singhal et al. |
| 7,369,060 B2 | 5/2008 | Veskovic et al. |
| 7,379,997 B2 | 5/2008 | Ehlers et al. |
| 7,389,806 B2 | 6/2008 | Kates |
| 7,417,397 B2 | 8/2008 | Berman et al. |
| 7,451,606 B2 | 11/2008 | Harrod |
| 7,496,472 B2 | 2/2009 | Seem |
| 7,542,876 B2 | 6/2009 | Singhal et al. |
| 7,566,137 B2 | 7/2009 | Veskovic |
| 7,619,539 B2 | 11/2009 | Veskovic et al. |
| 7,747,357 B2 | 6/2010 | Murdoch |
| 7,865,252 B2 | 1/2011 | Clayton |
| 2003/0040813 A1 | 2/2003 | Gonzales et al. |
| 2004/0002792 A1 | 1/2004 | Hoffknecht |
| 2005/0110416 A1 | 5/2005 | Veskovic |
| 2006/0185799 A1 | 8/2006 | Kates |
| 2006/0207730 A1 | 9/2006 | Berman |
| 2007/0045431 A1 | 3/2007 | Chapman, Jr. et al. |
| 2007/0061050 A1 | 3/2007 | Hoffknecht |
| 2007/0271006 A1 | 11/2007 | Golden et al. |
| 2007/0273307 A1 | 11/2007 | Westrick et al. |
| 2008/0083834 A1 | 4/2008 | Krebs et al. |
| 2008/0088180 A1 | 4/2008 | Cash et al. |
| 2008/0092075 A1 | 4/2008 | Jacob et al. |
| 2008/0183307 A1 | 7/2008 | Clayton et al. |
| 2008/0183316 A1* | 7/2008 | Clayton .......................... 700/90 |
| 2008/0229226 A1 | 9/2008 | Rowbottom et al. |
| 2008/0236763 A1 | 10/2008 | Kates |
| 2008/0283621 A1 | 11/2008 | Quirino et al. |
| 2009/0065598 A1 | 3/2009 | Quirino et al. |
| 2009/0184840 A1 | 7/2009 | Veskovic et al. |
| 2009/0240381 A1 | 9/2009 | Lane |
| 2009/0256483 A1 | 10/2009 | Gehman et al. |
| 2009/0271042 A1 | 10/2009 | Voysey |
| 2009/0308543 A1* | 12/2009 | Kates ............................... 160/5 |
| 2009/0315400 A1 | 12/2009 | Howe et al. |
| 2010/0071856 A1 | 3/2010 | Zaharchuk et al. |
| 2010/0127626 A1 | 5/2010 | Altonen et al. |
| 2011/0029136 A1 | 2/2011 | Altonen et al. |
| 2011/0029139 A1 | 2/2011 | Altonen et al. |
| 2011/0035061 A1 | 2/2011 | Altonen et al. |

FOREIGN PATENT DOCUMENTS

| | | |
|---|---|---|
| WO | WO 02/21231 A1 | 3/2002 |
| WO | 03/043385 | 5/2003 |
| WO | 2008/092082 | 7/2008 |
| WO | 2008092082 A2 | 7/2008 |
| WO | WO-2008/092082 A2 | 7/2008 |
| WO | WO 2008/092082 A2 | 7/2008 |

OTHER PUBLICATIONS

Lee, E.S. et al, Low-Cost Networking for Dynamic Window Systems, Energy and Buildings 36, LBNL-52198, 2004, 13 pages, Lawrence Berkeley National Laboratory, Berkeley, California.

European Patent Office, International Search Report and Written Opinion for International Patent Application No. PCT/US2010/043704, Jan. 19, 2011, 12 pages.

English translation of European Office Action dated Jun. 27, 2013 in corresponding European Patent Application No. 10752460.5-1802.

Lawrence Berkeley National Laboratory, "An Inexpensive Wireless Lighting Control System to Improve Energy Efficiency", Environmental Energy Technologies Division (EETD) News, vol. 7, No. 2, Winter-Spring 2007, pp. 9-10, 16.

Lagotek Corporation, Home Intelligence Platform User Manual, May 10, 2009, pp. 1-8, 61-75.

U.S. Appl. No. 12/845,041, filed Jul. 28, 2010, Gregory Altonen.
U.S. Appl. No. 12/845,056, filed Jul. 28, 2010, Gregory Altonen.
U.S. Appl. No. 12/845,070, filed Jul. 28, 2010, Gregory Altonen.
Crestron Electronics, Inc., The Crestron Difference Brochure, Mar. 2009, 2 pages.

Leviton Manufacturing Co., Inc., Centura Fluorescent Dimming & Energy Management System Installation Manual, 2001, 46 pages.

U.S. Appl. No. 13/195,914, filed Aug. 2, 2011, Pessina.
U.S. Appl. No. 13/234,440, filed Sep. 16, 2011, Altonen et al.
U.S. Appl. No. 13/234,758, filed Sep. 16, 2011, Altonen et al.
U.S. Appl. No. 13/234,573, filed Sep. 16, 2011, Abraham et al.

International Search Report and Written Opinion dated Feb. 13, 2014 in related International Application No. PCT/US2012/048963.

Chinese Office Action and Search Report issued in Chinese Patent Application No. 2010800441409 dated Dec. 9, 2013 and English translation of the Search Report and text of the Office Action.

* cited by examiner

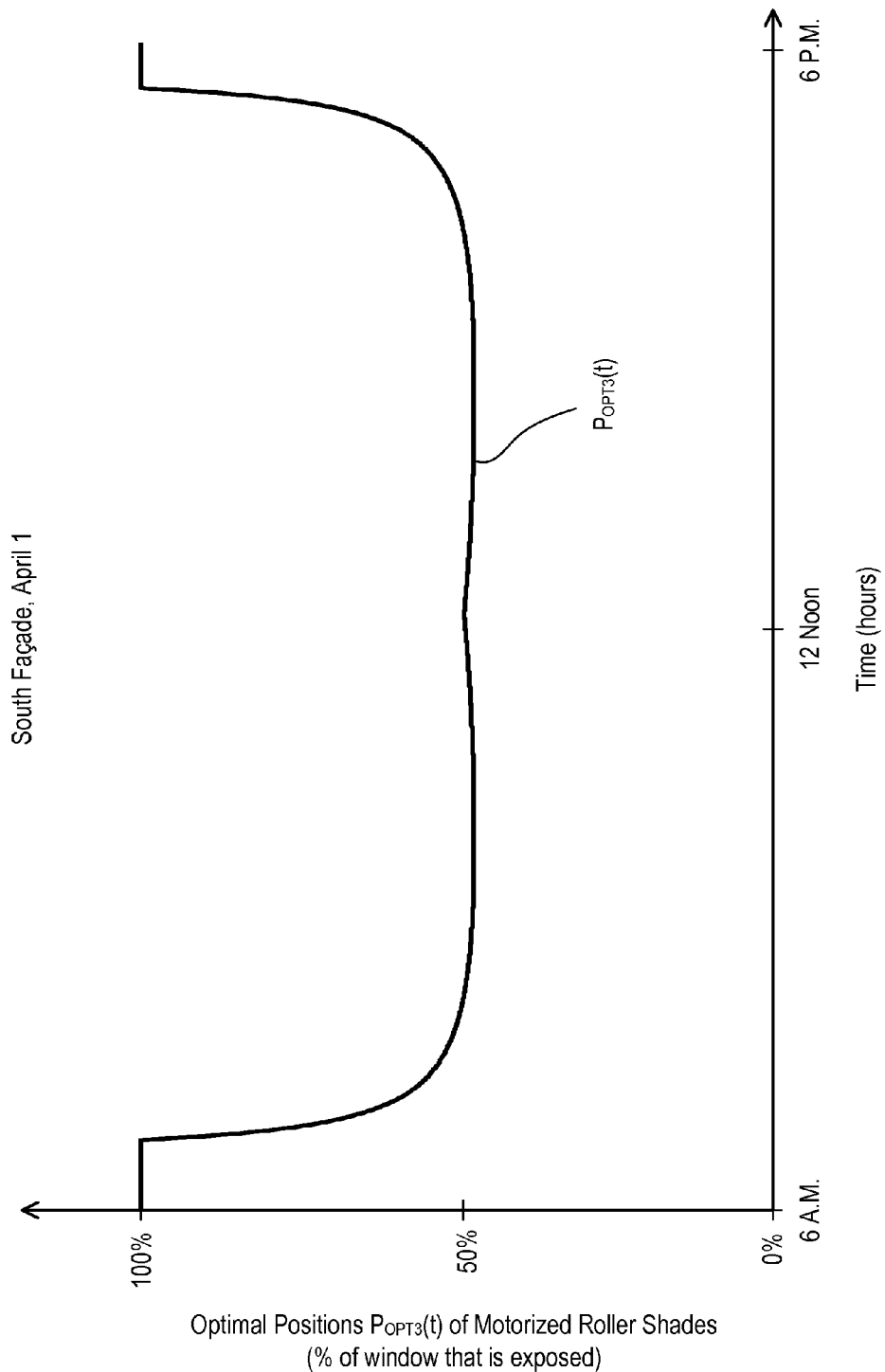

LOAD CONTROL SYSTEM HAVING AN ENERGY SAVINGS MODE

CROSS REFERENCE TO RELATED APPLICATIONS

The present application is a non-provisional application of commonly-assigned, U.S. Provisional Patent Application No. 61/230,001, filed Jul. 30, 2009, and U.S. Provisional Application No. 61/239,988, filed Sep. 4, 2009, both entitled LOAD CONTROL SYSTEM HAVING AN ENERGY SAVINGS MODE, the entire disclosures of which are hereby incorporated by reference.

BACKGROUND OF THE INVENTION

1. Field of the Invention

The present invention relates to a load control system for a plurality of electrical loads in a building, and more particularly, to a load control system for controlling the lighting intensities of lighting loads, the positions of motorized window treatments, and the temperature of the building in order to reduce the total power consumption of the load control system.

2. Description of the Related Art

Reducing the total cost of electrical energy is an important goal for many electricity consumers. The customers of an electrical utility company are typically charged for the total amount of energy consumed during a billing period. However, since the electrical utility company must spend money to ensure that its equipment (e.g., an electrical substation) is able to provide energy in all situations, including peak demand periods, many electrical utility companies charge their electricity consumers at rates that are based on the peak power consumption during the billing period, rather than the average power consumption during the billing period. Thus, if an electricity consumer consumes power at a very high rate for only a short period of time, the electricity consumer will face a significant increase in its total power costs.

Therefore, many electricity consumers use a "load shedding" technique to closely monitor and adjust (i.e., reduce) the amount of power presently being consumed by the electrical system. Additionally, the electricity consumers "shed loads", i.e., turn off some electrical loads, if the total power consumption nears a peak power billing threshold established by the electrical utility. Prior art electrical systems of electricity consumers have included power meters that measure the instantaneous total power being consumed by the system. Accordingly, a building manager of such an electrical system is able to visually monitor the total power being consumed. If the total power consumption nears a billing threshold, the building manager is able to turn off electrical loads to reduce the total power consumption of the electrical system.

Many electrical utility companies offer a "demand response" program to help reduce energy costs for their customers. With a demand response program, the electricity consumers agree to shed loads during peak demand periods in exchange for incentives, such as reduced billing rates or other means of compensation. For example, the electricity utility company may request that a participant in the demand response program shed loads during the afternoon hours of the summer months when demand for power is great. Examples of lighting control systems that are responsive to demand response commands are described in greater detail in commonly-assigned U.S. patent application Ser. No. 11/870,889, filed Oct. 11, 2007, entitled METHOD OF LOAD SHEDDING TO REDUCE THE TOTAL POWER CONSUMPTION OF A LOAD CONTROL SYSTEM, and U.S. Pat. No. 7,747,357, issued Jun. 29, 2010, entitled METHOD OF COMMUNICATING A COMMAND FOR LOAD SHEDDING OF A LOAD CONTROL SYSTEM, the entire disclosures of which are hereby incorporated by reference.

Some prior art lighting control systems have offered a load shedding capability in which the intensities of all lighting loads are reduced by a fixed percentage, e.g., by 25%, in response to an input provided to the system. The input may comprise an actuation of a button on a system keypad by a building manager. Such a lighting control system is described in commonly-assigned U.S. Pat. No. 6,225,760, issued May 1, 2001, entitled FLUORESCENT LAMP DIMMER SYSTEM, the entire disclosure of which is hereby incorporated by reference.

Some prior art load control systems have provided for control of both electrical lighting loads (to control the amount of artificial light in a space) and motorized window treatments (to control the amount of daylight entering the space). Such load control systems have operated to achieve a desired lighting intensity on task surfaces in the space, to maximize the contribution of the daylight provided to the total light illumination in the space (i.e., to provide energy savings), and/or to minimize sun glare in the space. An example of a load control system for control of both electrical lighting loads and motorized window treatments is described in greater detail in commonly-assigned U.S. Pat. No. 7,111,952, issued Sep. 26, 2006, entitled SYSTEM TO CONTROL DAYLIGHT AND ARTIFICIAL ILLUMINATION AND SUN GLARE IN A SPACE, the entire disclosure of which is hereby incorporated by reference.

In addition, prior art heating, ventilation, and air-conditioning (HVAC) control systems for control of the temperature in a building and may operate to minimize energy consumption. However, there exists a need for a single load control system that controls the lighting intensities of lighting loads, the positions of motorized window treatments, and the temperature of the building in order to reduce the total power consumption of the load control system.

SUMMARY OF THE INVENTION

According to an embodiment of the present invention, a load control system for a building comprises a lighting control device for controlling the amount of power delivered to a lighting load, a daylight control device for controlling the amount of natural light to be admitted through a window, and a temperature control device for controlling a setpoint temperature of a heating and cooling system to thus control a present temperature in the building. The load control system is operable to receive a demand response command. The lighting control device decreases the amount of power delivered to the lighting load in response to a demand response command so as to decrease the power consumption of the lighting load. The daylight control device decreases the amount of natural light admitted through the window in response to the demand response command so as to decrease the power consumption of the heating and cooling system. The temperature control device adjusts the setpoint temperature of the heating and cooling system in response to the demand response command so as to decrease the power consumption of the heating and cooling system.

In addition, the temperature control device, in response to the demand response command, may automatically increase the setpoint temperature of the heating and cooling system when the heating and cooling system is presently cooling the building, so as to decrease the power consumption of the heating and cooling system, and to decrease the setpoint temperature of the heating and cooling system when the heating and cooling system is presently heating the building, so as to decrease the power consumption of the heating and cooling system. Further, the load control system may comprise a controller coupled to the lighting control device, the daylight control device, and the temperature control device via a communication link. The controller may be operable to receive the demand response command and to transmit digital messages to the lighting control device, the daylight control device, and the temperature control device via the communication link in response to receiving the demand response command. The lighting control device may decrease the amount of power delivered to the lighting load, the daylight control device may decrease the amount of natural light admitted through the window, and the temperature control device may adjust the temperature in the building in response to receiving the digital messages from the controller.

Additionally, the daylight control device may comprises a motorized window treatment, which has a window treatment fabric for covering the window and is operable to move the fabric between a fully-open position in which the window is not covered and a fully-closed position in which the window is covered. The motorized window treatment may be operable to adjust the position of the fabric in response to the demand response command so as to decrease the power consumption of the heating and cooling system.

A method of controlling the amount of power delivered to a lighting load located in a space of a building, the amount of natural light admitted through a window located in the space, and a setpoint temperature of a heating and cooling system is also described herein. The method comprises the steps of: (1) receiving a demand response command; (2) adjusting the amount of power delivered to the lighting load so as to decrease the power consumption of the lighting load in response to receiving the demand response command; (3) decreasing the amount of natural light admitted through the window so as to decrease the power consumption of the heating and cooling system in response to receiving the demand response command; and (4) adjusting the setpoint temperature of the heating and cooling system so as to decrease the power consumption of the heating and cooling system in response to receiving the demand response command.

According to another embodiment of the present invention, a load control system is responsive to a demand response command that comprises a planned demand response command indicating an upcoming planned demand response event. The load control system is provided in a building having a lighting load located in a space of the building, a heating and cooling system, and a window located in the space of the building. The load control system comprises a lighting control device for controlling the amount of power delivered to the lighting load, a motorized window treatment comprising a window treatment fabric for covering the window, a temperature control device for controlling a setpoint temperature of the heating and cooling system to thus control a present temperature in the building, and a controller coupled to the lighting control device, the motorized window treatment, and the temperature control device via a communication link. The controller receives the planned demand response command and transmits digital messages to the lighting control device, the motorized window treatment, and the temperature control device via the communication link in response to receiving the planned demand response command. The controller transmits the digital messages to the lighting control device, the daylight control device, and the temperature control device to pre-condition the building prior to the upcoming demand response event. Further, the controller is operable to decrease the setpoint temperature to pre-condition the building prior to the upcoming planned demand response event when the heating and cooling system is presently cooling the building, and increase the setpoint temperature to pre-condition the building prior to the upcoming planned demand response event when the heating and cooling system is presently heating the building.

Other features and advantages of the present invention will become apparent from the following description of the invention that refers to the accompanying drawings.

BRIEF DESCRIPTION OF THE DRAWINGS

FIGS. 6A-6C show example plots of optimal shade positions of the motorized roller shades of the load control system of FIG. 1 on different facades of the building during different days of the year according to the first embodiment of the present invention;

DETAILED DESCRIPTION OF THE INVENTION

Figure 1:
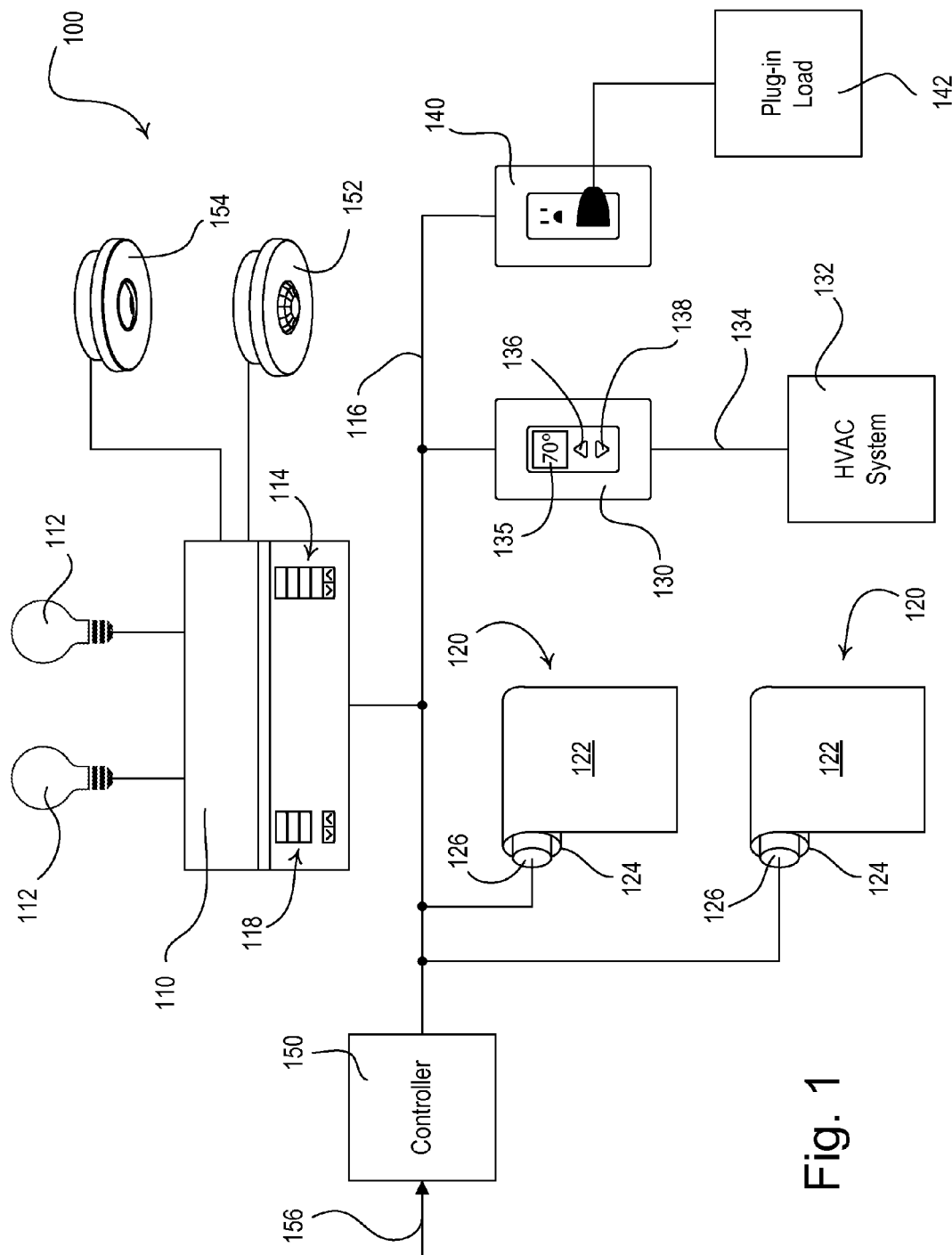
FIG. 1 is a simplified block diagram of a centralized load control system according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a centralized load control system 100 that may be installed in a building (such as a commercial building) according to a first embodiment of the present invention. The load control system 100 comprises a multi-zone lighting control device 110 that is operable to control the amount of power delivered from an alternating-current (AC) power source (not shown) to one or more lighting loads 112 for adjusting the intensities of the lighting loads. The lighting load 112 may be located in a space 160 (FIG. 2) of the building to thus control the amount of electric light (i.e., artificial light) in the space. The lighting loads 112 may comprise, for example, incandescent lamps, halogen lamps, gas discharge lamps, fluorescent lamps, compact fluorescent lamps, high-intensity discharge (HID) lamps, magnetic low-voltage (MLV) lighting loads, electronic low-voltage (ELV) lighting loads, light-emitting diode (LED) light sources, hybrid light sources comprising two or more different types of lamps, and any other electrical light sources, or combination thereof, that provide illumination. In addition, the load control system 100 may comprise additional multi-zone lighting control devices 110 as well as single-zone lighting control devices, such as, electronic dimming ballasts, LED drivers, and dimmer switches.

The lighting control device 110 is operable to control a present lighting intensity $L_{PRES}$ of each of the lighting loads 112 from a minimum lighting intensity $L_{MIN}$ to a maximum lighting intensity $L_{MAX}$. The lighting control device 110 is operable to "fade" the present lighting intensity $L_{PRES}$, i.e., control the present lighting intensity from a first lighting intensity to a second lighting intensity over a period of time. Fade rates of a lighting control device are described in greater detail in commonly-assigned U.S. Pat. No. 5,248,919, issued Sep. 29, 1993, entitled LIGHTING CONTROL DEVICE, the entire disclosure of which is hereby incorporated by reference.

The lighting control device 110 comprises a first set of buttons 114, which may be actuated by a user to allow for manual control of the intensities of the lighting loads 112, i.e., to allow an occupant to control the intensities of the lighting load 112 to desired intensity levels $L_{DES}$. Actuations of the buttons 114 may cause the lighting control device 110 to select one or more lighting presets (i.e., "scenes"). The first set of buttons 114 may also comprise raise and lower buttons for respectively raising and lowering the intensities of all (or a subset) of the lighting loads 112 in unison. The lighting control device 110 is connected to a wired communication link 116 and is operable to transmit and receive digital messages via the communication link. Alternatively, the communication link could comprise a wireless communication link, such as, for example, a radio-frequency (RF) communication link or an infrared (IR) communication link.

The load control system 100 also comprises one or more daylight control devices, for example, motorized window treatments, such as motorized roller shades 120. The motorized roller shades 120 of the load control system 100 may be positioned in front of one or more windows for controlling the amount of daylight (i.e., natural light) entering the building. The motorized roller shades 120 each comprise a flexible shade fabric 122 rotatably supported by a roller tube 124. Each motorized roller shade 120 is controlled by an electronic drive unit (EDU) 126, which may be located inside the roller tube 124. The electronic drive unit 126 may be powered directly from the AC power source or from an external direct-current (DC) power supply (not shown). The electronic drive unit 126 is operable to rotate the respective roller tube 124 to move the bottom edge of the shade fabric 122 to a fully-open position and a fully-closed position, and to any position between the fully-open position and the fully-closed position (e.g., a preset position). Specifically, the motorized roller shades 120 may be opened to allow more daylight to enter the building and may be closed to allow less daylight to enter the building. In addition, the motorized roller shades 120 may be controlled to provide additional insulation for the building, e.g., by moving to the fully-closed position to keep the building cool in the summer and warm in the winter. Examples of electronic drive units for motorized roller shades are described in commonly-assigned U.S. Pat. No. 6,497,267, issued Dec. 24, 2002, entitled MOTORIZED WINDOW SHADE WITH ULTRAQUIET MOTOR DRIVE AND ESD PROTECTION, and U.S. Pat. No. 6,983,783, issued Jan. 10, 2006, entitled MOTORIZED SHADE CONTROL SYSTEM, the entire disclosures of which are hereby incorporated by reference.

Alternatively, the motorized roller shades 120 could comprise tensioned roller shade systems, such that the motorized roller shades 120 may be mounted in a non-vertical manner, for example, horizontally in a skylight. An example of a tensioned roller shade system that is able to be mounted in a skylights is described in commonly-assigned U.S. patent application Ser. No. 12/061,802, filed Apr. 3, 2008, entitled SELF-CONTAINED TENSIONED ROLLER SHADE SYSTEM, the entire disclosure of which in hereby incorporated by reference. In addition, the daylight control devices of the load control system 100 could alternatively comprise controllable window glazings (e.g., electrochromic windows), controllable exterior shades, controllable shutters or louvers, or other types of motorized window treatments, such as motorized draperies, roman shades, or blinds. An example of a motorized drapery system is described in commonly-assigned U.S. Pat. No. 6,935,403, issued Aug. 30, 2005, entitled MOTORIZED DRAPERY PULL SYSTEM, the entire disclosure of which in hereby incorporated by reference.

Each of the electronic drive units 126 is coupled to the communication link 116, such that the electronic drive unit may control the position of the respective shade fabric 122 in response to digital messages received via the communication link. The lighting control device 110 may comprise a second set of buttons 118 that provides for control of the motorized roller shades 120. The lighting control device 110 is operable to transmit a digital message to the electronic drive units 126 in response to actuations of any of the second set of buttons 118. The user is able to use the second set of buttons 118 to open or close the motorized roller shades 120, adjust the position of the shade fabric 122 of the roller shades, or set the roller shades to preset shade positions between the fully open position and the fully closed position.

The load control system 100 comprise one or more temperature control devices 130, which are also coupled to the communication link 116, and may be powered, for example, from the AC power source, an external DC power supply, or an internal battery. The temperature control devices 130 are also coupled to a heating, ventilation, and air-conditioning (HVAC) control system 132 (i.e., a "heating and cooling" system) via an HVAC communication link 134, which may comprise, for example, a network communication link such as an Ethernet link. Each temperature is operable to control the HVAC system 132 to a cooling mode in which the HVAC system is cooling the building, and to a heating mode in which the HVAC system is heating the building. The temperature control devices 130 each measure a present temperature $T_{PRES}$ in the building and transmit appropriate digital messages to the HVAC system to thus control the present temperature in the building towards a setpoint temperature $T_{SET}$. Each temperature control device 130 may comprise a visual display 135 for displaying the present temperature $T_{PRES}$ in the building or the setpoint temperature $T_{SET}$. In addition, each temperature control device 130 may comprise raise and lower temperature buttons 136, 138 for respectively raising and lowering the setpoint temperature $T_{SET}$ to a desired temperature $T_{DES}$ as specified by the occupant in the building. Each temperature control device 130 is also operable to adjust the setpoint temperature $T_{SET}$ in response to digital messages received via the communication link 116.

The load control system 100 further comprises one or more controllable electrical receptacles 140 for control of one or more plug-in electrical loads 142, such as, for example, table lamps, floor lamps, printers, fax machines, display monitors, televisions, coffee makers, and water coolers. Each controllable electrical receptacle 140 receives power from the AC power source and has an electrical output to which a plug of the plug-in electrical load 142 may be inserted for thus powering the plug-in load. Each controllable electrical receptacle 140 is operable to turn on and off the connected plug-in electrical load 142 in response to digital messages received via the communication link. In addition, the controllable electrical receptacles 140 may be able to control the amount of power delivered to the plug-in electrical load 142, e.g., to dim a plug-in lighting load. Additionally, the load control system 100 could comprise one or more controllable circuit breakers (not shown) for control of electrical loads that are not plugged into electrical receptacles, such as a water heater.

The load control system 100 may also comprise a controller 150, which may be coupled to the communication link 116 for facilitating control of the lighting control devices 110, the motorized roller shades 120, the temperature control devices 130, and the controllable electrical receptacles 140 of the load control system 100. The controller 150 is operable to control the lighting control devices 110 and the motorized roller shades 120 to control a total light level in the space 160 (i.e., the sum of the artificial and natural light in the space). The controller 150 is further operable to control the load control system 100 to operate in an energy savings mode. Specifically, the controller 150 is operable to transmit individual digital messages to each of the lighting control devices 110, the motorized roller shades 120, the temperature control devices 130, and the controllable electrical receptacles 140 to control the intensities of the lighting loads 112, the positions of the shade fabrics 122, the temperature of the building, and the state of the plug-in electrical loads 142, respectively, so as to reduce the total power consumption of the load control system 100 (as will be described in greater detail below). The controller 150 may be further operable to monitor the total power consumption of the load control system 100.

The load control system 100 may further comprise an occupancy sensor 152 for detecting an occupancy condition or a vacancy condition in the space in which the occupancy sensor in mounted, and a daylight sensor 154 for measuring an ambient light intensity $L_{AMB}$ in the space in which the daylight sensor in mounted. The occupancy sensor 152 and the daylight sensor 154 may be coupled to the lighting control device 110 (as shown in FIG. 1). Alternatively, the occupancy sensor 152 and the daylight sensor 154 may be coupled to the communication link 116 or directly to the controller 150.

The controller 150 is operable to control the lighting control device 110, the motorized roller shades 120, the temperature control devices 130, and the controllable electrical receptacles 140 in response to an occupancy condition or a vacancy condition detected by the occupancy sensor 152, and/or in response to the ambient light intensity $L_{AMB}$ measured by the daylight sensor 154. For example, the controller 150 may be operable to turn on the lighting loads 112 in response to detecting the presence of an occupant in the vicinity of the occupancy sensor 152 (i.e., an occupancy condition), and to turn off the lighting loads in response to detecting the absence of the occupant (i.e., a vacancy condition). In addition, the controller 150 may be operable to increase the intensities of the lighting loads 112 if the ambient light intensity $L_{AMB}$ detected by the daylight sensor 154 is less than a setpoint light intensity $L_{SET}$, and to decrease the intensities of the lighting load if the ambient light intensity $L_{AMB}$ is greater than the setpoint light intensity $L_{SET}$.

Examples of occupancy sensors are described in greater detail in co-pending, commonly-assigned U.S. patent application Ser. No. 12/203,500, filed Sep. 3, 2008, entitled BATTERY-POWERED OCCUPANCY SENSOR; and U.S. patent application Ser. No. 12/371,027, filed Feb. 13, 2009, entitled METHOD AND APPARATUS FOR CONFIGURING A WIRELESS SENSOR, the entire disclosures of which are hereby incorporated by reference. Examples of daylight sensors are described in greater detail in commonly-assigned U.S. patent application Ser. No. 12/727,923, filed Mar. 19, 2010, entitled METHOD OF CALIBRATING A DAYLIGHT SENSOR; and U.S. patent application Ser. No. 12/727,956, filed Mar. 19, 2010, entitled WIRELESS BATTERY-POWERED DAYLIGHT SENSOR, the entire disclosures of which are hereby incorporated by reference.

The controller 150 may also be connected to a network communication link 156, e.g., an Ethernet link, which may be coupled to a local area network (LAN), such as an intranet, or a wide area network (WAN), such as the Internet. The network communication link 156 may also comprise a wireless communication link allowing for communication on a wireless LAN. For example, the controller 150 may be operable to receive a demand response (DR) command (e.g., an "immediate" demand response command) from an electrical utility company as part of a demand response program. In response to receiving an immediate demand response command, the controller 150 will immediately control the load control system 100 to reduce the total power consumption of the load control system.

According to alternative embodiments of the present invention, the demand response command may also comprise one of a plurality of demand response levels or a planned demand response command indicating an upcoming planned demand response event as will be describe in greater detail below. While the present invention is described with the controller 150 connected to the network communication link 156 for receipt of the demand response commands, the one or more of the lighting control devices 110 could alternatively be coupled to the network communication link 156 for control of the lighting loads 112, the motorized roller shades 120, the temperature control devices 130, and the controllable electrical receptacles 140 in response to the demand response commands.

The controller 150 may comprise an astronomical time clock for determining the present time of day and year. Alternatively, the controller 150 could retrieve the present time of the year or day from the Internet via the network communication link 156.

To maximize the reduction in the total power consumption of the load control system 100, the controller 150 is operable to control the load control system 100 differently depending upon whether the HVAC system 132 is presently heating or cooling. For example, the controller 150 may increase the setpoint temperatures $T_{SET}$ of each of the temperature control devices 130 when the HVAC system 132 is presently cooling and may decrease the setpoint temperatures $T_{SET}$ when the HVAC system is presently heating in order to save energy. Alternatively, the controller 150 could control the setpoint temperature $T_{SET}$ of the temperature control device 130 differently depending on whether the present time of the year is during a first portion of the year, e.g., the "summer" (i.e., the warmer months of the year), or during a second portion of the year, e.g., the "winter" (i.e., the colder months of the year). As used herein, the "summer" refers to the warmer half of the year, for example, from approximately May 1 to approximately October 31, and the "winter" refers to the colder half of the year, for example, from approximately November 1 to approximately April 30. In addition, the controller 150 could alternatively control the setpoint temperature $T_{SET}$ of the temperature control device 130 differently depending on the temperature external to the building.

The controller 150 may be operable to operate in an "out-of-box" mode of operation immediately after being installed and powered for the first time. Specifically, the controller 150 may be operable to control the lighting control devices 110, the motorized roller shades 120, the temperature control devices 130, and the controllable electrical receptacles 140 according to pre-programmed out-of-box settings in response to receiving a demand response command via the network communication link 156. For example, in response to receiving the demand response command when in the out-of-box mode, the controller 150 may dim the lighting loads 112 by a predetermined percentage $\Delta L_{OOB}$, e.g., by approximately 20% of the present lighting intensity $L_{PRES}$ (such that the lighting loads 112 consume less power). In addition, the controller 150 may close all of the motorized roller shades 120 to provide additional insulation for the building (such that the HVAC system 132 will consume less power) in response to receiving the demand response command when in the out-of-box mode. Further, the controller 150 may adjust the setpoint temperatures $T_{SET}$ of the temperature control devices 130 in response in response to receiving the demand response command when in the out-of-box mode, for example, by increasing the setpoint temperatures $T_{SET}$ of each of the temperature control devices by a predetermined increment $\Delta T_{OOB}$ (e.g., approximately 2° F.) when the HVAC system 132 is presently cooling the building, and decreasing the setpoint temperatures $T_{SET}$ of each of the temperature control devices by the predetermined increment $\Delta T_{OOB}$ when the HVAC system is presently heating the building, such that the HVAC system will consume less power.

To maximize the reduction in the total power consumption of the load control system 100, the controller 150 may be configured using an advanced programming procedure, such that the controller 150 operates in a programmed mode (rather than the out-of-box mode). For example, the controller 150 may be programmed to control the load control system 100 differently depending upon whether one or more of the windows of the building are receiving direct sunlight as will be described in greater detail below. The load control system 100 and the controller 150 may be programmed using, for example, a personal computer (PC) (not shown), having a graphical user interface (GUI) software. The programming information may be stored in a memory in the controller 150.

In addition, the controller 150 or one of the other control devices of the load control system 100 may be able to provide a visual indication that load control system is operating in the energy savings mode (i.e., in response to a demand response command). For example, the lighting control device 110 could comprise a visual indicator, such as a light-emitting diode (LED), which may be illuminated when the load control system 100 is operating in the energy savings mode. An example of a lighting control device for providing a visual indication of an energy savings mode is described in greater detail in commonly-assigned U.S. patent application Ser. No. 12/474,950, filed May 29, 2009, entitled LOAD CONTROL DEVICE HAVING A VISUAL INDICATION OF AN ENERGY SAVINGS MODE, the entire disclosure of which is hereby incorporated by reference.

Alternatively, the load control system 100 could comprises a visual display, such as an liquid-crystal display (LCD)

screen, for providing a visual indication in the load control system 100 is operating in the energy savings mode and for providing information regarding the total power consumption of the load control system and the amount of energy savings. An example of a visual display for providing energy savings information is described in greater detail in commonly-assigned U.S. patent application Ser. No. 12/044,672, filed Mar. 7, 2008, SYSTEM AND METHOD FOR GRAPHICALLY DISPLAYING ENERGY CONSUMPTION AND SAVINGS, the entire disclosure of which is hereby incorporated by reference.

The controller 150 is operable to transmit digital messages to the motorized roller shades 120 to control the amount of sunlight entering the space 160 of the building to limit a sunlight penetration distance $d_{PEN}$ in the space. The controller 150 comprises an astronomical timeclock and is able to determine a sunrise time $t_{SUNRISE}$ and a sunset time $t_{SUNSET}$ for a specific day of the year. The controller 150 transmits commands to the electronic drive units 126 to automatically control the motorized roller shades 120 in response to a shade timeclock schedule as will be described in greater detail below. An example of a method of limiting the sunlight penetration distance $d_{PEN}$ is a space is described in greater detail in commonly-assigned U.S. patent application Ser. No. 12/563,786, filed Sep. 21, 2009, entitled METHOD OF AUTOMATICALLY CONTROLLING A MOTORIZED WINDOW TREATMENT WHILE MINIMIZING OCCUPANT DISTRACTIONS, the entire disclosure of which is hereby incorporated by reference.

Figure 2:
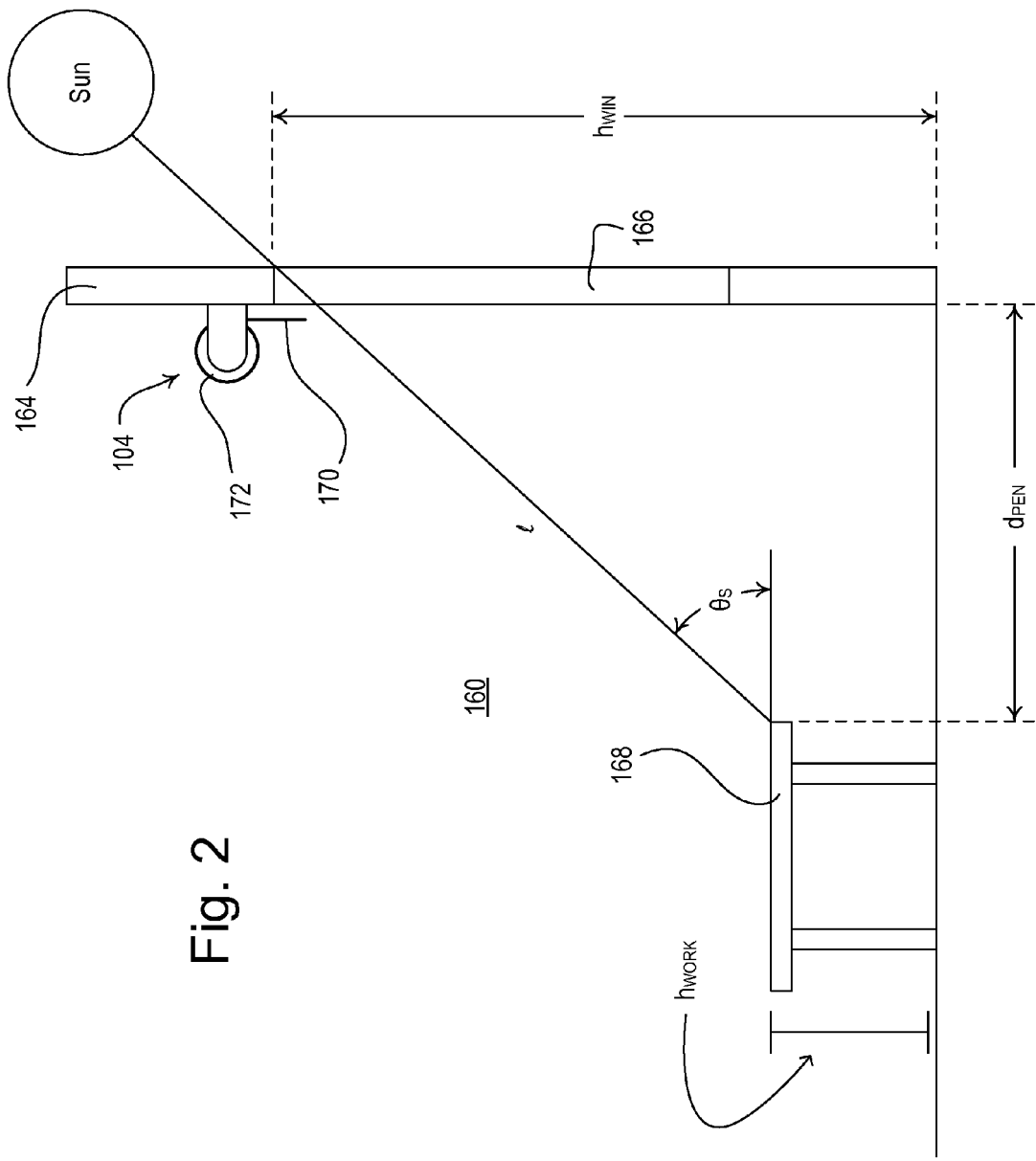
FIG. 2 is a simplified side view of an example of a space of a building having a window covered by one of the motorized roller shades of the load control system of FIG. 1.

FIG. 2 is a simplified side view of an example of the space 160 illustrating the sunlight penetration distance $d_{PEN}$, which is controlled by one of the motorized roller shades 120. As shown in FIG. 2, the building comprises a façade 164 (e.g., one side of a four-sided rectangular building) having a window 166 for allowing sunlight to enter the space. The space 160 also comprises a work surface, e.g., a table 168, which has a height $h_{WORK}$. The motorized roller shade 120 is mounted above the window 166, such that the shade fabric 122 hangs in front of the window, so as to control the amount of daylight (i.e., natural light) that is admitted through the window. The electronic drive unit 126 rotates the roller tube 172 to move the shade fabric 170 between a fully open position (in which the window 166 is not covered) and a fully closed position (in which the window 166 is fully covered). Further, the electronic drive unit 126 may control the position of the shade fabric 170 to one of a plurality of preset positions between the fully open position and the fully closed position.

The sunlight penetration distance $d_{PEN}$ is the distance from the window 166 and the façade 164 at which direct sunlight shines into the room. The sunlight penetration distance $d_{PEN}$ is a function of a height $h_{WIN}$ of the window 166 and an angle $\phi_F$ of the façade 164 with respect to true north, as well as a solar elevation angle $\theta_S$ and a solar azimuth angle $\phi_S$, which define the position of the sun in the sky. The solar elevation angle $\theta_S$ and the solar azimuth angle $\phi_S$ are functions of the present date and time, as well as the position (i.e., the longitude and latitude) of the building in which the space 160 is located. The solar elevation angle $\theta_S$ is essentially the angle between a line directed towards the sun and a line directed towards the horizon at the position of the building. The solar elevation angle $\theta_S$ can also be thought of as the angle of incidence of the sun's rays on a horizontal surface. The solar azimuth angle $\phi_S$ is the angle formed by the line from the observer to true north and the line from the observer to the sun projected on the ground.

Figure 3A:
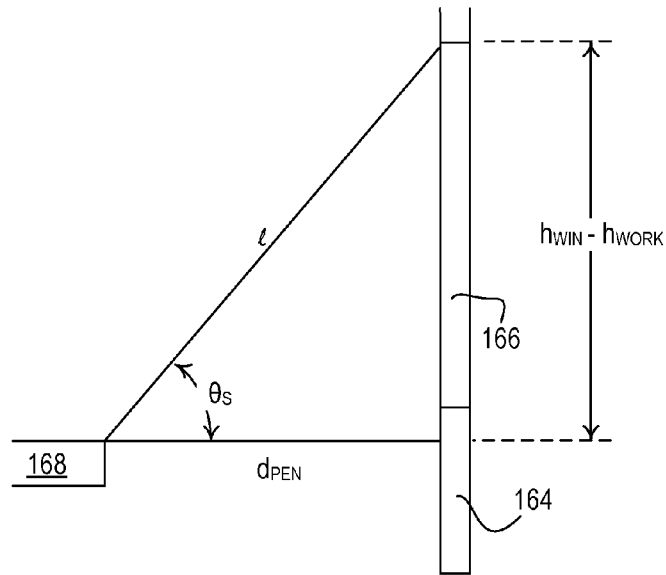
FIG. 3A is a side view of the window of FIG. 2 illustrating a sunlight penetration depth.

The sunlight penetration distance $d_{PEN}$ of direct sunlight onto the table 168 of the space 160 (which is measured normal to the surface of the window 166) can be determined by considering a triangle formed by the length l of the deepest penetrating ray of light (which is parallel to the path of the ray), the difference between the height $h_{WIN}$ of the window 166 and the height $h_{WORK}$ of the table 168, and distance between the table and the wall of the façade 164 (i.e., the sunlight penetration distance $d_{PEN}$) as shown in the side view of the window 166 in FIG. 3A, i.e., $$\tan(\theta_S)=(h_{WIN}-h_{WORK})/l, \tag{Equation 1}$$

where $\theta_S$ is the solar elevation angle of the sun at a given date and time for a given location (i.e., longitude and latitude) of the building.

Figure 3B:
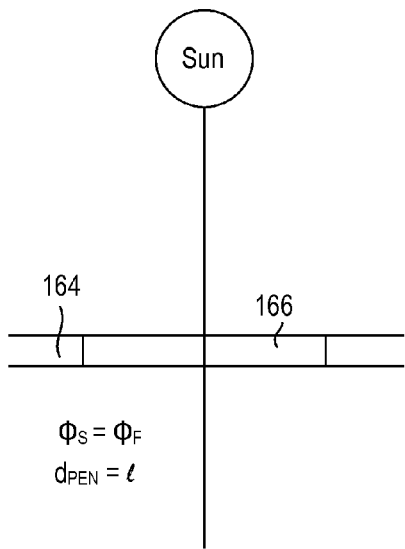
FIG. 3B is a top view of the window of FIG. 2 when the sun is directly incident upon the window.
Figure 3C:
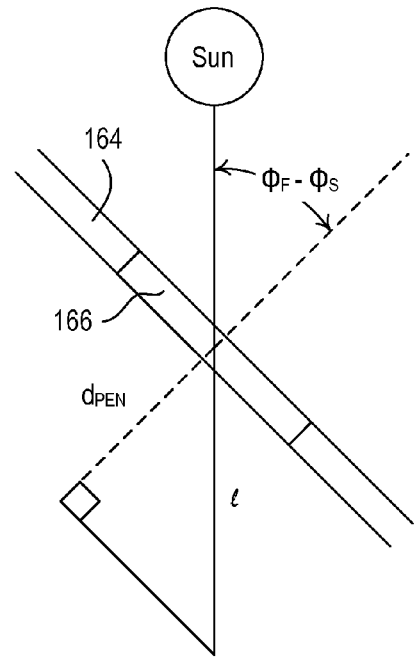
FIG. 3C is a top view of the window of FIG. 2 when the sun is not directly incident upon the window.

If the sun is directly incident upon the window 166, a solar azimuth angle $\phi_S$ and the façade angle $\phi_F$ (i.e., with respect to true north) are equal as shown by the top view of the window 166 in FIG. 3B. Accordingly, the sunlight penetration distance $d_{PEN}$ equals the length l of the deepest penetrating ray of light. However, if the façade angle $\phi_F$ is not equal to the solar azimuth angle $\phi_S$, the sunlight penetration distance $d_{PEN}$ is a function of the cosine of the difference between the façade angle $\phi_F$ and the solar azimuth angle $\phi_S$, i.e., $$d_{PEN}=l\cdot\cos(|\phi_F-\phi_S|), \tag{Equation 2}$$

as shown by the top view of the window 166 in FIG. 3C.

As previously mentioned, the solar elevation angle $\theta_S$ and the solar azimuth angle $\phi_S$ define the position of the sun in the sky and are functions of the position (i.e., the longitude and latitude) of the building in which the space 160 is located and the present date and time. The following equations are necessary to approximate the solar elevation angle $\theta_S$ and the solar azimuth angle $\phi_S$. The equation of time defines essentially the difference in a time as given by a sundial and a time as given by a clock. This difference is due to the obliquity of the Earth's axis of rotation. The equation of time can be approximated by $$E=9.87\cdot\sin(2B)-7.53\cdot\cos(B)-1.5\cdot\sin(B), \tag{Equation 3}$$

where $B=[360°\cdot(N_{DAY}-81)]/364$, and $N_{DAY}$ is the present day-number for the year (e.g., $N_{DAY}$ equals one for January 1, $N_{DAY}$ equals two for January 2, and so on).

The solar declination $\delta$ is the angle of incidence of the rays of the sun on the equatorial plane of the Earth. If the eccentricity of Earth's orbit around the sun is ignored and the orbit is assumed to be circular, the solar declination is given by:

$$\delta=23.45°\cdot\sin[360°/365\cdot(N_{DAY}+284)]. \tag{Equation 4}$$

The solar hour angle H is the angle between the meridian plane and the plane formed by the Earth's axis and current location of the sun, i.e., $$H(t)=\{¼\cdot[t+E-(4\cdot\lambda)+(\alpha\cdot t_{TZ})]\}-180°, \tag{Equation 5}$$

where t is the present local time of the day, $\lambda$ is the local longitude, and $t_{TZ}$ is the time zone difference (in unit of hours) between the local time t and Greenwich Mean Time (GMT). For example, the time zone difference $t_{TZ}$ for the Eastern Standard Time (EST) zone is −5. The time zone difference $t_{TZ}$ can be determined from the local longitude $\lambda$ and latitude $\Phi$ of the building. For a given solar hour angle H, the local time can be determined by solving Equation 5 for the time t, i.e., $$t=720+4\cdot(H+\lambda)-(60\cdot t_{TZ})-E. \tag{Equation 6}$$

When the solar hour angle H equals zero, the sun is at the highest point in the sky, which is referred to as "solar noon" time $t_{SN}$, i.e., $$t_{SN}=720+(4\cdot\lambda)-(60\cdot t_{TZ})-E. \tag{Equation 7}$$

A negative solar hour angle H indicates that the sun is east of the meridian plane (i.e., morning), while a positive solar hour angle H indicates that the sun is west of the meridian plane (i.e., afternoon or evening).

The solar elevation angle $\theta_S$ as a function of the present local time t can be calculated using the equation:

$$\theta_S(t)=\sin^{-1}[\cos(H(t))\cdot\cos(\delta)\cdot\cos(\Phi)+\sin(\delta)+\sin(\Phi)], \quad \text{(Equation 8)}$$

wherein $\Phi$ is the local latitude. The solar azimuth angle $\phi_S$ as a function of the present local time t can be calculated using the equation:

$$\phi_S(t)=180°\cdot C(t)\cdot\cos^{-1}[X(t)/\cos(\theta_S(t))], \quad \text{(Equation 9)}$$

where $$X(t)=[\cos(H(t))\cdot\cos(\delta)\cdot\sin(\Phi)-\sin(\delta)\cdot\cos(\Phi)], \quad \text{(Equation 10)}$$

and C(t) equals negative one if the present local time t is less than or equal to the solar noon time $t_{SN}$ or one if the present local time t is greater than the solar noon time $t_{SN}$. The solar azimuth angle $\phi_S$ can also be expressed in terms independent of the solar elevation angle $\theta_S$, i.e., $$\phi_S(t)=\tan^{-1}[-\sin(H(t))\cdot\cos(\delta)/Y(t)], \quad \text{(Equation 11)}$$

where $$Y(t)=[\sin(\delta)\cdot\cos(\Phi)-\cos(\delta)\cdot\sin(\Phi)\cdot\cos(H(t))]. \quad \text{(Equation 12)}$$

Thus, the solar elevation angle $\theta_S$ and the solar azimuth angle $\phi_S$ are functions of the local longitude $\lambda$ and latitude $\Phi$ and the present local time t and date (i.e., the present day-number $N_{DAY}$). Using Equations 1 and 2, the sunlight penetration distance can be expressed in terms of the height $h_{WIN}$ of the window 166, the height $h_{WORK}$ of the table 168, the solar elevation angle $\theta_S$, and the solar solar azimuth angle $\phi_S$.

According to the first embodiment of the present invention, the motorized roller shades 120 are controlled such that the sunlight penetration distance $d_{PEN}$ is limited to less than a desired maximum sunlight penetration distance $d_{MAX}$ during all times of the day. For example, the sunlight penetration distance $d_{PEN}$ may be limited such that the sunlight does not shine directly on the table 168 to prevent sun glare on the table. The desired maximum sunlight penetration distance $d_{MAX}$ may be entered, for example, using the GUI software of the PC, and may be stored in the memory in the controller 150. In addition, the user may also use the GUI software of the computer to enter the local longitude $\lambda$ and latitude $\Phi$ of the building, the façade angle $\phi_F$ for each façade 164 of the building, and other related programming information, which may also be stored in the memory of each controller 150.

In order to minimize distractions to an occupant of the space 160 (i.e., due to movements of the motorized roller shades), the controller 150 controls the motorized roller shades 120 to ensure that at least a minimum time period $T_{MIN}$ exists between any two consecutive movements of the motorized roller shades. The minimum time period $T_{MIN}$ that may exist between any two consecutive movements of the motorized roller shades may be entered using the GUI software of the computer and may be also stored in the memory in the controller 150. The user may select different values for the desired maximum sunlight penetration distance $d_{MAX}$ and the minimum time period $T_{MIN}$ between shade movements for different areas and different groups of motorized roller shades 120 in the building.

Figure 4:
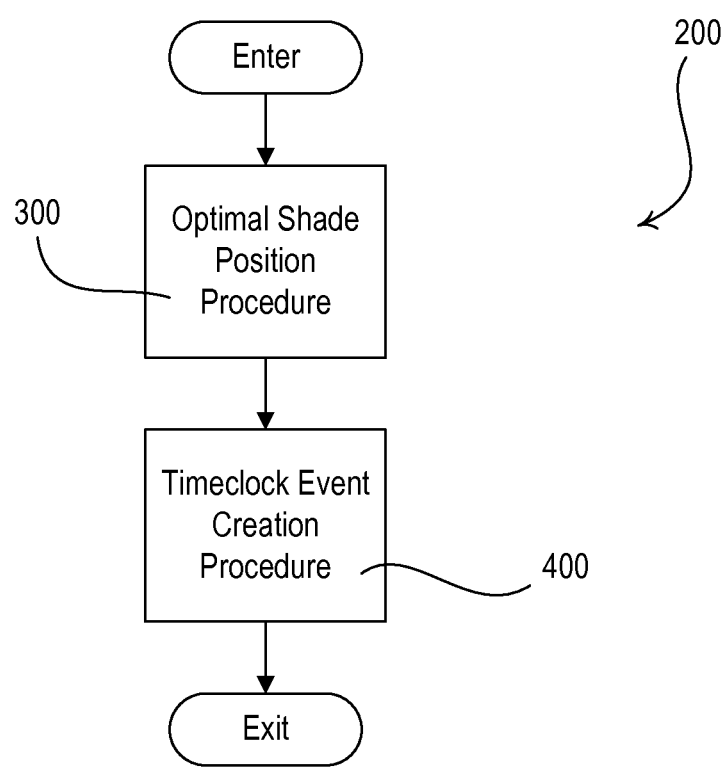
FIG. 4 is a simplified flowchart of a timeclock configuration procedure executed periodically by a controller of the load control system of FIG. 1 according to the first embodiment of the present invention.

FIG. 4 is a simplified flowchart of a timeclock configuration procedure 200 executed periodically by the controller 150 of the load control system 100 to generate a shade timeclock schedule defining the desired operation of the motorized roller shades 120 of each of the façades 164 of the building according to the first embodiment of the present invention. For example, the timeclock configuration procedure 200 may be executed once each day at midnight to generate a new shade timeclock schedule for one or more areas in the building. The shade timeclock schedule is executed between a start time $t_{START}$ and an end time $t_{END}$ of the present day. During the timeclock configuration procedure 200, the controller 150 first performs an optimal shade position procedure 300 for determining optimal shade positions $P_{OPT}(t)$ of the motorized roller shades 120 in response to the desired maximum sunlight penetration distance $d_{MAX}$ for each minute between the start time $t_{START}$ and the end time $t_{END}$ of the present day. The controller 150 then executes a timeclock event creation procedure 400 to generate the events of the shade timeclock schedule in response to the optimal shade positions $P_{OPT}(t)$ and the user-selected minimum time period $T_{MIN}$ between shade movements. The events times of the shade timeclock schedule are spaced apart by multiples of the user-specified minimum time period $T_{MIN}$ between shade movements. Since the user may select different values for the desired maximum sunlight penetration distance $d_{MAX}$ and the minimum time period $T_{MIN}$ between shade movements for different areas and different groups of motorized roller shades 120 in the building, a different shade timeclock schedule may be created and executed for the different areas and different groups of motorized roller shades in the building (i.e., the different façades 164 of the building).

The shade timeclock schedule is split up into a number of consecutive time intervals, each having a length equal to the minimum time period $T_{MIN}$ between shade movements. The controller 150 considers each time interval and determines a position to which the motorized roller shades 120 should be controlled in order to prevent the sunlight penetration distance $d_{PEN}$ from exceeding the desired maximum sunlight penetration distance $d_{MAX}$ during the respective time interval. The controller 150 creates events in the shade timeclock schedule, each having an event time equal to beginning of respective time interval and a corresponding position equal to the position to which the motorized roller shades 104 should be controlled in order to prevent the sunlight penetration distance $d_{PEN}$ from exceeding the desired maximum sunlight penetration distance $d_{MAX}$. However, the controller 150 will not create a timeclock event when the determined position of a specific time interval is equal to the determined position of a preceding time interval (as will be described in greater detail below). Therefore, the event times of the shade timeclock schedule are spaced apart by multiples of the user-specified minimum time period $T_{MIN}$ between shade movements.

Figure 5:
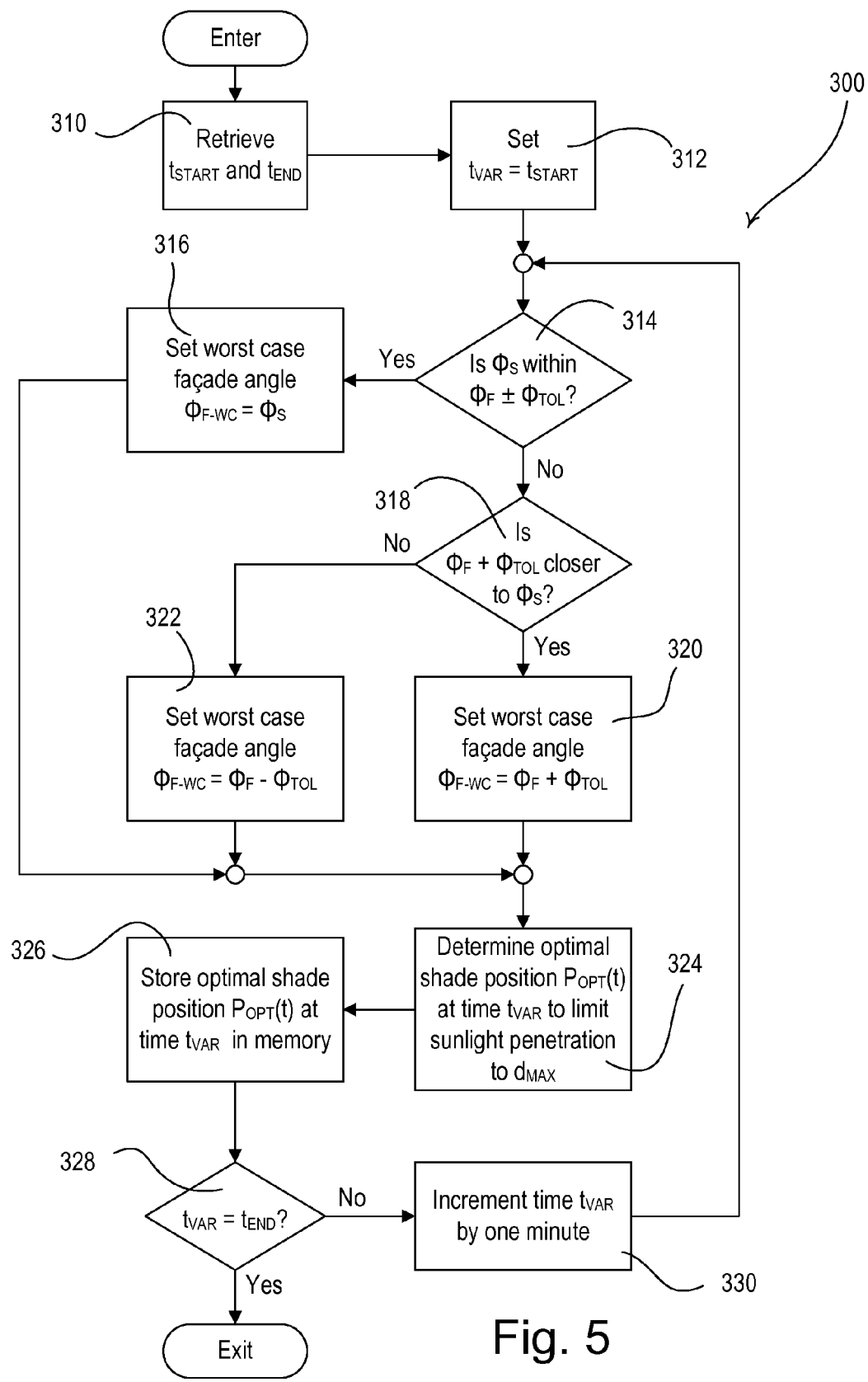
FIG. 5 is a simplified flowchart of an optimal shade position procedure executed by the controller of the load control system of FIG. 1 according to the first embodiment of the present invention.

FIG. 5 is a simplified flowchart of the optimal shade position procedure 300, which is executed by the controller 150 to generate the optimal shade positions $P_{OPT}(t)$ for each minute between the start time $t_{START}$ and the end time $t_{END}$ of the shade timeclock schedule such that the sunlight penetration distance $d_{PEN}$ will not exceed the desired maximum sunlight penetration distance $d_{MAX}$. The controller 150 first retrieves the start time $t_{START}$ and the end time $t_{END}$ of the shade timeclock schedule for the present day at step 310. For example, the controller 150 could use the astronomical timeclock to set the start time $t_{START}$ equal to the sunrise time $t_{SUNRISE}$ for the present day, and the end time $t_{END}$ equal to the sunset time $t_{SUNSET}$ for the present day. Alternatively, the start and end times $t_{START}$, $t_{END}$ could be set to arbitrary times, e.g., 6 A.M. and 6 P.M, respectively.

Next, the controller 150 sets a variable time $t_{VAR}$ equal to the start time $t_{START}$ at step 312 and determines a worst case façade angle $\phi_{F-WC}$ at the variable time $t_{VAR}$ to use when calculating the optimal shade position $P_{OPT}(t)$ at the variable time $t_{VAR}$. Specifically, if the solar azimuth angle $\phi_S$ is within a façade angle tolerance $\phi_{TOL}$ (e.g., approximately 3°) of the fixed façade angle $\phi_F$ at step 314 (i.e., if $\phi_F - \phi_{TOL} \leq \phi_S \leq \phi_F + \phi_{TOL}$), the controller 150 sets the worst case façade angle $\phi_{F\text{-}WC}$ equal to the solar azimuth angle $\theta_S$ of the façade 164 at step 315. If the solar azimuth angle $\phi_S$ is not within the façade angle tolerance $\phi_{TOL}$ of the façade angle $\phi_F$ at step 314, the controller 150 then determines if the façade angle $\phi_F$ plus the façade angle tolerance $\phi_{TOL}$ is closer to the solar azimuth angle $\phi_S$ than the façade angle $\phi_F$ minus the façade angle tolerance $\phi_{TOL}$ at step 318. If so, the controller 150 sets the worst case façade angle $\phi_{F\text{-}WC}$ equal to the façade angle $\phi_F$ plus the façade angle tolerance $\phi_{TOL}$ at step 320. If the façade angle $\phi_F$ plus the façade angle tolerance $\phi_{TOL}$ is not closer to the solar azimuth angle $\phi_S$ than the façade angle $\phi_F$ minus the façade angle tolerance $\phi_{TOL}$ at step 318, the controller 150 sets the worst case façade angle $\phi_{F\text{-}WC}$ equal to the façade angle $\phi_F$ minus the façade angle tolerance $\phi_{TOL}$ at step 322.

At step 324, the controller 150 uses Equations 1-12 shown above and the worst case façade angle $\phi_{F\text{-}WC}$ to calculate the optimal shade position $P_{OPT}(t_{VAR})$ that is required in order to limit the sunlight penetration distance $d_{PEN}$ to the desired maximum sunlight penetration distance $d_{MAX}$ at the variable time $t_{VAR}$. At step 326, the controller 150 stores in the memory the optimal shade position $P_{OPT}(t_{VAR})$ determined in step 324. If the variable time $t_{VAR}$ is not equal to the end time $t_{END}$ at step 328, the controller 150 increments the variable time $t_{VAR}$ by one minute at step 330 and determines the worst case façade angle $\phi_{F\text{-}WC}$ and the optimal shade position $P_{OPT}(t_{VAR})$ for the new variable time $t_{VAR}$ at step 324. When the variable time $t_{VAR}$ is equal to the end time $t_{END}$ at step 328, the optimal shade position procedure 300 exits.

Figure 6A:
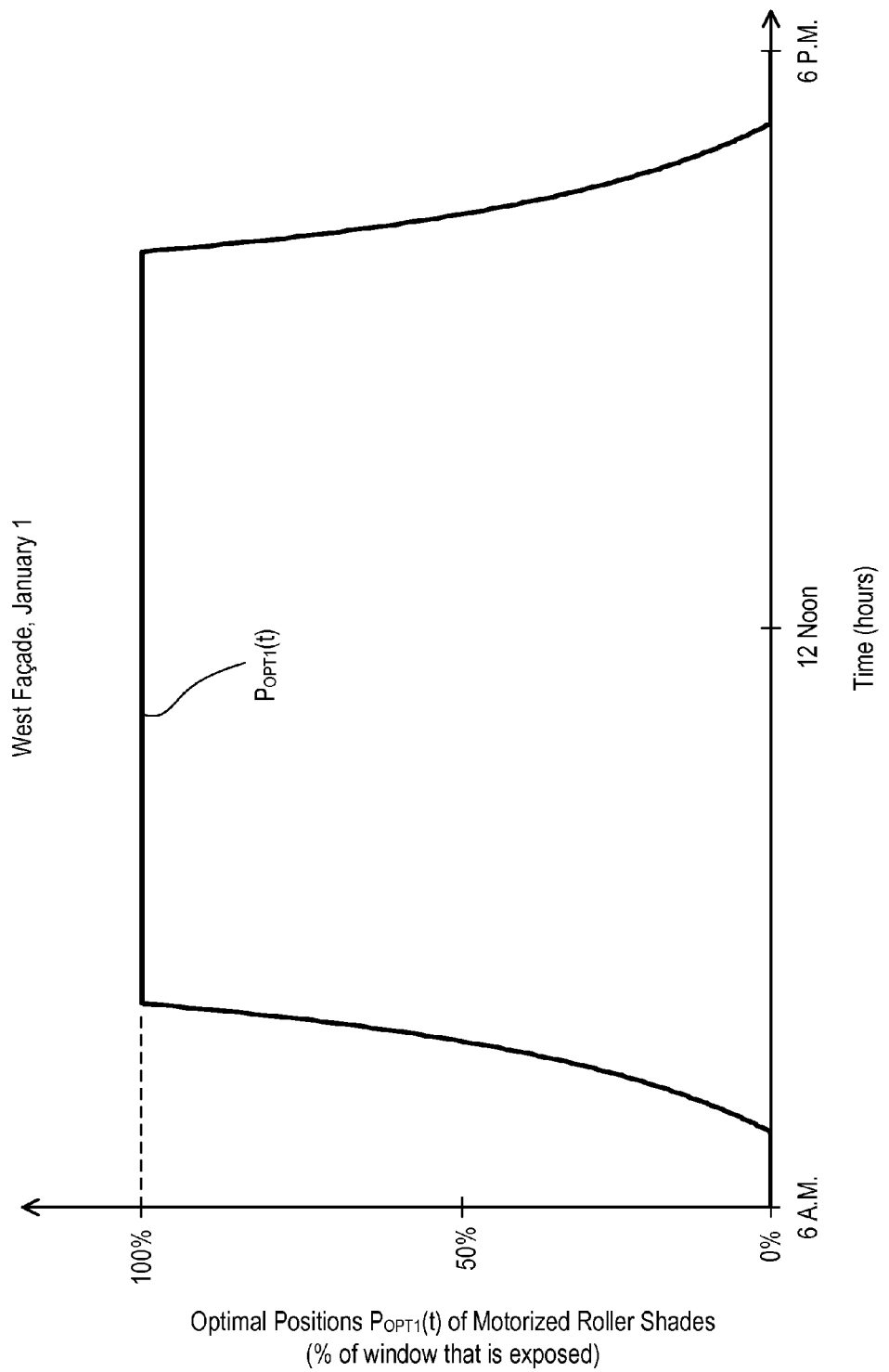
Figure 6B:
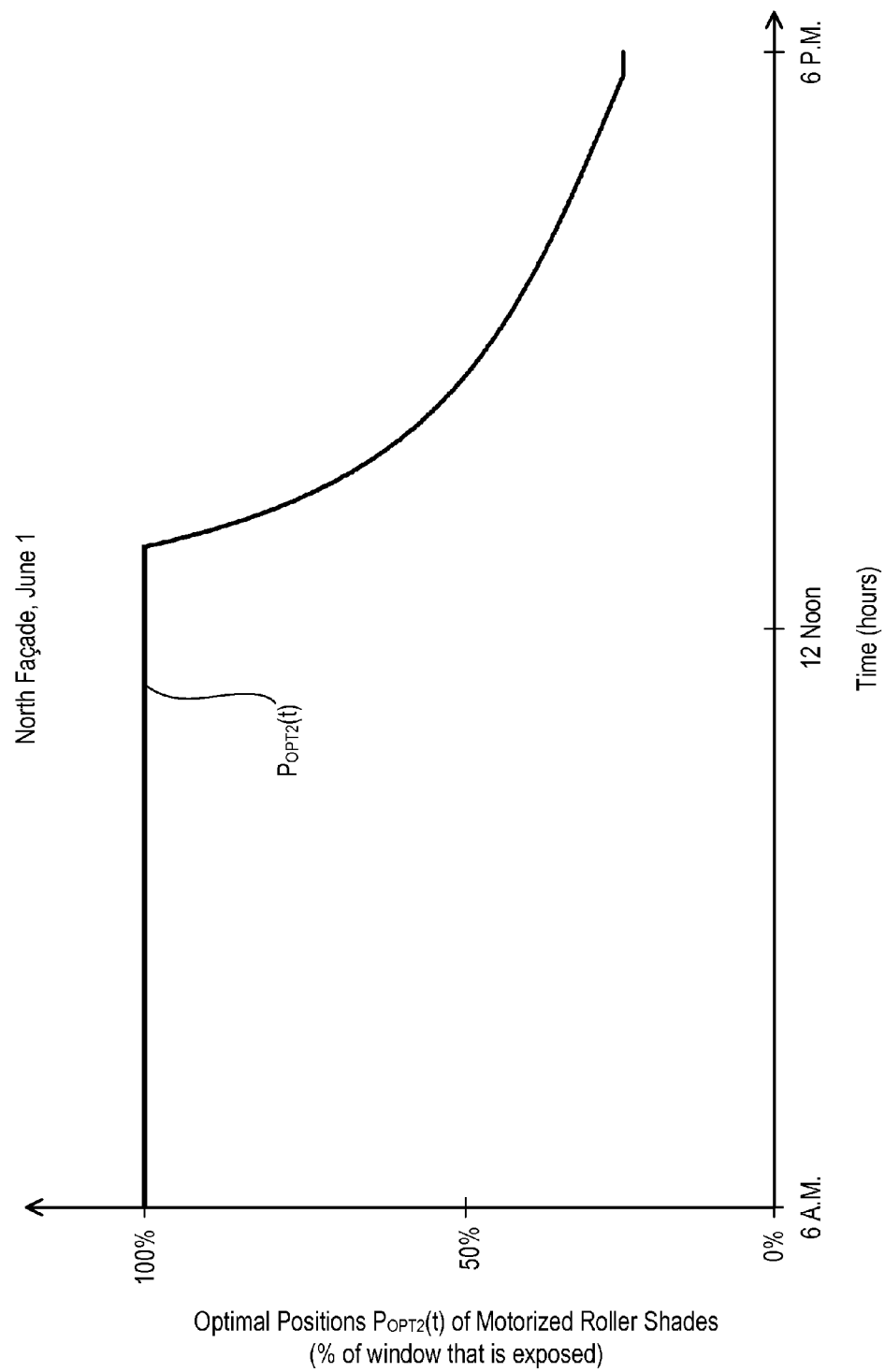

Thus, the controller 150 generates the optimal shade positions $P_{OPT}(t)$ between the start time $t_{START}$ and the end time $t_{END}$ of the shade timeclock schedule using the optimal shade position procedure 300. FIG. 6A shows an example plot of optimal shade positions $P_{OPT1}(t)$ of the motorized roller shades 120 on the west façade of the building on January 1, where the building is located at a longitude $\lambda$ of approximately 75° W and a latitude $\Phi$ of approximately 40° N. FIG. 6B shows an example plot of optimal shade positions $P_{OPT2}(t)$ of the motorized roller shades 120 on the north façade of the building on June 1. FIG. 6C shows an example plot of optimal shade positions $P_{OPT3}(t)$ of the motorized roller shades 120 on the south façade of the building on April 1.

Figure 7:
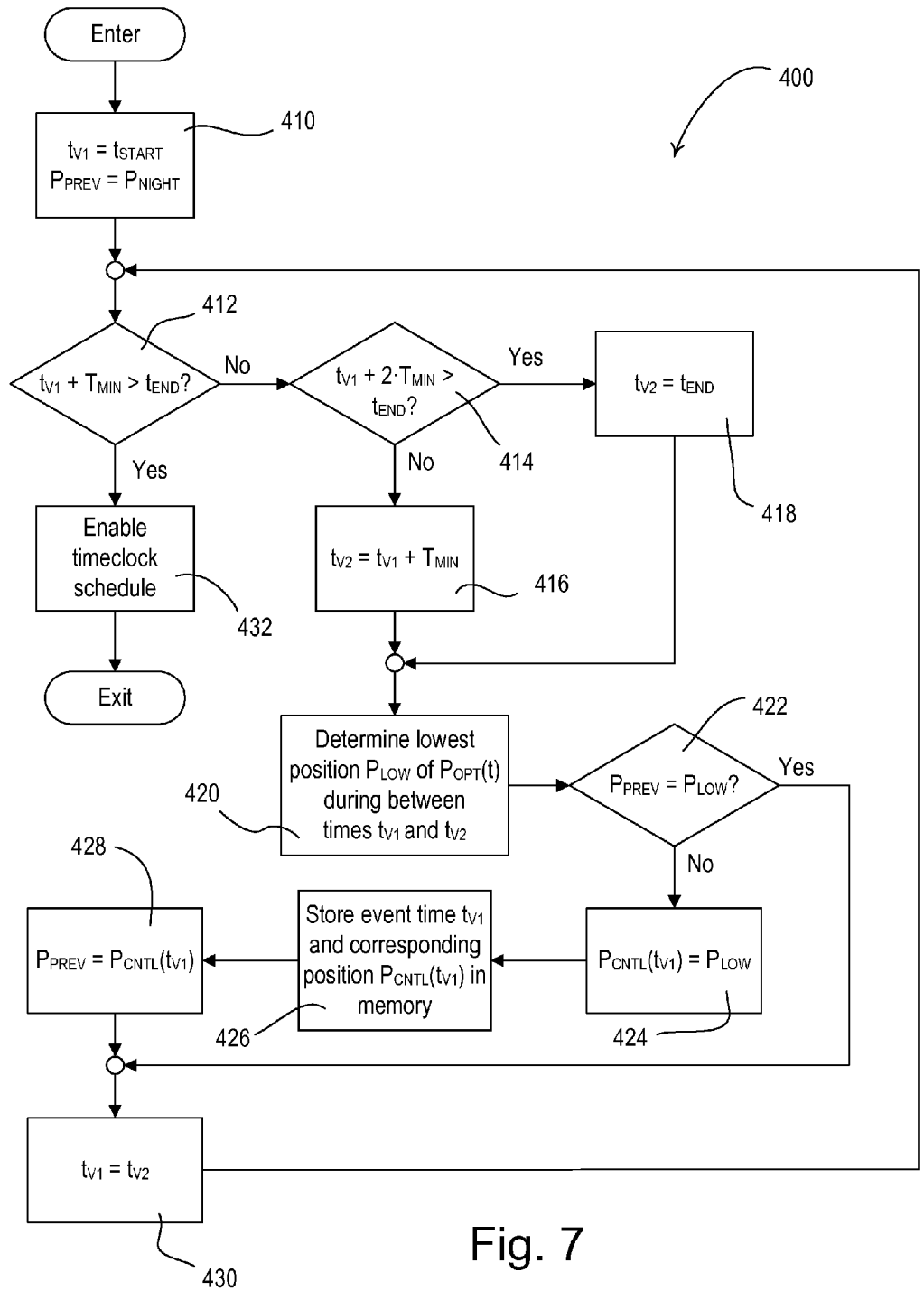
FIG. 7 is a simplified flowchart of a timeclock event creation procedure executed by the controller of the load control system of FIG. 1 according to the first embodiment of the present invention.

FIG. 7 is a simplified flowchart of the timeclock event creation procedure 400, which is executed by the controller 150 in order to generate the events of the shade timeclock schedule according to the first embodiment of the present invention. Since the shade timeclock schedule is split up into a number of consecutive time intervals, the timeclock events of the timeclock schedule are spaced between the start time $t_{START}$ and the end time $t_{END}$ by multiples of the minimum time period $T_{MIN}$ between shade movements, which is selected by the user. During the timeclock event creation procedure 400, the controller 150 generates controlled shade positions $P_{CNTL}(t)$, which comprise a number of discrete events, i.e., step changes in the position of the motorized roller shades at the specific event times. The controller 150 uses the controlled shade positions $P_{CNTL}(t)$ to adjust the position of the motorized roller shades during execution of the shade timeclock schedule. The resulting timeclock schedule includes a number of events, which are each characterized by an event time and a corresponding preset shade position.

The controller 150 uses the controlled shade positions $P_{CNTL}(t)$ to adjust the position of the motorized roller shades 120 during execution of a timeclock execution procedure 900, which will be described in greater detail below with reference to FIG. 13. The timeclock execution procedure 900 is executed by the controller 150 periodically (e.g., once every minute) between the start time $t_{START}$ and the end time $t_{END}$ when the shade timeclock schedule is enabled. The shade timeclock schedule may be disabled, such that the timeclock execution procedure 900 is not executed periodically, when the space 160 is unoccupied or when the controller 150 receives an immediate demand command via the network communication link 156. At the end of the shade timeclock schedule (i.e., at the end time $t_{END}$), the controller 150 controls the position of the motorized roller shades 120 to a nighttime position $P_{NIGHT}$ (e.g., the fully-closed position $P_{FC}$) as will be described in greater detail below with reference to FIG. 13.

Figure 8A:
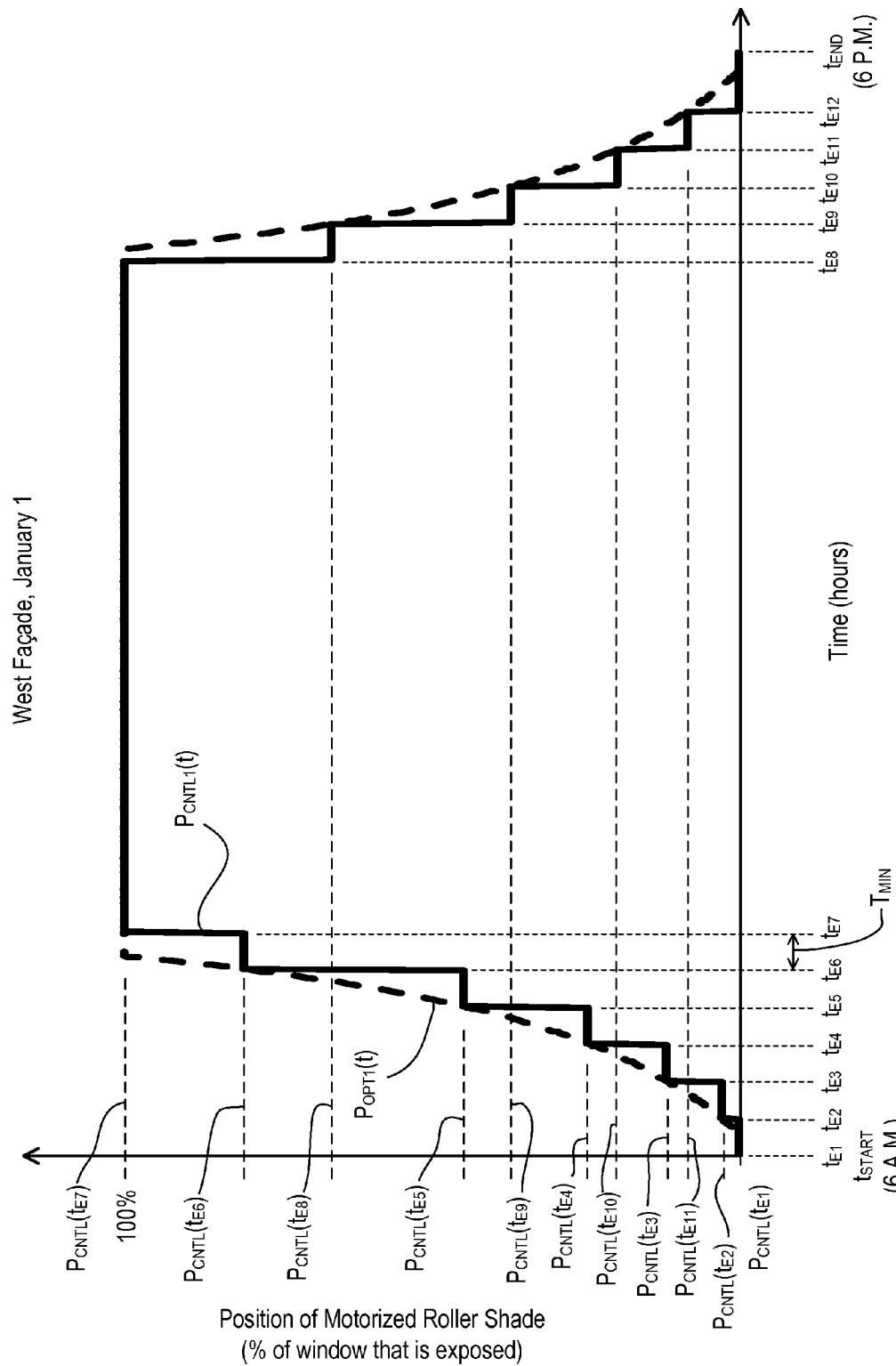
FIGS. 8A-8C show example plots of controlled shade positions of the motorized roller shades of the load control system of FIG. 1 on different facades of the building during different days of the year according to the first embodiment of the present invention.
Figure 8B:
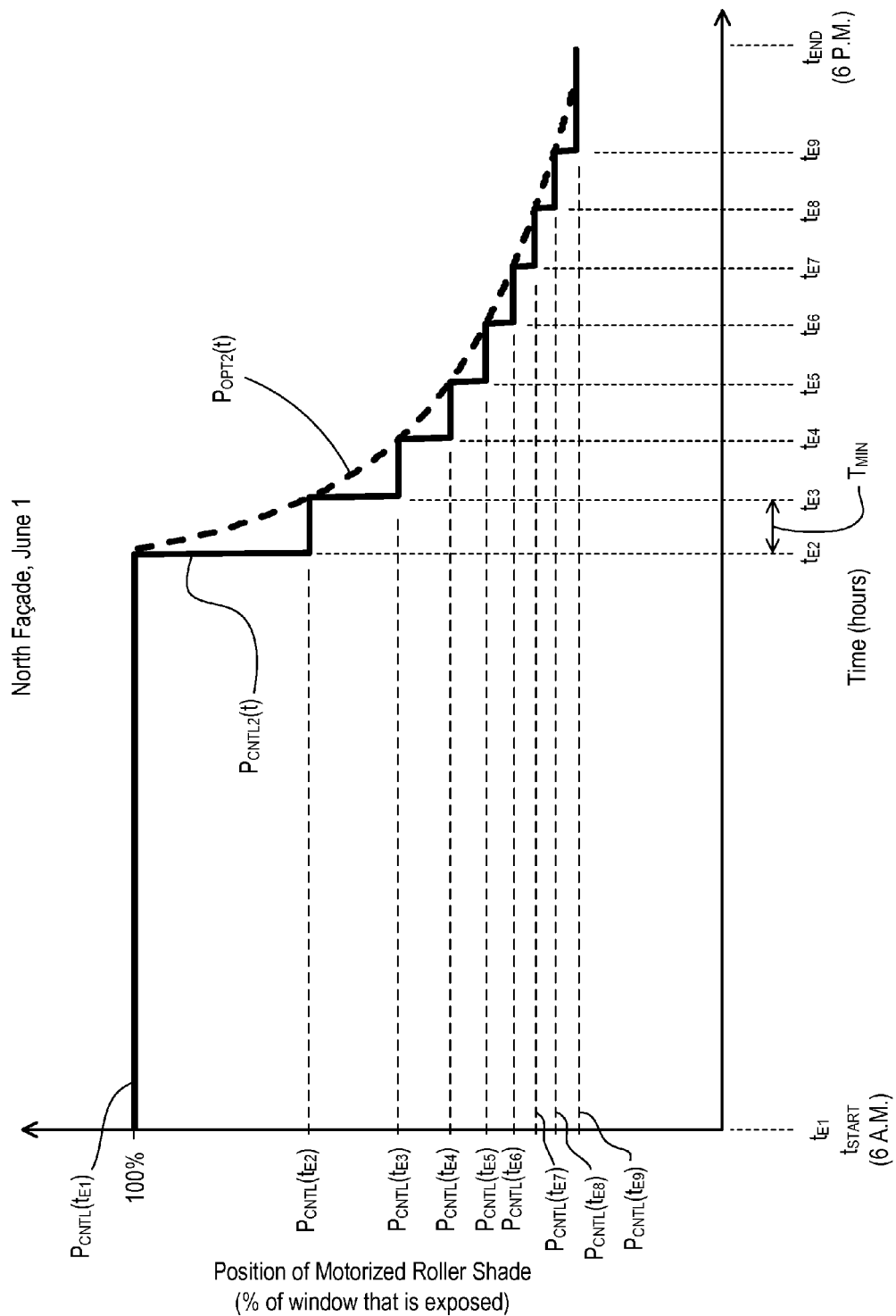
Figure 8C:
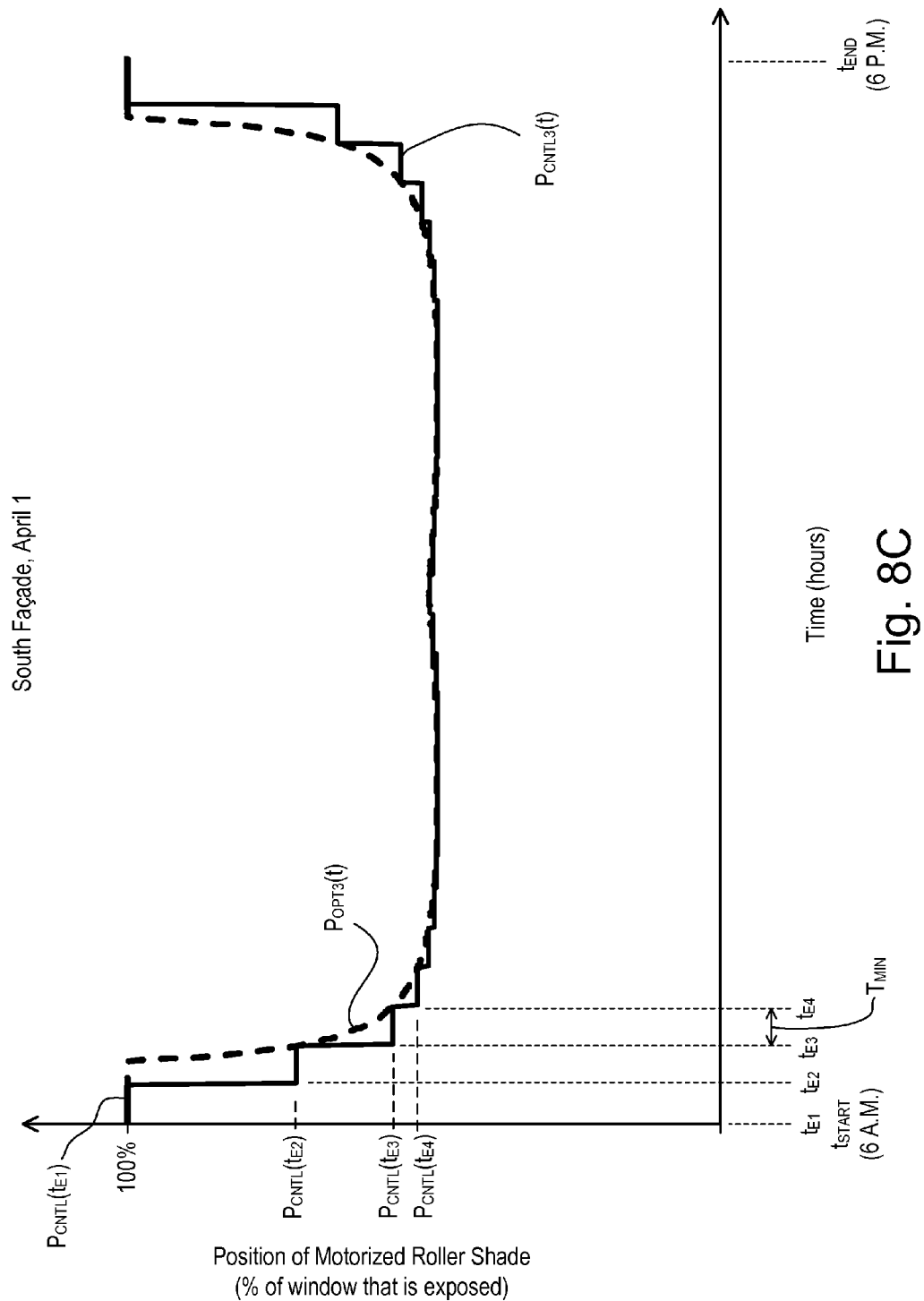

FIG. 8A shows an example plot of controlled shade positions $P_{CNTL1}(t)$ of the motorized roller shades 120 on the west façade of the building on January 1 according to the first embodiment of the present invention. FIG. 8B shows an example plot of controlled shade positions $P_{CNTL2}(t)$ of the motorized roller shades 120 on the north façade of the building on June 1 according to the first embodiment of the present invention. FIG. 8C shows an example plot of controlled shade positions $P_{CNTL3}(t)$ of the motorized roller shades 120 on the south façade of the building on April 1 according to the first embodiment of the present invention.

The controller 150 examines the values of the optimal shade positions $P_{OPT}(t)$ during each of the time intervals of the shade timeclock schedule (i.e., the time periods between two consecutive timeclock events) to determine a lowest shade position $P_{LOW}$ during each of the time intervals. During the timeclock event creation procedure 400, the controller 150 uses two variable times $t_{V1}$, $t_{V2}$ to define the endpoints of the time interval that the controller is presently examining. The controller 150 uses the variable times $t_{V1}$, $t_{V2}$ to sequentially step through the events of the shade timeclock schedule, which are spaced apart by the minimum time period $T_{MIN}$ according to the first embodiment of the present invention. The lowest shade positions $P_{LOW}$ during the respective time intervals becomes the controlled shade positions $P_{CNTL}(t)$ of the timeclock events, which have event times equal to the beginning of the respective time interval (i.e., the first variable time $t_{V1}$).

Referring to FIG. 7, the controller 150 sets the first variable time $t_{V1}$ equal to the start time $t_{START}$ of the shade timeclock schedule at step 410. The controller 150 also initializes a previous shade position $P_{PREV}$ to the nighttime position $P_{NIGHT}$ at step 610. If there is enough time left before the end time $t_{END}$ for the present timeclock event (i.e., if the first variable time $t_{V1}$ plus the minimum time period $T_{MIN}$ is not greater than the end time $t_{END}$) at step 412, the controller 150 determines at step 414 if there is enough time for another timeclock event in the shade timeclock schedule after the present timeclock event. If the first variable time $t_{V1}$ plus two times the minimum time period $T_{MIN}$ is not greater than the end time $t_{END}$ at step 414, the controller 150 sets the second variable time $t_{V2}$ equal to the first variable time $t_{V1}$ plus the minimum time period $T_{MIN}$ at step 416, such that the controller 150 will then examine the time interval between the first and second variable times $t_{V1}$, $t_{V2}$. If the first variable time $t_{V1}$ plus two times the minimum time period $T_{MIN}$ is greater than the end time $t_{END}$ at step 414, the controller 150 sets the second variable time $t_{V2}$ equal to the end time $t_{END}$ at step 418, such that the controller 150 will then examine the time interval between the first variable time $t_{V1}$ and the end time $t_{END}$.

At step 420, the controller 150 determines the lowest shade position $P_{LOW}$ of the optimal shade positions $P_{OPT}(t)$ during the present time interval (i.e., between the first variable time $t_{V1}$ and the second variable time $t_{V2}$ determined at steps 416 and 418). If, at step 422, the previous shade position $P_{PREV}$ is not equal to the lowest shade position $P_{LOW}$ during the present time interval (as determined at step 420), the controller 150 sets the controlled shade position $P_{CNTL}(t_{V1})$ at the first variable time $t_{V1}$ to be equal to the lowest shade position $P_{LOW}$ of the optimal shade positions $P_{OPT}(t)$ during the present time interval at step 424. The controller 150 then stores in memory a timeclock event having the event time $t_{V1}$ and the corresponding controlled position $P_{CNTL}(t_{V1})$ at step 426 and sets the previous shade position $P_{PREV}$ equal to the new controlled position $P_{CNTL}(t_{V1})$ at step 428. If, at step 422, the previous shade position $P_{PREV}$ is equal to the lowest shade position $P_{LOW}$ during the present time interval, the controller 150 does not create a timeclock event at the first variable time $t_{V1}$. The controller 150 then begins to examine the next time interval by setting the first variable time $t_{V1}$ equal to the second variable time $t_{V2}$ at step 430. The timeclock event creation procedure 400 loops around such that the controller 150 determines if there is enough time left before the end time $t_{END}$ for the present timeclock event at step 412. If the first variable time $t_{V1}$ plus the minimum time period $T_{MIN}$ is greater than the end time $t_{END}$ at step 412, the controller enables the shade timeclock schedule at step 432 and the timeclock event creation procedure 400 exits.

Figure 9:
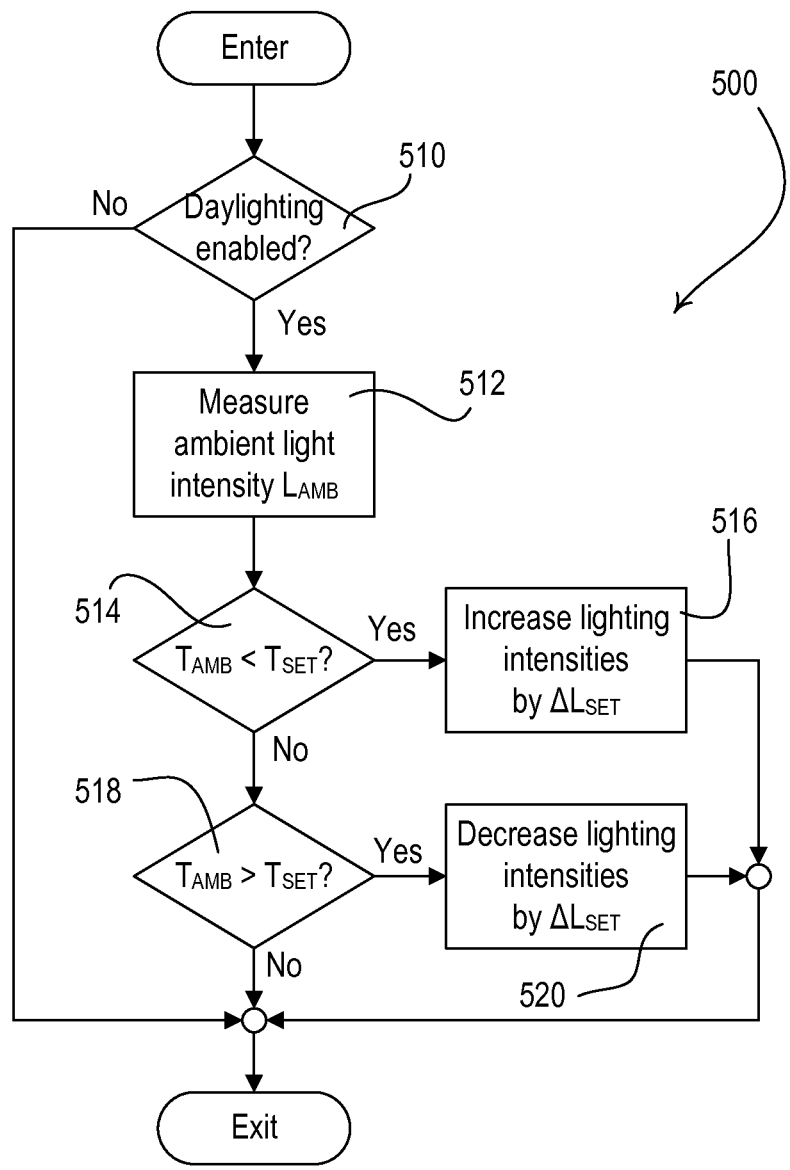
FIG. 9 is a simplified flowchart of a daylighting procedure executed periodically by the controller of the load control system of FIG. 1 when daylighting is enabled.

FIG. 9 is a simplified flowchart of a daylighting procedure 500, which is executed periodically by the controller 150 (e.g., once every second) when daylighting (i.e., control of the lighting loads 112 in response to the ambient light intensity $L_{AMB}$ measured by the daylight sensor 154) is enabled at step 510. When daylighting is not enabled at step 510, the daylighting procedure 500 simply exits. When daylighting is enabled at step 510, the controller 150 causes the daylight sensor 154 to measure the ambient light intensity $L_{AMB}$ at step 512. If the measured ambient light intensity $L_{AMB}$ is less than a setpoint (i.e., target) intensity $L_{SET}$ at step 514, the controller 150 controls the lighting control device 110 to increase the present lighting intensity $L_{PRES}$ of each of the lighting loads 112 by a predetermined value $\Delta L_{SET}$ (e.g., approximately 1%) at step 516 and the daylighting procedure 500 exits. If the measured ambient light intensity $L_{AMB}$ is greater than the setpoint intensity $L_{SET}$ at step 518, the controller 150 decreases the present lighting intensity $L_{PRES}$ of each of the lighting loads 112 by the predetermined value $\Delta L_{SET}$ at step 520 and the daylighting procedure 500 exits. If the measured ambient light intensity $L_{AMB}$ is not less than the setpoint intensity $L_{SET}$ at step 514 and is not greater than the setpoint intensity $L_{SET}$ at step 518 (i.e., the ambient light intensity $L_{AMB}$ is equal to the setpoint intensity $L_{SET}$), the daylighting procedure 500 simply exits without adjusting the present lighting intensity $L_{PRES}$ of each of the lighting loads 112.

Figure 10A:
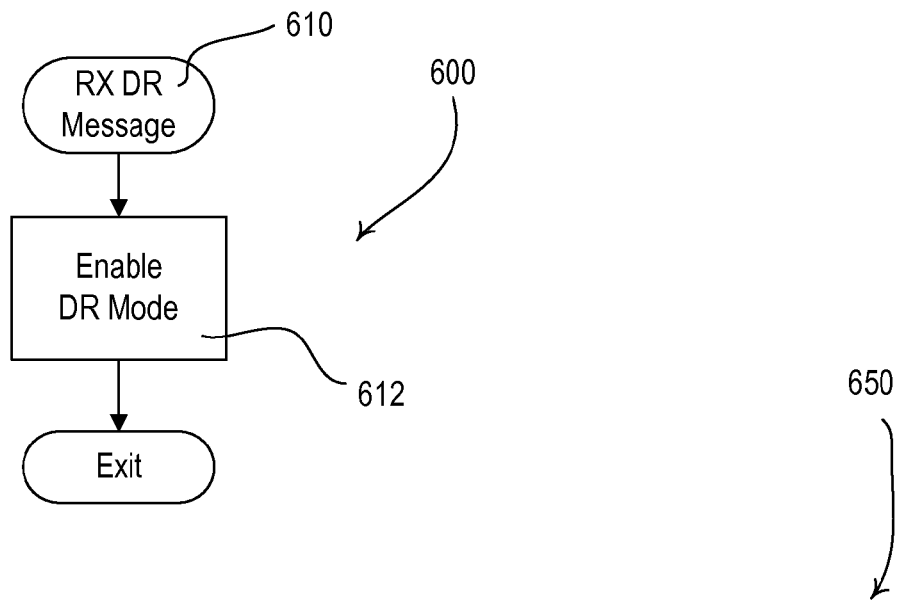
FIG. 10A is a simplified flowchart of a demand response message procedure executed by the controller of the load control system of FIG. 1 according to the first embodiment of the present invention.

FIG. 10A is a simplified flowchart of a demand response message procedure 600, which is executed by the controller 150 in response to receiving an immediate demand response command via the network communication link 156 at step 610. Whenever an immediate demand response command is received at step 610, the controller 150 simply enables a demand response (DR) mode at step 612, before the demand response message procedure 600 exits.

Figure 10B:
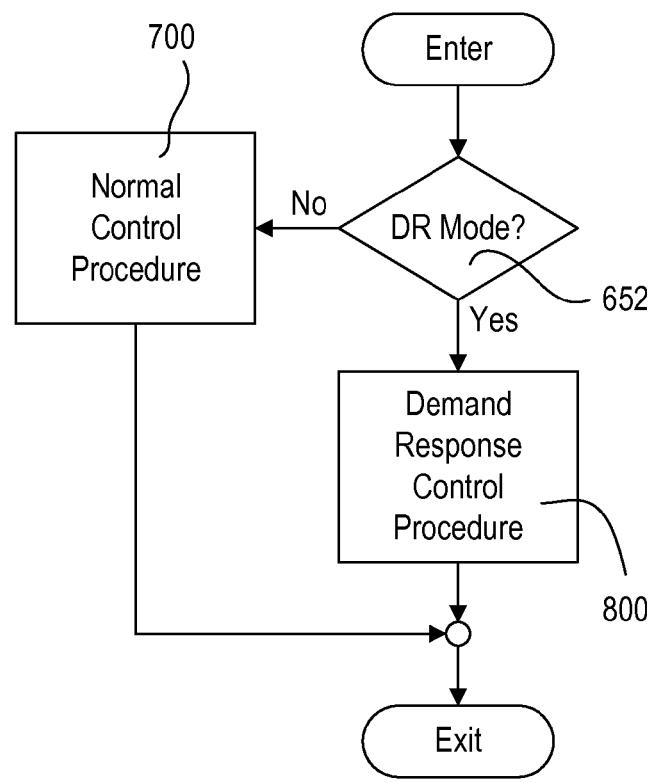
FIG. 10B is a simplified flowchart of a load control procedure executed periodically by the controller of the load control system of FIG. 1 according to the first embodiment of the present invention.

FIG. 10B is a simplified flowchart of a load control procedure 650, which is executed by the controller 150 periodically, e.g., every minute. If the demand response mode is not enabled at step 652, the controller 150 executes a normal control procedure 700 for controlling the lighting control devices 110, the motorized roller shades 120, the temperature control devices 130, and the controllable electrical receptacles 140 during a normal mode of operation, e.g., to maximize the comfort of the occupants of the spaces 160 of the building. On the other hand, if the demand response mode is enabled at step 652 (i.e., in response to receiving an immediate demand response command during the demand response message procedure 600), the controller 150 executes a demand response control procedure 800 for controlling the lighting control devices 110, the motorized roller shades 120, the temperature control devices 130, and the controllable electrical receptacles 140 to decrease the energy consumption of the load control system 100, while maintaining the comfort of the occupants of the spaces 160 of the building at acceptable levels. During the normal control procedure 700 and the demand response command procedure 800, the controller 150 controls the lighting control devices 110, the motorized roller shades 120, the temperature control devices 130, and the controllable electrical receptacles 140 in the different spaces 160 (or areas) of the building on an area-by-area basis. For example, the controller 150 may control the lighting control devices 110, the motorized roller shades 120, the temperature control device 130, and the controllable electrical receptacles 140 in a specific area differently depending upon whether the area is occupied or not.

Figure 11:
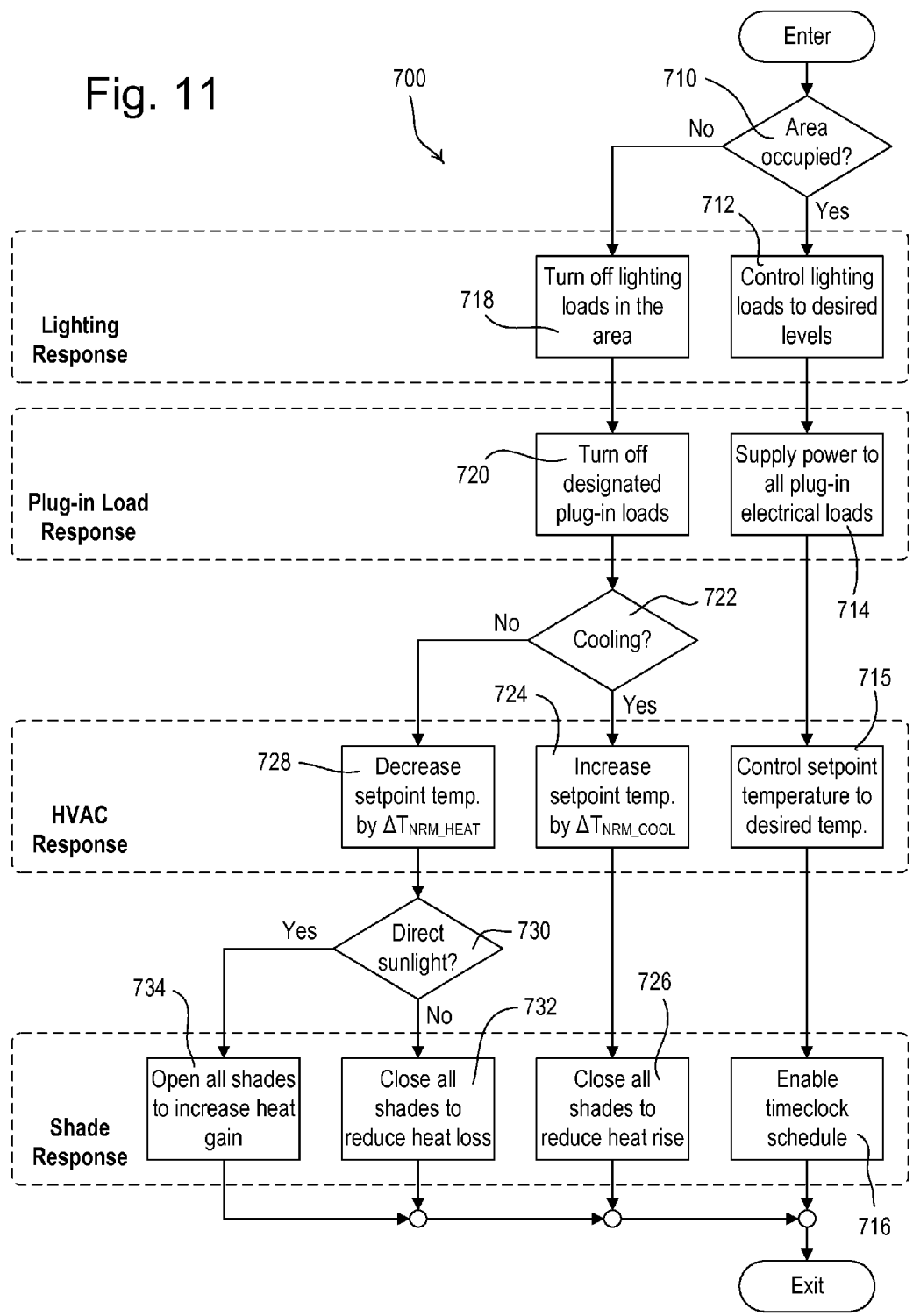
FIG. 11 is a simplified flowchart of a normal control procedure executed by the controller of the load control system of FIG. 1 according to the first embodiment of the present invention.

FIG. 11 is a simplified flowchart of the normal control procedure 700 executed periodically by the controller 150 when the controller is operating in the normal mode of operation (i.e., every minute). If the area is occupied at step 710, the controller 150 transmits at step 712 one or more digital messages to the lighting control devices 110 so as to adjust the intensities of the lighting loads 112 to the user-specified desired lighting intensity levels $L_{DES}$ (e.g., as determined in response to actuations of the first set of buttons 114 of the lighting control devices 110). At step 714, the controller 150 transmits digital messages to the controllable electrical receptacles 140 to supply power to all of the plug-in electrical loads 142 in the area. Next, the controller 150 transmits a digital message to the temperature control device 130 at step 715 to control the setpoint temperature $T_{SET}$ to the user-specified desired temperature $T_{DES}$ (e.g., as determined in response to actuations of the raise and lower temperature buttons 136, 138 of the temperature control device 130). Finally, the controller 150 enables the shade timeclock schedule (as created during the timeclock event creation procedure 400) at step 716, and the normal control procedure 700 exits. Accordingly, shortly after the normal control procedure 700 exits, the timeclock execution procedure 900 will be executed in order to adjust the positions of the motorized roller shades 120 to the controlled positions $P_{CNTL}(t)$ determined in the timeclock event creation procedure 400. In addition, the timeclock execution procedure 900 will be executed periodically until the shade timeclock schedule is disabled.

If the area is unoccupied at step 710, the controller 150 turns off the lighting load 112 in the area at step 718 and turns off designated (i.e., some) plug-in electrical loads 142 at step 720. For example, the designated plug-in electrical loads 142 that are turned off in step 720 may comprise table lamps, floor lamps, printers, fax machines, water heaters, water coolers, and coffee makers. However, other non-designated plug-in electrical loads 142 are not turned off in step 720, such as, personal computers, which remain powered even when the area is unoccupied. If the HVAC system 132 is presently cooling the building at step 722, the controller 150 increases the setpoint temperature $T_{SET}$ of the temperature control device 130 by a predetermined increment $\Delta T_{NRM\_COOL}$ (e.g., approximately 2° F.) at step 724, such that the setpoint temperature $T_{SET}$ is controlled to a new setpoint temperature $T_{NEW}$, i.e., $$T_{NEW}=T_{SET}+\Delta T_{NRM\_COOL}. \quad \text{(Equation 13)}$$

The HVAC system 132 thus consumes less power when the area is unoccupied and the setpoint temperature $T_{SET}$ is increased to the new setpoint temperature $T_{NEW}$.

The controller 150 then transmits digital messages to the electronic drive units 126 of the motorized roller shades 120 to move all of the shade fabrics 122 to the fully-closed positions at step 726. The controller 150 also disables the shade timeclock schedule at step 726, before the normal control procedure 700 exits. Since the shade fabrics 122 will be completely covering the windows, the shade fabrics will block daylight from entering the building and thus the shade fabrics prevent daylight from heating the building. Accordingly, the HVAC system 132 will consume less power when the motorized roller shades 120 are closed.

If the HVAC system 132 is presently heating the building at step 722, the controller 150 decreases the setpoint temperature $T_{SET}$ of the temperature control device 130 by a predetermined increment $\Delta T_{NRM\_HEAT}$ (e.g., approximately 2° F.) at step 728, such that the setpoint temperature $T_{SET}$ is controlled to the new setpoint temperature $T_{NEW}$, i.e., $$T_{NEW}=T_{SET}-\Delta T_{NRM\_HEAT}. \quad \text{(Equation 14)}$$

Thus, the HVAC system 132 consumes less power when the area is unoccupied and the setpoint temperature $T_{SET}$ is decreased to the new setpoint temperature $T_{NEW}$ during the winter months.

Before adjusting the positions of the motorized roller shades 120, the controller 150 first determines at step 730 if the façade 164 of the windows in the area may be receiving direct sunlight, e.g., using the Equations 1-12 shown above. If the façade 164 of the area is not receiving direct sunlight at step 730, the controller 150 causes the electronic drive units 126 of the motorized roller shades 120 to move all of the shade fabrics 122 to the fully-closed positions and disables the shade timeclock schedule at step 732, such that the shade fabrics provide additional insulation for the building. Accordingly, the shade fabrics 122 will prevent some heat loss leaving the building and the HVAC system 132 may consume less power. However, if the façade 164 of the area may be receiving direct sunlight at step 730, the controller 150 controls the motorized roller shade 120 to the fully-open positions disables the shade timeclock schedule at step 734 in order to take advantage of the potential heat gain through the windows due to the direct sunlight. Rather than using the Equations 1-12 shown above to calculate whether the window may or may not be receiving direct sunlight, the load control system 100 may alternatively comprise one or more photosensors mounted adjacent the windows in the space to determine if the window is receiving direct sunlight.

Figure 12A:
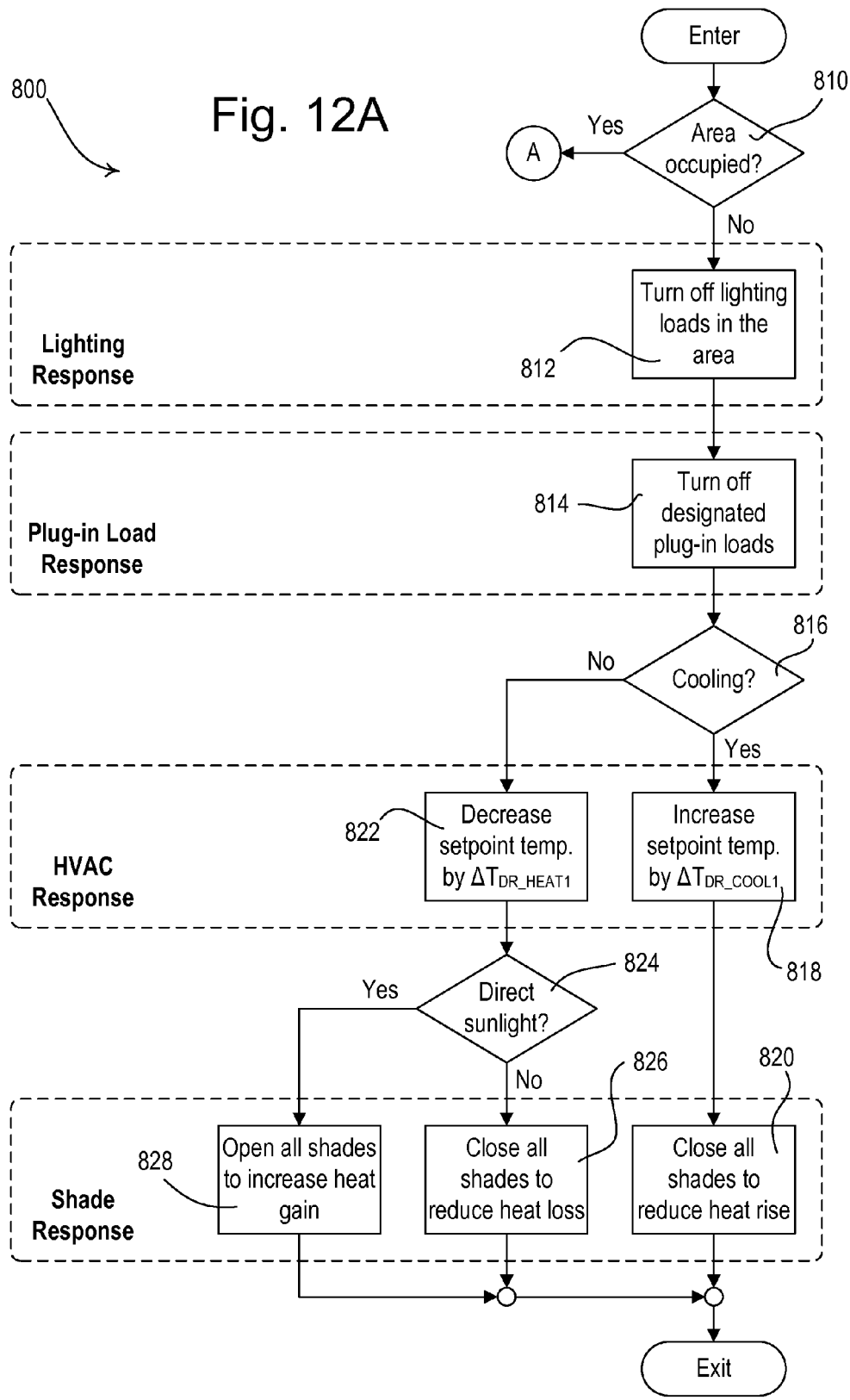
FIGS. 12A and 12B are simplified flowcharts of a demand response control procedure executed by the controller of the load control system of FIG. 1 according to the first embodiment of the present invention.
Figure 12B:
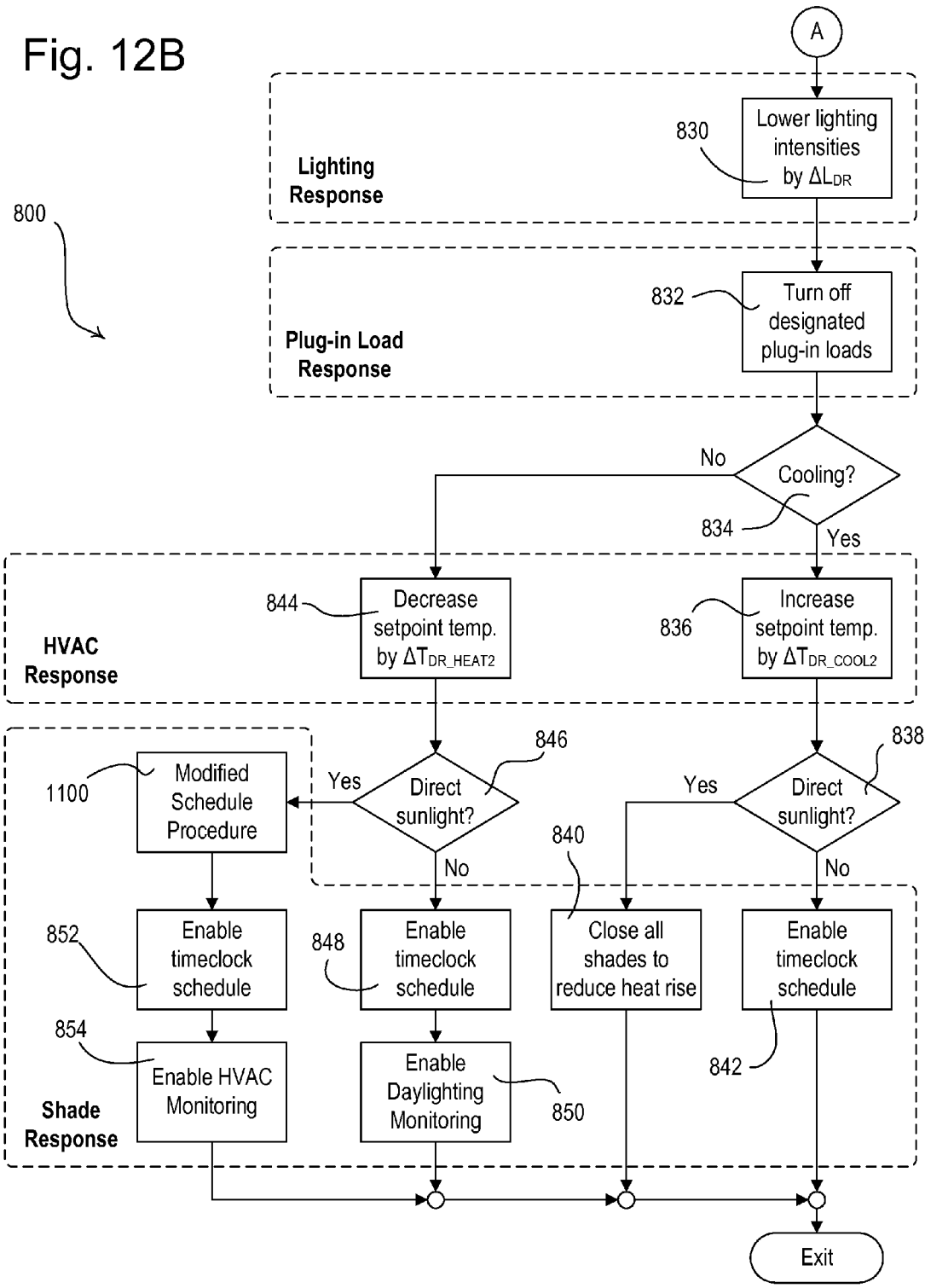

FIGS. 12A and 12B are simplified flowcharts of the demand response control procedure 800 executed periodically by the controller 150 when the controller is operating in the demand response mode of operation (i.e., once every minute after a demand response command is received). If the area is not occupied at step 810, the controller 150 turns off the lighting loads 112 in the area at step 812 and turns off the designated plug-in electrical loads 142 at step 814. If the HVAC system 132 is presently cooling the building at step 816, the controller 150 increases the setpoint temperature $T_{SET}$ of each of the temperature control devices 130 by a predetermined increment $\Delta T_{DR\_COOL1}$ (e.g., approximately 3° F.) at step 818. The controller 150 then controls the motorized roller shades 120 to the fully-closed positions and disables the shade timeclock schedule at step 820, such that the HVAC system 132 will consume less power.

If the HVAC system 132 is presently heating the building at step 816, the controller 150 decreases the setpoint temperatures $T_{SET}$ of each of the temperature control devices 130 by a predetermined increment $\Delta T_{DR\_HEAT1}$ (e.g., approximately 3° F.) at step 822. If the façade 164 of the area is not receiving direct sunlight at step 824, the controller 150 moves all of the motorized roller shades 120 to the fully-closed positions to provide additional insulation for the building and disables the shade timeclock schedule at step 826, such that the HVAC system 132 will consume less power. If the façade 164 of the area may be receiving direct sunlight at step 824, the controller 150 controls the motorized roller shade 120 to the fully-open positions at step 828 in order to take advantage of the potential heat gain through the windows due to the direct sunlight. The controller 150 also disables the shade timeclock schedule at step 828, before the demand response control procedure 800 exits.

Referring to FIG. 12B, if the area is occupied at step 810, the controller 150 transmits at step 830 one or more digital messages to the lighting control devices 110 to lower the present lighting intensities $L_{PRES}$ of each of the lighting loads 112 by a predetermined percentage $\Delta L_{DR}$ (e.g., by approximately 20% of the present lighting intensity $L_{PRES}$). The lighting control device 110 fades the present lighting intensity $L_{PRES}$ of each of the lighting loads 112 over a first fade time period (e.g., approximately thirty seconds) to a new lighting intensity $L_{NEW}$, i.e., $$L_{NEW}=\Delta L_{AR} \cdot L_{PRES}. \quad \text{(Equation 15)}$$

Accordingly, when operating at the new reduced lighting intensities $L_{NEW}$, the lighting loads 112 consume less power. Alternatively, the controller 150 may decrease the setpoint light intensity $L_{SET}$ of the space 160 by a predetermined percentage $\Delta L_{SET-DR}$ at step 830.

Next, the controller 150 turns off the designated plug-in electrical loads 142 at step 832. If the HVAC system 132 is presently cooling the building at step 834, the controller 150 increases the setpoint temperatures $T_{SET}$ of each of the temperature control devices 130 by a predetermined increment $\Delta T_{DR\_COOL2}$ (e.g., approximately 2° F.) at step 836. If the façade 164 of the area may be receiving direct sunlight at step 838, the controller 150 controls the motorized roller shade 120 to the fully-closed positions at step 840 in order to reduce heat rise in the area. If the façade 164 of the area is not receiving direct sunlight at step 838, the controller 150 enables the shade timeclock schedule at step 842, such that the timeclock execution procedure 900 will be executed periodically to adjust the positions of the motorized roller shades 120 to the controlled positions $P_{CNTL}(t)$ after the demand response control procedure 800 exits.

If the HVAC system 132 is presently heating the building at step 834, the controller 150 decreases the setpoint temperatures $T_{SET}$ of each of the temperature control devices 130 by a predetermined increment $\Delta T_{DR\_HEAT2}$ (e.g., approximately 2° F.) at step 844. If the façade 164 of the area is not receiving direct sunlight at step 846, the controller 150 enables the shade timeclock schedule at step 848, such that the timeclock execution procedure 900 will be executed to control the positions of the motorized roller shades 120 to the controlled positions $P_{CNTL}(t)$ after the demand response control procedure 800 exits. The controller 150 then enables daylighting monitoring (DM) at step 850 by initializing a daylighting monitoring (DM) timer (e.g., to approximately one minute) and starting the timer decreasing in value with respect to time.

When the daylighting monitoring timer expires, the controller 150 will execute a daylighting monitoring (DM) procedure 1000 if the daylighting procedure 500 (as shown in FIG. 9) is causing the load control system 100 to save energy. Specifically, the controller 150 determines if providing daylight in the area by controlling the motorized roller shades 120 to the controlled positions $P_{CNTL}(t)$ of the timeclock schedule has resulted in energy savings in the amount of energy consumed by the lighting loads 112 (as compared to the energy consumed by the lighting loads when the motorized roller shades are fully closed). The daylighting monitoring timer is initialized to an amount of time that is appropriate to allow the lighting control devices 110 to adjust the intensities of the lighting loads 112 in response to the ambient light intensity $L_{AMB}$ measured by the daylight sensor 154. The daylighting monitoring procedure 1000 will be described in greater detail below with reference to FIG. 14.

If the façade 164 of the area may be receiving direct sunlight at step 846, the controller 150 executes a modified schedule procedure 1100 (which will be described in greater detail below with reference to FIG. 15A) to temporarily increase the desired maximum sunlight penetration distance $d_{MAX}$ by a predetermined amount $\Delta d_{MAX}$ (e.g., by approximately 50%) and to generate a modified timeclock schedule at the modified maximum sunlight penetration distance $d_{MAX}$. The controller 150 then enables the shade timeclock schedule at step 852, such that the controller will adjust the positions of the motorized roller shades 120 to the modified controlled positions $P_{CNTL}(t)$ as determined during the modified schedule procedure 1100 when the timeclock execution procedure 900 is executed after the demand response control procedure 800 exits. Since the desired maximum sunlight penetration $d_{MAX}$ has been increased, the sunlight will penetrate deeper into the space 160 using the modified controlled positions $P_{CNTL}(t)$ determined during the modified schedule procedure 1100.

Referring back to FIG. 12B, after executing the modified schedule procedure 1100, the controller 150 enables HVAC monitoring at step 854 by initializing an HVAC monitoring timer (e.g., to approximately one hour) and starting the timer decreasing in value with respect to time. When the HVAC monitoring timer expires, the controller 150 will execute an HVAC monitoring procedure 1150 to determine if the modified controlled positions $P_{CNTL}(t)$ of the motorized roller shades 120 have resulted in energy savings in the amount of energy consumed by the HVAC system 132. The HVAC monitoring procedure 1150 will be described in greater detail below with reference to FIG. 15B. After enabling HVAC monitoring at step 854, the demand response control procedure 800 exits.

As previously mentioned, the load control procedure 650 is executed periodically by the controller 150. During the first execution of the load control procedure 650 after a change in state of the load control system 100 (e.g., in response to receiving a demand response command, detecting an occupancy or vacancy condition, or determining that one of the façades 164 may be receiving direct sunlight or not), the controller 150 is operable to lower the lighting intensities of the lighting loads 112 by the predetermined percentage $\Delta L_{DR}$ (e.g., at step 830) or to adjust the setpoint temperatures $T_{SET}$ of the temperature control devices 130 by predetermined amounts (e.g., at steps 724, 728, 818, 822, 836, 844). However, during subsequent executions of the load control procedure 650, the controller 150 does not continue lowering the lighting intensity of the lighting loads 112 by the predetermined percentage $\Delta L_{DR}$ (at step 830), or adjusting the setpoint temperatures $T_{SET}$ by predetermined amounts (at steps 724, 728, 818, 822, 836, 844). In addition, the controller 150 only executes the modified schedule procedure 1100 and enables daylighting monitoring (at step 850) or HVAC monitoring (at step 854) the first time that the load control procedure 650 is executed after a change in state of the load control system 100.

Figure 13:
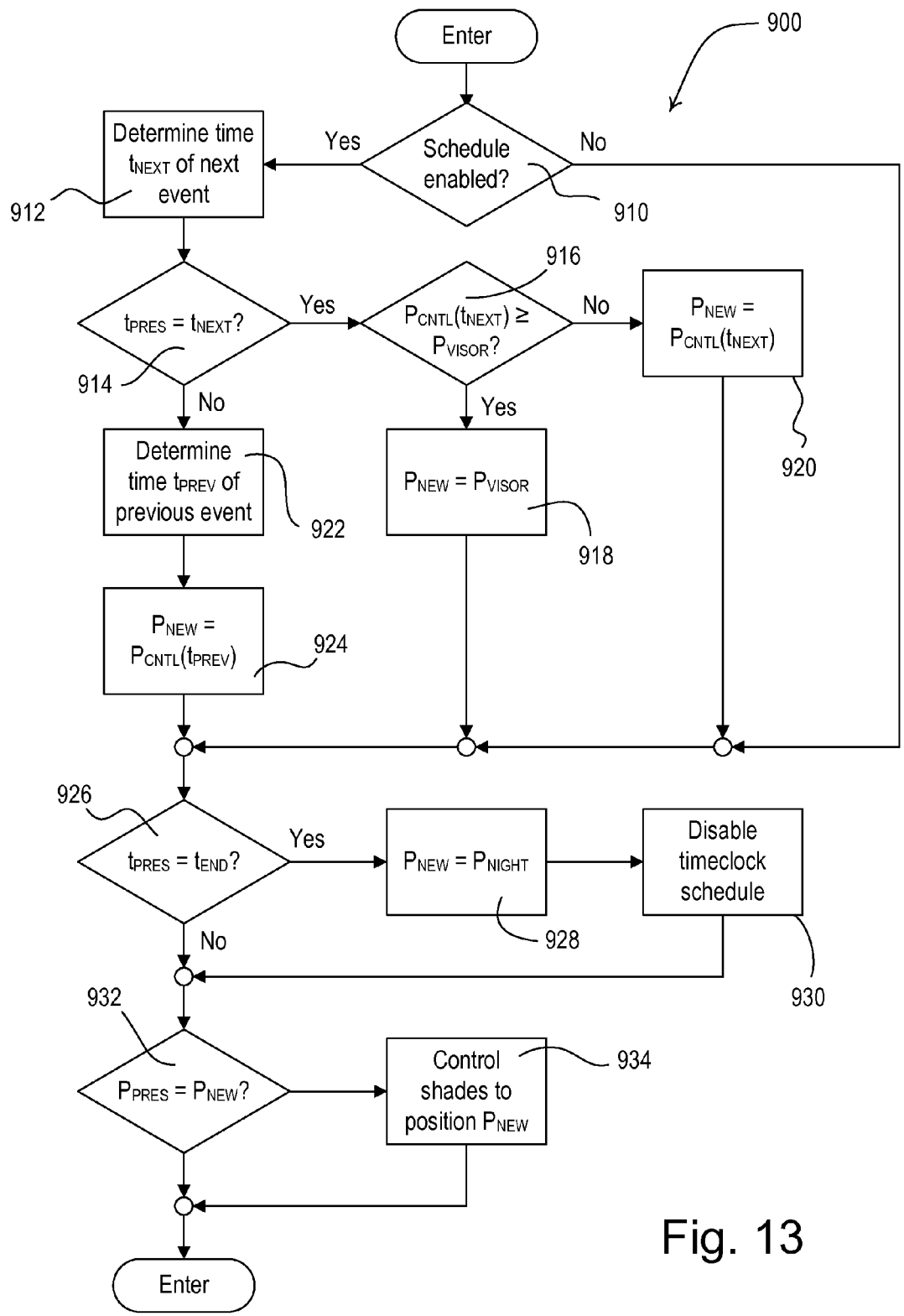
FIG. 13 is a simplified flowchart of a timeclock execution procedure executed periodically by the controller of the load control system of FIG. 1 according to the first embodiment of the present invention.

FIG. 13 is a simplified flowchart of the timeclock execution procedure 900, which is executed by the controller 150 periodically, i.e., every minute between the start time $t_{START}$ and the end time $t_{END}$ of the shade timeclock schedule. Since there may be multiple timeclock schedules for the motorized roller shades 120, the controller 150 may execute the timeclock execution procedure 900 multiple times, e.g., once for each shade timeclock schedule. During the timeclock execution procedure 900, the controller 150 adjusts the positions of the motorized roller shades 120 to the controlled positions $P_{CNTL}(t)$ determined in the timeclock event creation procedure 400 (or alternatively the modified controlled positions $P_{CNTL}(t)$ determined in the modified schedule procedure 1100).

In some cases, when the controller 150 controls the motorized roller shades 120 to the fully-open positions $P_{FO}$ (i.e., when there is no direct sunlight incident on the façade 164), the amount of daylight entering the space 160 (e.g., due to sky luminance from light reflected off of clouds or other objects) may be unacceptable to a user of the space. Therefore, the controller 150 is operable to have a visor position $P_{VISOR}$ enabled for one or more of the spaces 160 or façades 164 of the building. The visor position $P_{VISOR}$ defines the highest position to which the motorized roller shades 120 will be controlled during the shade timeclock schedule. The visor position $P_{VISOR}$ is typically lower than the fully-open position $P_{FO}$, but may be equal to the fully-open position. The position of the visor position $P_{VISOR}$ may be entered using the GUI software of the PC. In addition, the visor position $P_{VISOR}$ may be enabled and disabled for each of the spaces 160 or façades 164 of the building using the GUI software of the PC.

Referring to FIG. 13, if the timeclock schedule is enabled at step 910, the controller 150 determines the time $t_{NEXT}$ of the next timeclock event from the shade timeclock schedule at step 912. If the present time $t_{PRES}$ (e.g., determined from the astronomical timeclock) is equal to the next event time $t_{NEXT}$ at step 914 and the controlled position $P_{CNTL}(t_{NEXT})$ at the next event time $t_{NEXT}$ is greater than or equal to the visor position $P_{VISOR}$ at step 916, the controller 150 sets a new shade position $P_{NEW}$ equal to the visor position $P_{VISOR}$ at step 918. If the controlled position $P_{CNTL}(t_{NEXT})$ at the next event time $t_{NEXT}$ is less than the visor position $P_{VISOR}$ at step 916, the controller 150 sets the new shade position $P_{NEW}$ equal to the controlled position $P_{CNTL}(t_{NEXT})$ at the next event time $t_{NEXT}$ at step 920. If the present time $t_{PRES}$ is not equal to the next event time $t_{NEXT}$ at step 914, the controller 150 determines the time $t_{PREV}$ of the previous timeclock event from the shade timeclock schedule at step 922 and sets the new shade position $P_{NEW}$ equal to the controlled position $P_{CNTL}(t_{PREV})$ at the previous event time $t_{PREV}$ at step 924.

After setting the new shade position $P_{NEW}$ at steps 918, 920, 924, the controller 150 makes a determination as to whether the present time is equal to the end time $t_{END}$ of the shade timeclock schedule at step 926. If the present time $t_{PRES}$ is equal to the end time $t_{END}$ at step 926, the controller 150 sets the new shade position $P_{NEW}$ to be equal to the nighttime position $P_{NIGHT}$ at step 928 and disables the timeclock schedule at step 930. If the new shade position $P_{NEW}$ is the same as the present shade position $P_{PRES}$ of the motorized roller shades 120 at step 932, the timeclock execution procedure 900 simply exits without adjusting the positions of the motorized roller shades 120. However, if the new shade position $P_{NEW}$ is not equal to the present shade position $P_{PRES}$ of the motorized roller shades 120 at step 932, the controller 150 adjusts the positions of the motorized roller shades 120 to the new shade position $P_{NEW}$ at step 934 and the timeclock execution procedure 900 exits.

Figure 14:
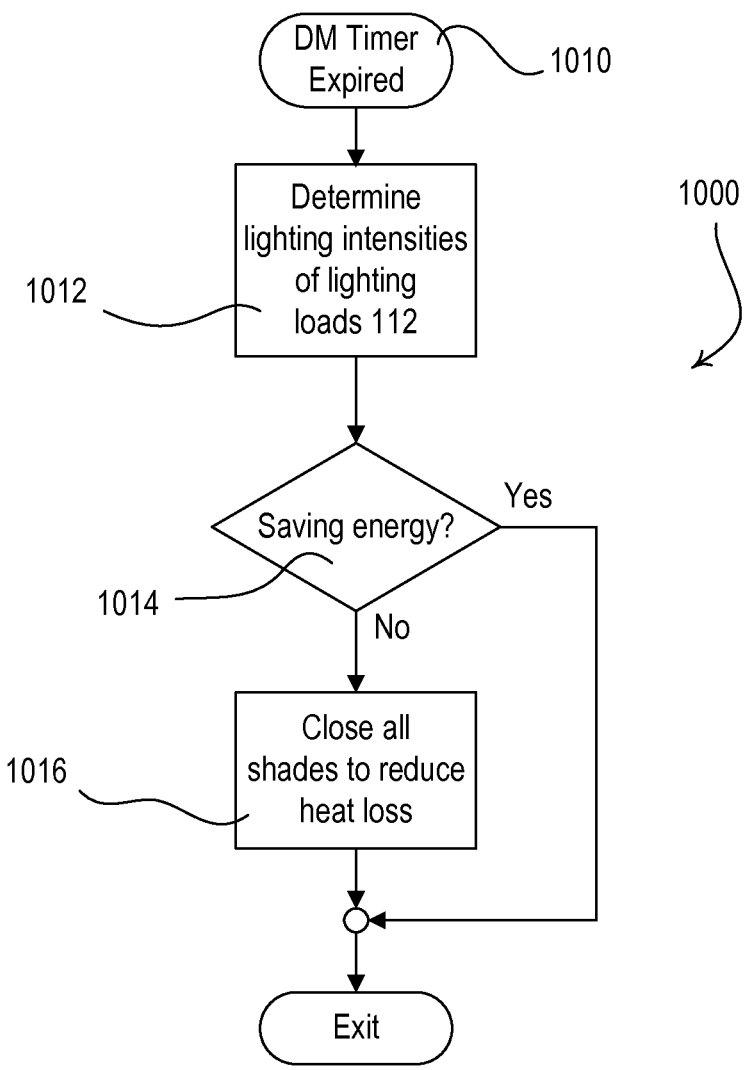
FIG. 14 is a simplified flowchart of a daylighting monitoring procedure executed by the controller of the load control system of FIG. 1 according to the first embodiment of the present invention.

FIG. 14 is a simplified flowchart of the daylighting monitoring procedure 1000, which is executed by the controller 150 when the daylighting monitoring timer expires at step 1010. As previously mentioned, the daylighting monitoring timer is initialized to an amount of time that is appropriate to allow the lighting control devices 110 to adjust the intensities of the lighting loads 112 in response to the ambient light intensity $L_{AMB}$ determined by the daylight sensor 154. During the daylighting monitoring procedure 1000, the controller 150 first determines at step 1012 the present intensities of the lighting loads 110 in the area, which are representative of the amount of power presently being consumed by the lighting loads. The controller 150 compares these lighting intensities to the lighting intensities of the lighting loads 112 that would be required if the motorized roller shades 120 were at the fully-closed positions to determine if the load control system 100 is presently saving energy as compared to when the motorized roller shades 120 are fully closed. If the load control system 100 is presently saving energy at step 1014, the controller 150 maintains the present positions of the motorized roller shades 120 and the daylighting monitoring procedure 1000 simply exits. However, if the load control system 100 is not presently saving energy at step 1014, the controller 150 closes all of the motorized roller shades 120 in the area to reduce heat loss at step 1016, before the daylighting monitoring procedure 1000 exits.

Figure 15A:
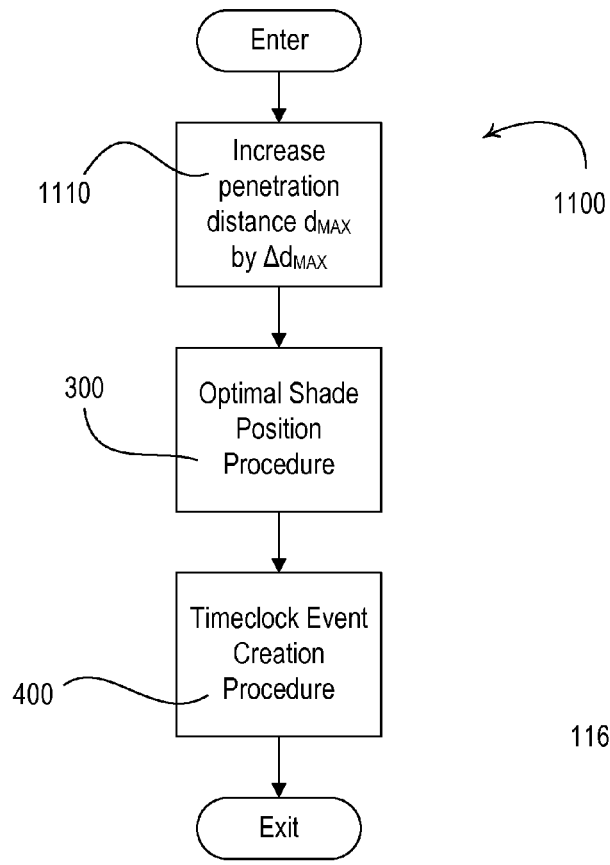
FIG. 15A is a simplified flowchart of a modified schedule procedure executed by the controller of the load control system of FIG. 1 according to the first embodiment of the present invention.

FIG. 15A is a simplified flowchart of the modified schedule procedure 1100, which is executed by the controller 150 during the demand response control procedure 800 when the area is occupied, the HVAC system 132 is presently heating the building, and there may be direct sunlight shining on the façade 164. First, the controller 150 temporarily increases the desired maximum sunlight penetration distance $d_{MAX}$ by a predetermined percentage $\Delta d_{MAX}$ (e.g., by approximately 50%) at step 1110, e.g., $$d_{MAX} = (1 + \Delta d_{MAX}) \cdot d_{MAX}. \quad \text{(Equation 16)}$$

Next, the controller 150 executes the optimal shade position procedure 300 (as shown in FIG. 5) for determining the optimal shade positions $P_{OPT}(t)$ of the motorized roller shades 120 in response to the modified desired maximum sunlight penetration distance $d_{MAX}$. The controller 150 then executes the timeclock event creation procedure 400 to generate the modified controlled positions $P_{CNTL}(t)$ in response to the optimal shade positions $P_{OPT}(t)$ determined from the modified desired maximum sunlight penetration distance $d_{MAX}$. Finally, the modified schedule procedure 1100 exits.

Figure 15B:
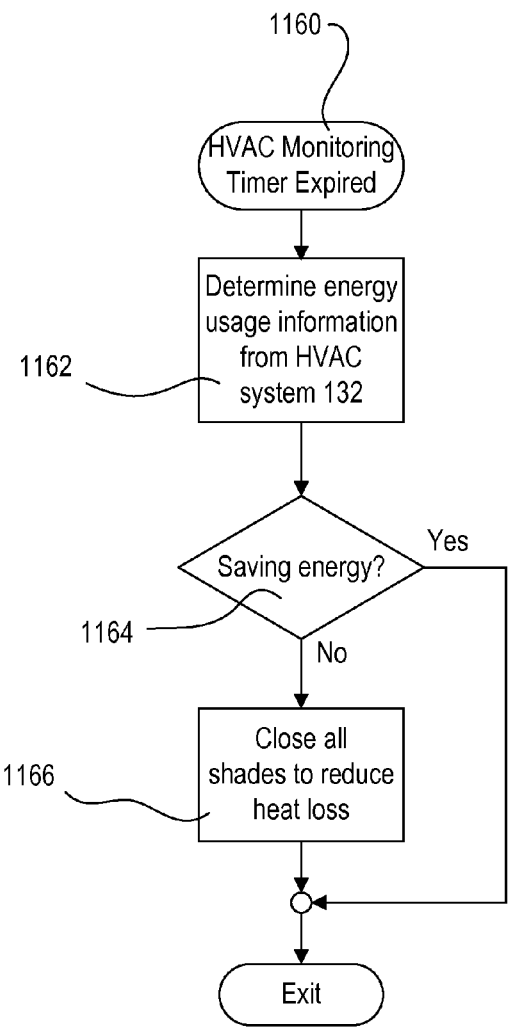
FIG. 15B is a simplified flowchart of an HVAC monitoring procedure executed by the controller of the load control system of FIG. 1 according to the first embodiment of the present invention.

FIG. 15B is a simplified flowchart of the HVAC monitoring procedure 1150, which is executed by the controller 150 when the HVAC monitoring timer expires at step 1160. The controller 150 first determines energy usage information from the HVAC system 132. For example, the controller 150 could cause the temperature control device 130 to transmit a request for energy usage information from the HVAC system 132 via the HVAC communication link 134. Alternatively, the temperature control device 130 could store data representative of the energy usage information of the HVAC system 132. For example, the temperature control device 130 could monitor when the HVAC system 132 is active or inactive while operating to heat the building when HVAC monitoring in enabled and determine a heating duty cycle, which is representative of the energy usage information of the HVAC system 132. Alternatively, the temperature control device 130 could monitor the rate at which the temperature in the space 160 decreases when the HVAC system is not actively heating the space.

Referring back to FIG. 15B, the controller 150 determines if the HVAC system 132 is saving energy during the HVAC monitoring at step 1164. For example, the controller 150 could compare the heating duty cycle during HVAC monitoring to the heating duty cycle prior to HVAC monitoring to determine if the HVAC system 132 is saving energy. If the heating duty cycle during HVAC monitoring is less than the heating duty cycle prior to HVAC monitoring than the HVAC system is saving energy. Alternatively, the controller 150 could compare the rate at which the present temperature $T_{PRES}$ of the space 160 decreases when the HVAC system 132 is not actively heating the space during HVAC monitoring to the rate prior to HVAC monitoring to determine if the HVAC system is saving energy. If the rate at which the present temperature $T_{PRES}$ of the space 160 decreases when the HVAC system 132 is not actively heating the space 160 is less than the rate prior to HVAC monitoring, the HVAC system is saving energy. If the controller 150 determines that the HVAC system 132 is saving energy at step 1164, the controller 150 maintains the present positions of the motorized roller shades 120 and the HVAC monitoring procedure 1150 simply exits. However, if the HVAC system 132 is not presently saving energy at step 1164, the controller 150 closes all of the motorized roller shades 120 in the area to reduce heat loss at step 1166, before the HVAC monitoring procedure 1150 exits. Alternatively, the HVAC monitoring procedure 1150 could be executed by the temperature control device 130.

Figure 16:
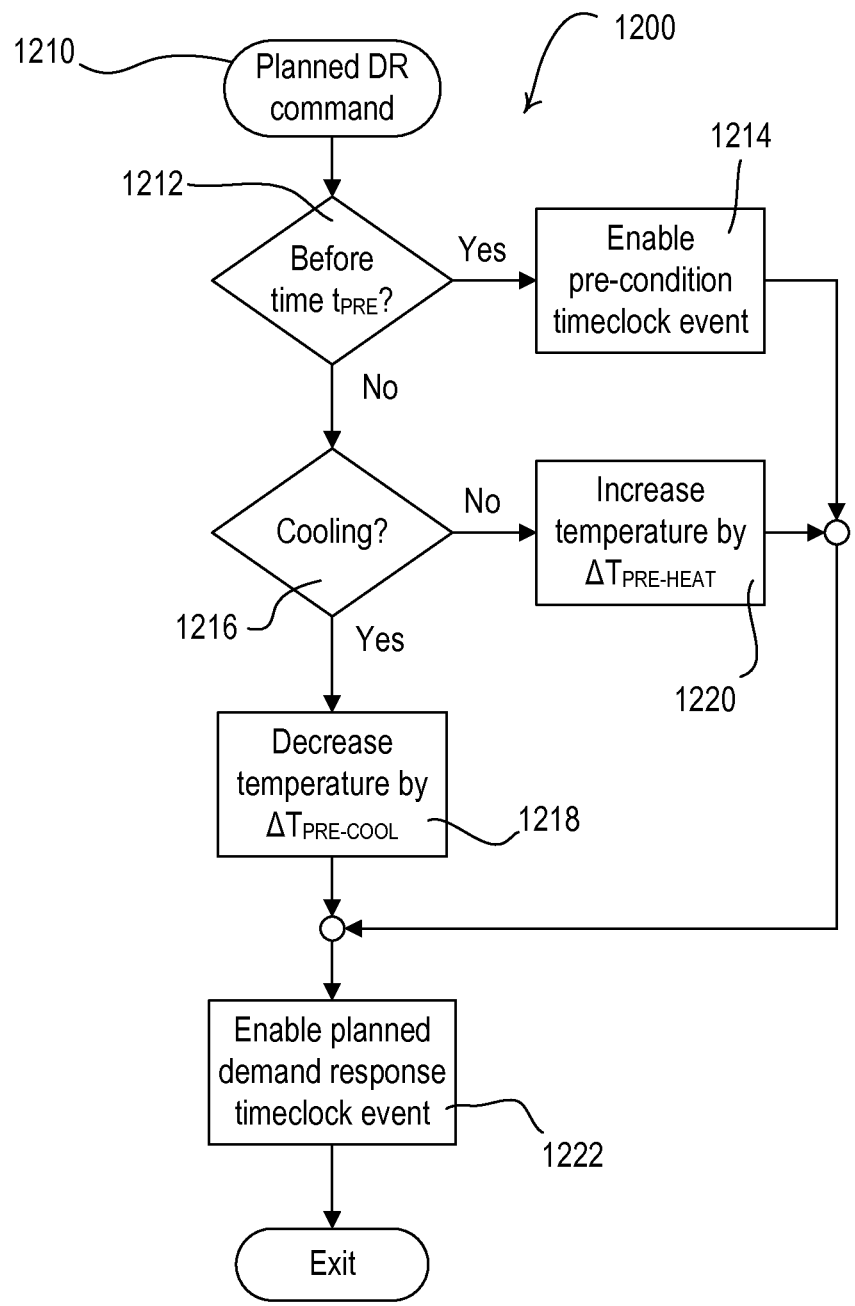
FIG. 16 is a simplified flowchart of a planned demand response procedure executed by the controller of the load control system of FIG. 1 according to a second embodiment of the present invention.

FIG. 16 is a simplified flowchart of a planned demand response procedure 1200 executed by the controller 150 of the load control system 100 according to a second embodiment of the present invention. In response to receiving a planned demand response command, the controller 150 controls the load control system 100 to reduce the total power consumption at a predetermined start time $t_{START}$ in the future, for example, at noon on the day after the planned demand response command was received. The controller 150 is operable to "pre-condition" (i.e., pre-cool or pre-heat) the building before the start time $t_{START}$ of the planned demand response command, such that the HVAC system 132 will be able to consume less power during the planned demand response event (i.e., after the start time). To pre-condition the building before a planned demand response event, the controller 150 is operable to pre-cool the building when the HVAC system 132 is in the cooling mode and will be cooling the building during the present day (e.g., during the summer), and to pre-heat the building when the HVAC system is in heating mode and the will be heating the building during the present day (e.g., during the winter).

Referring to FIG. 16, the planned demand response procedure 1200 is executed by the controller 150 when a planned demand response command is received via the network communication link 156 at step 1210. The controller 150 first determines if the present time of the day is before the predetermined pre-condition time $t_{PRE}$ (e.g., approximately 6 A.M.) at step 1212. If so, the controller 150 enables a pre-condition timeclock event at step 1214. The controller 150 will then execute (in the future at the pre-condition time $t_{PRE}$) a pre-condition timeclock event procedure 1300, which will be described in greater detail below with reference to FIG. 17. If the present time of the day is after the pre-condition time $t_{PRE}$ at step 1212 and the HVAC system 132 is presently cooling the building at step 1216, the controller 150 decreases the setpoint temperatures $T_{SET}$ of each of the temperature control devices 130 in the building by a pre-cool temperature increment $\Delta T_{PRE-COOL}$ (e.g., approximately 4° F.) at step 1218 in order to pre-condition the building before the planned demand response event. Specifically, the setpoint temperature $T_{SET}$ of the building is lowered from an initial temperature $T_{INIT}$ to a new temperature $T_{NEW}$ to pre-cool the building in preparation for the planned demand response event during which the setpoint temperature will be increased above the initial temperature $T_{INIT}$ (as will be described in greater detail below with reference to FIG. 18).

Referring back to FIG. 16, if the HVAC system 132 is presently heating the building at step 1216, the controller 150 increases the setpoint temperatures $T_{SET}$ of each of the temperature control devices 130 in the building by a pre-heat temperature increment $\Delta T_{PRE-HEAT}$ (e.g., approximately 4° F.) at step 1220. After either enabling the pre-condition timeclock event at step 1214 or pre-conditioning the building at step 1218 or step 1220, the controller 150 enables a planned demand response timeclock event at step 1222, before the planned demand response procedure 1200 exits. A planned demand response timeclock event procedure 1400 will be executed by the controller 150 at a planned demand response start time $t_{START}$. The planned demand response timeclock event procedure 1400 will be described in greater detail below with reference to FIG. 18.

Figure 17:
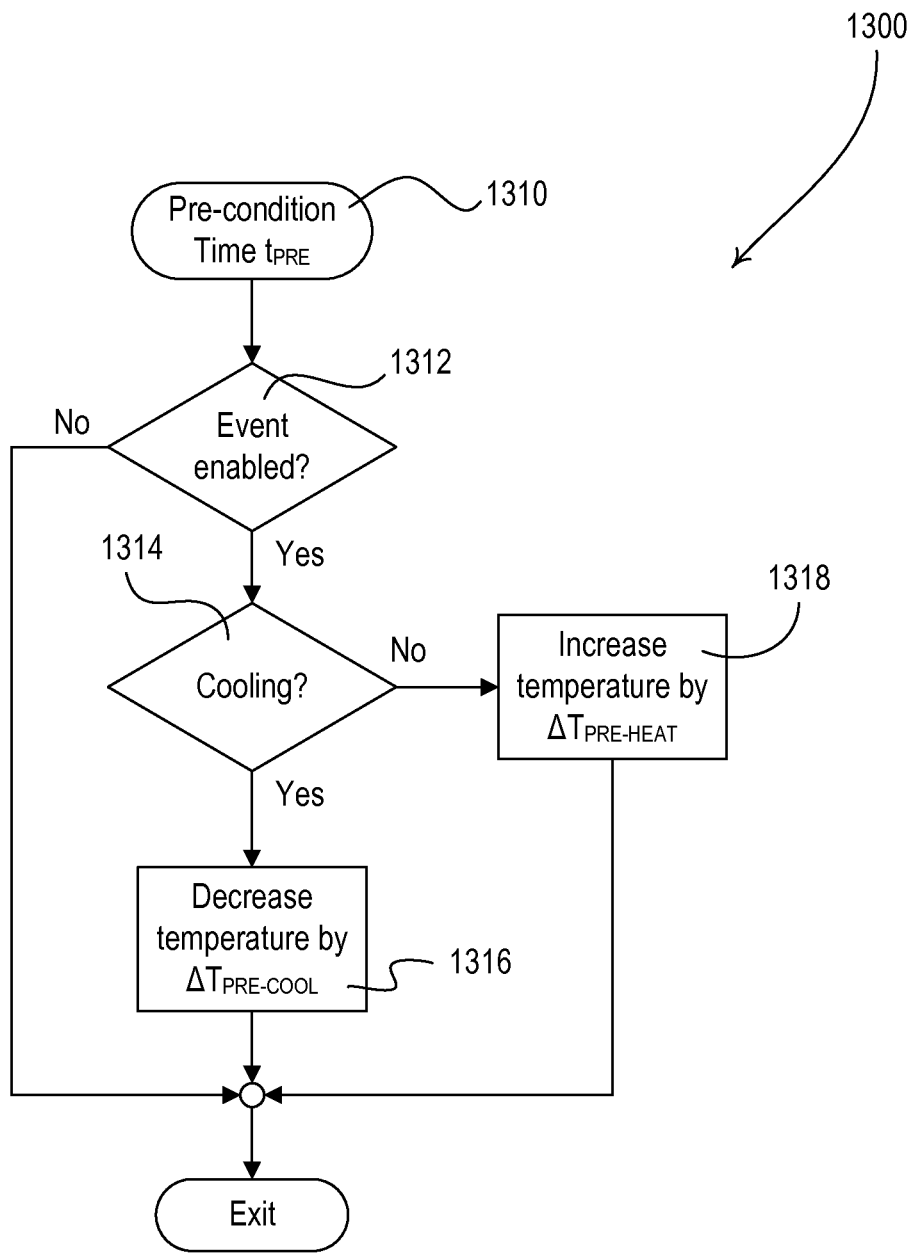
FIG. 17 is a simplified flowchart of the pre-condition timeclock event procedure executed by the controller of the load control system of FIG. 1 according to the second embodiment of the present invention.

FIG. 17 is a simplified flowchart of the pre-condition timeclock event procedure 1300, which is executed by the controller 150 at step 1310 (i.e., at the pre-condition time $t_{PRE}$). If the pre-condition timeclock event is not enabled at step 1312, the pre-condition timeclock event procedure 1300 simply exits. However, if the pre-condition timeclock event is enabled at step 1312 and the HVAC system 132 is presently cooling the building at step 1314, the controller 150 causes each of the temperature control devices 130 to decrease the setpoint temperatures $T_{SET}$ by the pre-cool temperature increment $\Delta T_{PRE-COOL}$ (i.e., approximately 4° F.) at step 1316 in order to pre-cool the building before the planned demand response event, and the pre-condition timeclock event procedure 1300 exits. If the HVAC system 132 is presently heating the building at step 1314, the controller 150 increases the setpoint temperatures $T_{SET}$ of each of the temperature control devices 130 by the pre-heat temperature increment $\Delta T_{PRE-HEAT}$ (e.g., approximately 4° F.) at step 1318 in order to pre-heat the building before the planned demand response event, and the pre-condition timeclock event procedure 1300 exits.

Figure 18:
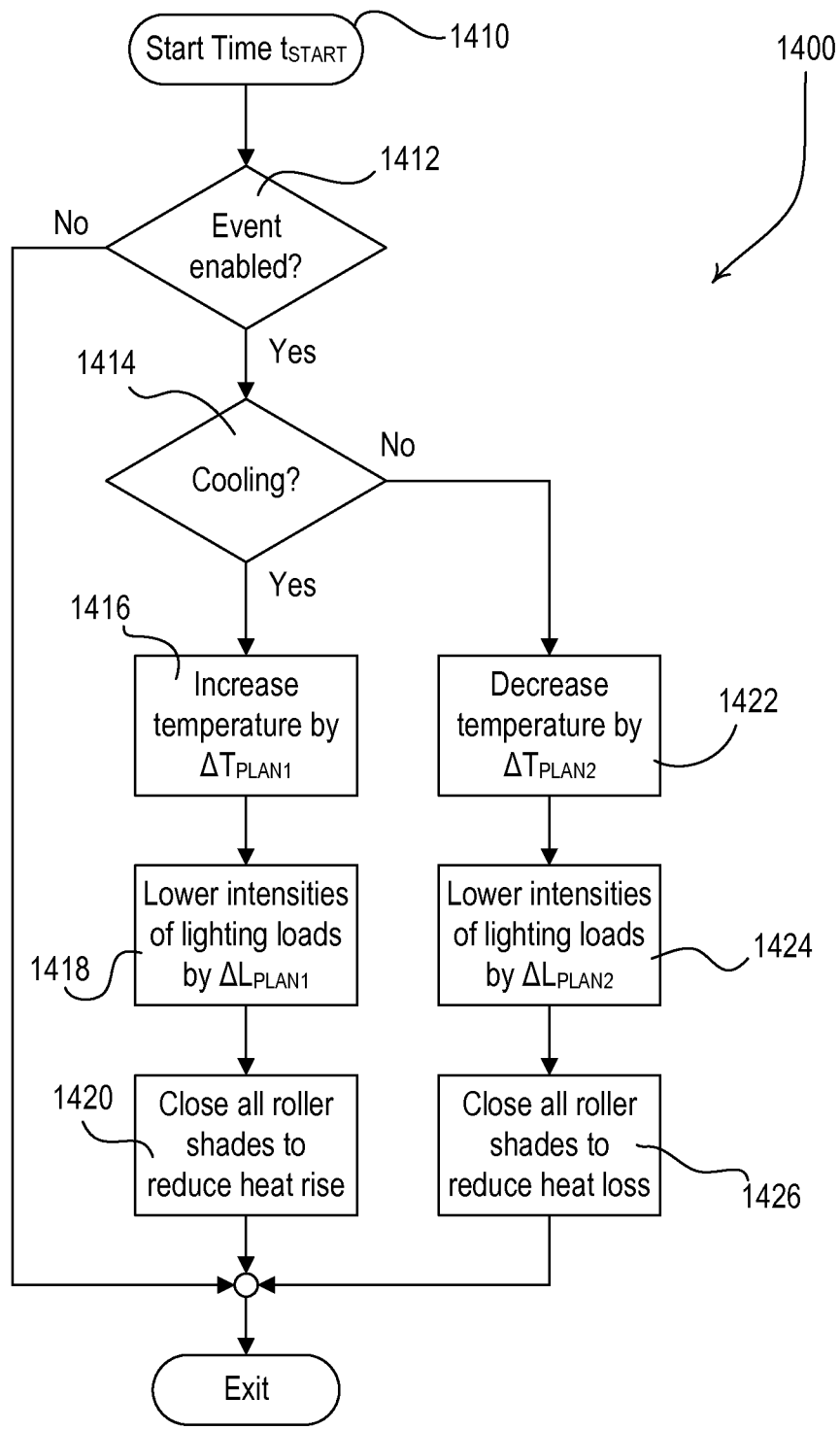
FIG. 18 is a simplified flowchart of the planned demand response timeclock event procedure executed by the controller of the load control system of FIG. 1 according to the second embodiment of the present invention.

FIG. 18 is a simplified flowchart of the planned demand response timeclock event procedure 1400, which is executed by the controller 150 at step 1410 (i.e., at the start time $t_{START}$). If the planned demand response timeclock event is not enabled at step 1412, the planned demand response timeclock event procedure 1400 simply exits. However, if the planned demand response timeclock event is enabled at step 1412 and the HVAC system 132 is presently cooling the building at step 1414, the controller 150 causes each of the temperature control devices 130 to increase the respective setpoint temperature $T_{SET}$ by a temperature increment $\Delta T_{PLAN1}$ (i.e., approximately 8° F.) at step 1416, such that the new temperature $T_{NEW}$ is greater than the initial temperature $T_{INIT}$ of the building before pre-cooling, i.e., $$T_{NEW}=T_{INIT}+(\Delta T_{PLAN1}-\Delta T_{PRE-COOL}). \quad \text{(Equation 17)}$$

At step 1418, the controller 150 causes the lighting control devices 110 to lower each of the present lighting intensities $L_{PRES}$ of the lighting loads 112 by a predetermined percentage $\Delta L_{PLAN1}$ (e.g., by approximately 20% of the present intensity), such that the lighting loads consume less power. At step 1420, the controller 150 causes each of the motorized roller shades 120 to move the respective shade fabric 122 to the fully-closed position, before the planned demand response timeclock event procedure 1400 exits.

If the HVAC system 132 is presently heating the building at step 1414, the controller 150 decreases the setpoint temperatures $T_{SET}$ of each of the temperature control devices 130 by a temperature increment $\Delta T_{PLAN2}$ (i.e., approximately 8° F.) at step 1422, such that the new temperature $T_{NEW}$ is less than the initial temperature $T_{INIT}$ of the building before pre-heating, i.e., $$T_{NEW}=T_{INIT}-(\Delta T_{PLAN2}-\Delta T_{PRE-HEAT}). \quad \text{(Equation 18)}$$

At step 1424, the controller 150 decreases each of the present lighting intensities $L_{PRES}$ of the lighting loads 112 connected to the lighting control devices 110 by a predetermined percentage $\Delta L_{PLAN2}$ (e.g., by approximately 20% of the present intensity). At step 1426, the controller 150 moves the respective shade fabric 122 of each of the motorized roller shades 120 to the fully-closed position, before the planned demand response timeclock event procedure 1400 exits.

While the controller 150 of the load control system 100 of FIG. 1 receives the demand response command from the electrical utility company via the network communication link 156, the load control system could alternatively receive the demand response command through other means. Often, the electrical utility company may not be connected to the load control system 100 via the Internet (i.e., via the network communication link 156). In such situations, a representative of the electrical utility company may contact a building manager of the building in which the load control system 100 is installed via telephone in order to communicate the specific demand response command. For example, the building manager could actuate one of the buttons 114 on the lighting control device 110 in order to input an immediate demand response command to the load control system 100. The lighting control device 110 could then transmit appropriate digital messages to the controller 150. Alternatively, the load control system 100 could also comprise a personal computer or laptop operable to communicate with the controller 150. The building manager could use the personal computer to communicate an immediate or a planned demand response command to the controller 150. Further, the controller 150 could include an antenna, such that the building manager could use a wireless cell phone or a wireless personal digital assistant (PDA) to transmit an immediate or a planned demand response command wirelessly to the controller (e.g., via RF signals).

According to a third embodiment of the present invention, the controller 150 is operable to control the lighting control device 110, the motorized roller shades 120, the temperature control device 130, and the controllable electrical receptacle 140 according to a plurality of demand response (DR) levels. A demand response level is defined as a combination of predetermined parameters (e.g., lighting intensities, shades positions, temperatures, etc.) for one or more of the loads of the load control system 100. The demand response levels provide a number of predetermined levels of energy savings that the load control system 100 may provide in response to the demand response command. For example, in a specific demand response level, a certain number of lighting loads may be dimmed by a predetermined amount, a certain number of motorized roller shades may be closed, a certain number of plug-in electrical loads 142 may be turned off, and the setpoint temperature may be adjusted by a certain amount. The demand response level to which the controller 150 controls the load control system 100 may be included in the demand response command received from the electrical utility company via the network communication link 156. Alternatively, the demand response command received from the electrical utility company may not include a specific demand response level. Rather, the controller 150 may be operable to select the appropriate demand response level in response to the demand response command transmitted by the electrical utility company.

When the load control system 100 is programmed to provide multiple demand response levels, each successive demand response level further reduces the total power consumption of the load control system 100. For example, the electrical utility company may first transmit a demand response command having demand response level one to provide a first level of energy savings, and then may subsequently transmit demand response commands having demand response levels two, three, and four to further and sequentially reduce the total power consumption of the load control system 100. Four example demand response levels are provided in the following table, although additional demand response levels could be provided. As shown in Table 1, the second demand response level causes the load control system 100 to consume less power than the first demand response level, and so on.

mately 2° F.) at step 1520, and the demand response level procedure 1500 exits. If the HVAC system 132 is presently heating the building at step 1518, the controller 150 decreases the setpoint temperatures $T_{SET}$ by the first temperature increment $\Delta T_1$ at step 1522, and the demand response level procedure 1500 exits.

If the demand response level of the received demand response command is not one at step 1512, but is two at step 1524, the controller 150 lowers the present intensities $L_{PRES}$ of all of the lighting loads 112 in the building, i.e., including the working areas of the building (such as, office spaces and conference rooms) by the first predetermined percentage $\Delta L_1$ (i.e., approximately 20% of the initial lighting intensity $L_{INIT}$) at step 1526. If the controller 150 had previously reduced the present intensities $L_{PRES}$ of the lighting loads 112 in the non-working areas of the building at step 1514 (i.e., according to the demand response level one), the controller only adjusts the present intensities $L_{PRES}$ of the lighting loads 112 in the working areas of the building at step 1526. At step 1528, the controller 150 then closes the motorized roller shades 120 in all of the areas of the building. If the HVAC system 132 is presently cooling the building at step 1530, the controller 150 increases the setpoint temperature $T_{SET}$ by a second temperature increment $\Delta T_2$ (e.g., approximately 4° F.) at step 1532,

TABLE 1

Example Demand Response (DR) Levels of the Third Embodiment

| | Load | | | |
|---|---|---|---|---|
| DR Level | Lighting Loads | Motorized Roller Shades | Temperature (HVAC) | Plug-In Electrical Loads |
| DR Level 1 | Reduce intensities of lighting loads in some areas by 20%. | Close shades in some areas. | Increase/reduce temperature by 2° F. when heating and cooling. | No change. |
| DR Level 2 | Reduce intensities of lighting loads in all areas by 20%. | Close shades in all areas. | Increase/reduce temperature by 4° F. when heating and cooling. | No change. |
| DR Level 3 | Reduce intensities of lighting loads in all areas by 50%. | Close shades in all areas. | Increase/reduce temperature by 6° F. when heating and cooling. | No change. |
| DR Level 4 | Reduce intensities of lighting loads in all areas by 50%. | Close shades in all areas. | Turn off HVAC system when cooling or reduce temperature to 45° F. when heating. | Turn off some plug-in electrical loads. |

Figure 19A:
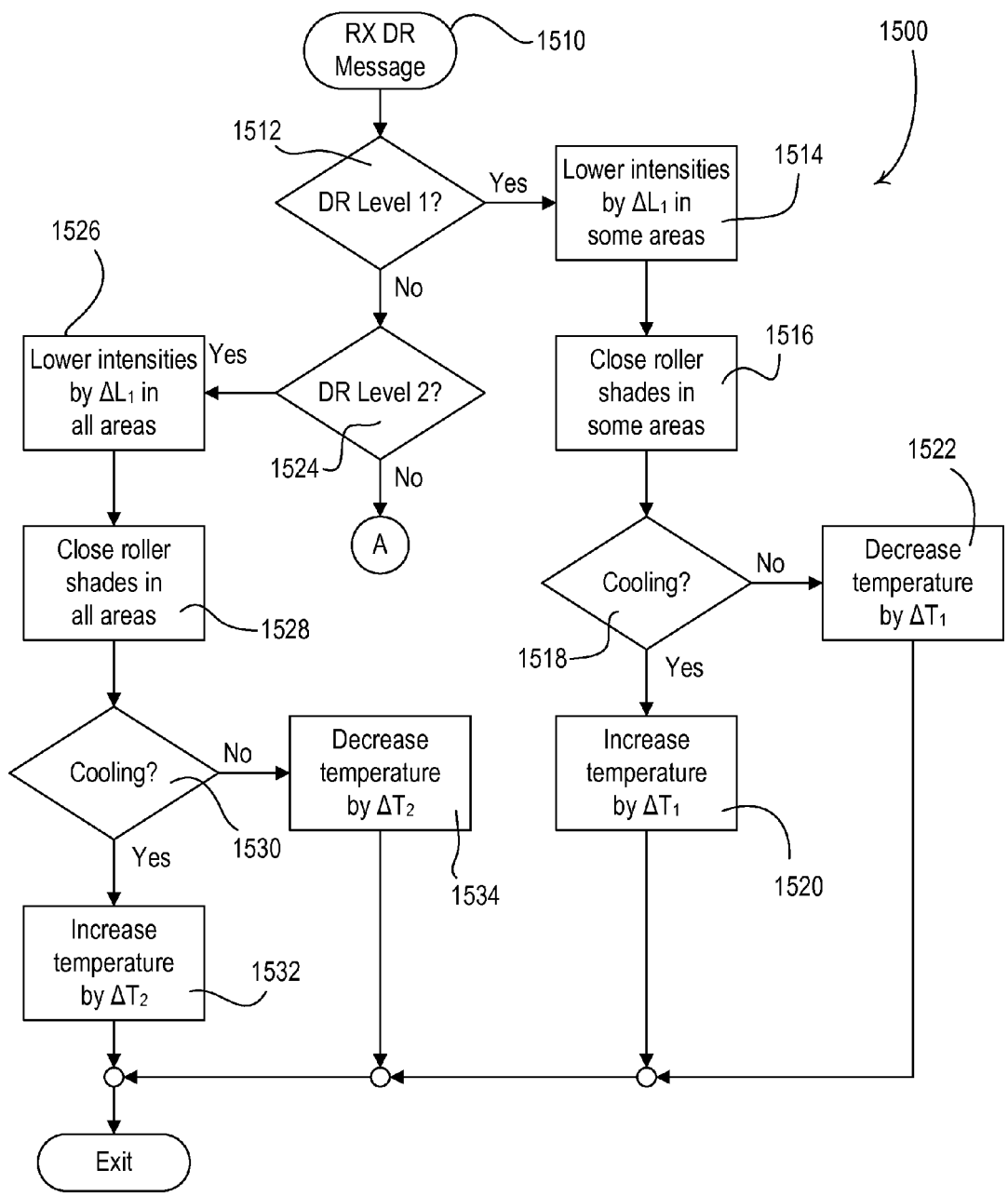
FIGS. 19A and 19B are simplified flowcharts of a demand response level procedure executed by the controller of the load control system of FIG. 1 according to a third embodiment of the present invention.
Figure 19B:
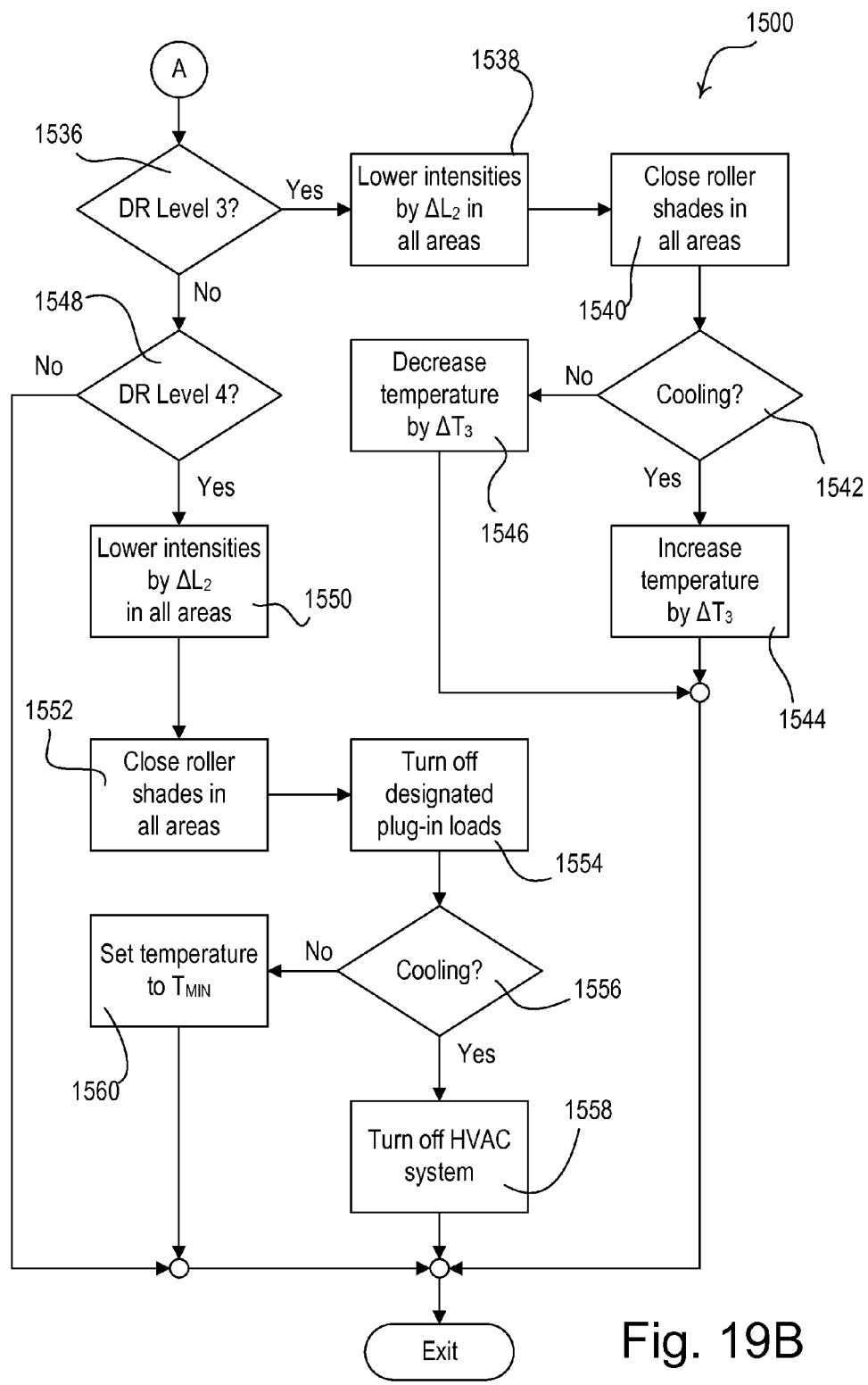

FIGS. 19A and 19B are simplified flowcharts of a demand response level procedure 1500 executed by the controller 150 according to the third embodiment of the present invention. The demand response level procedure 1500 is executed by the controller 150 in response to receiving a demand response command including a demand response level via the network communication link 156 at step 1510. If the demand response level of the received demand response command is one at step 1512, the controller 150 lowers the present intensities $L_{PRES}$ of only some of the lighting loads 112, for example, only the lighting loads 112 in the non-working areas of the building (such as, for example, rest rooms, corridors, and public areas) by a first predetermined percentage $\Delta L_1$ (e.g., approximately 20% of an initial lighting intensity $L_{INIT}$) at step 1514. The controller 150 then closes the motorized roller shades 120 in the same non-working areas of the building at step 1516. If the HVAC system 132 is presently cooling the building at step 1518, the controller 150 increases the setpoint temperatures $T_{SET}$ by a first temperature increment $\Delta T_1$ (e.g., approxiand the demand response level procedure 1500 exits. If the controller 150 had previously increased the setpoint temperatures $T_{SET}$ by the first temperature increment $\Delta T_1$ at step 1520 (i.e., according to the demand response level one), the controller 150 only increases the setpoint temperatures $T_{SET}$ by approximately 2° F. at step 1532, (i.e., $\Delta T_2 - \Delta T_1$). If the HVAC system 132 is presently heating the building at step 1530, the controller 150 decreases the setpoint temperature $T_{SET}$ by the second temperature increment $\Delta T_2$ at step 1534, and the demand response level procedure 1500 exits.

Referring to FIG. 19B, if the demand response level is not two at step 1524, but is three at step 1536, the controller 150 lowers the present intensities $L_{PRES}$ of all of the lighting loads 112 in the building by a second predetermined percentage $\Delta L_2$ (i.e., approximately 50% of the initial lighting intensity $L_{INIT}$) at step 1538. If the controller 150 had previously reduced the present intensities $L_{PRES}$ of the lighting loads 112 in any of the areas of the building at steps 1514 or 1526 (i.e., according to the demand response levels one or two), the controller only adjusts the present intensities $L_{PRES}$ of each of the lighting loads 112 by the necessary amount at step 1538. The controller 150 then closes the motorized roller shades 120 in all of the areas of the building at step 1540 (if needed). If the HVAC system 132 is presently cooling the building at step 1542, the controller 150 increases the setpoint temperature $T_{SET}$ by a third temperature increment $\Delta T_3$ (e.g., approximately 6° F.) at step 1544, and the demand response level procedure 1500 exits. If the HVAC system 132 is presently heating the building at step 1542, the controller 150 decreases each of the setpoint temperatures $T_{SET}$ by the third temperature increment $\Delta T_3$ at step 1546, and the demand response level procedure 1500 exits.

If the demand response level is not three at step 1536, but is four at step 1548, the controller 150 lowers the present intensities $L_{PRES}$ of all of the lighting loads 112 in the building by the second predetermined percentage $\Delta L_2$ at step 1550 (if needed) and closes all of the motorized roller shades 120 at step 1552 (if needed). At step 1554, the controller 150 transmits digital messages to the electrical receptacles 140 to turn off the designated plug-in electrical loads 142, such as, for example, table lamps, floor lamps, printers, fax machines, water heaters, water coolers, and coffee makers, but leaves some other plug-in loads powered, such as, personal computers. If the HVAC system 132 is presently cooling the building at step 1556, the controller 150 turns off the HVAC system at step 558, and the demand response level procedure 1500 exits. If the HVAC system 132 is presently heating the building at step 1556, the controller 150 causes each of the temperature control devices 130 to decrease the respective setpoint temperature $T_{SET}$ to a minimum temperature $T_{MIN}$ at step 1560 and the demand response level procedure 1500 exits.

Figure 20:
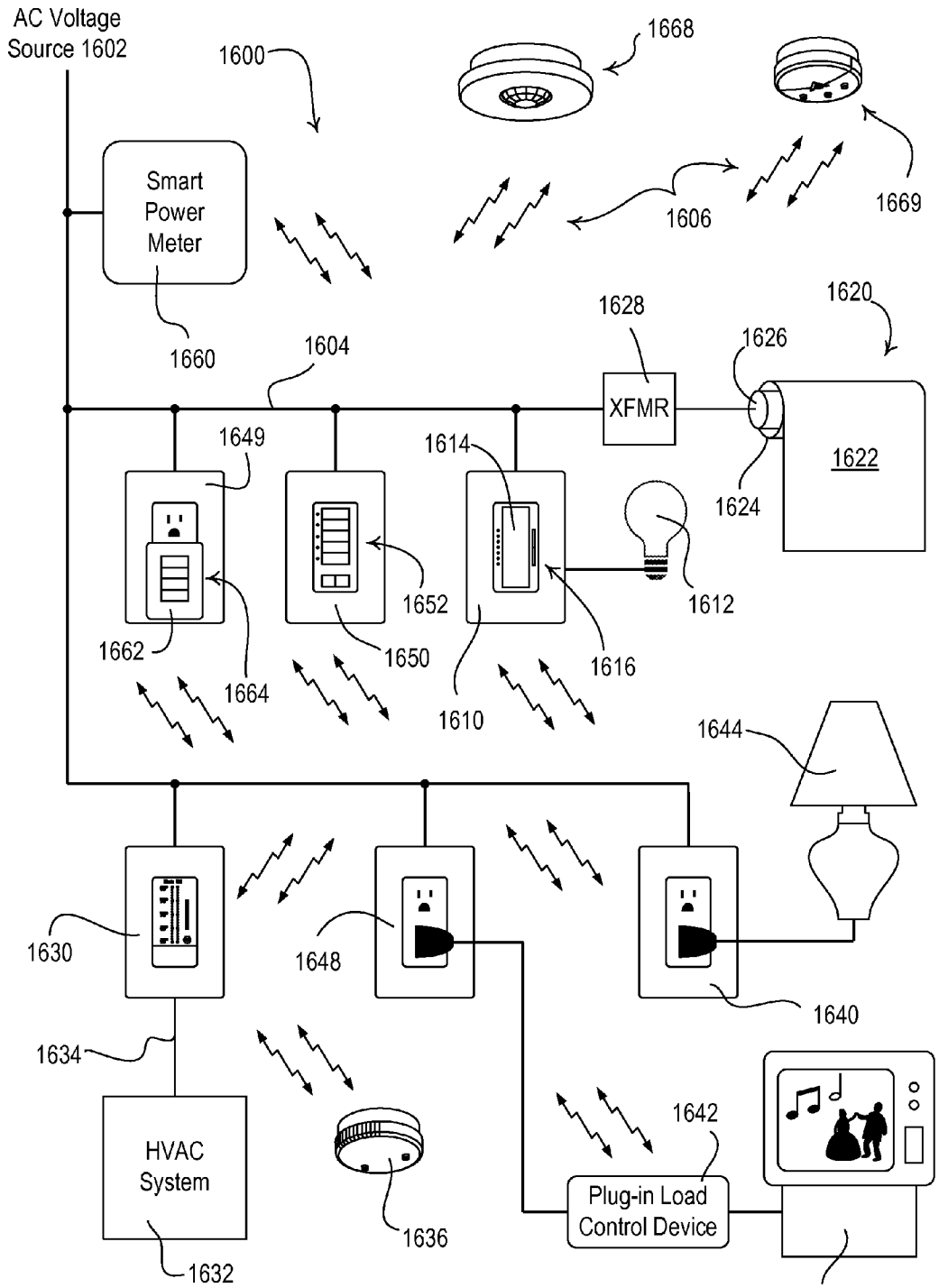
FIG. 20 is a simplified block diagram of a distributed load control system according to a fourth embodiment of the present invention.

FIG. 20 is a simplified block diagram of a distributed load control system that may be installed in a building, such as a residence, according to a fourth embodiment of the present invention. The load control system 1600 comprises a lighting control device, e.g., a wall-mountable dimmer switch 1610, which is coupled to an AC power source 1602 via a line voltage wiring 1604. The dimmer switch 1610 is operable to adjust the amount of power delivered to the lighting load 1612 to thus control the present lighting intensity $L_{PRES}$ of the lighting load 1612. The dimmer switch 1610 is also operable to fade the present lighting intensity $L_{PRES}$ between two lighting intensities. The dimmer switch 1610 comprises a control actuator 1614 for allowing a user to turn the lighting load 1612 on and off. The dimmer switch 1610 further comprises an intensity adjustment actuator 1616 for allowing the user to adjust the present lighting intensity $L_{PRES}$ of the lighting load 1612 between a minimum lighting intensity $L_{MIN}$ and a maximum lighting intensity $L_{MAX}$. An example of a wall-mountable dimmer switch is described in greater detail in previously-referenced U.S. Pat. No. 5,248,919.

The dimmer switch 1610 is operable to transmit and receive digital messages via wireless signals, e.g., RF signals 1606 (i.e., an RF communication link). The dimmer switch 1610 is operable to adjust the present lighting intensity $L_{PRES}$ of the lighting load 1612 in response to the digital messages received via the RF signals 1606. The dimmer switch 1610 may also transmit feedback information regarding the amount of power being delivered to the lighting load 1610 via the digital messages included in the RF signals 1606. Examples of RF lighting control systems are described in greater detail in commonly-assigned U.S. Pat. No. 5,905,442, issued on May 18, 1999, entitled METHOD AND APPARATUS FOR CONTROLLING AND DETERMINING THE STATUS OF ELECTRICAL DEVICES FROM REMOTE LOCATIONS, and U.S. patent application Ser. No. 12/033,223, filed Feb. 19, 2008, entitled COMMUNICATION PROTOCOL FOR A RADIO-FREQUENCY LOAD CONTROL SYSTEM, the entire disclosures of which are both hereby incorporated by reference.

The load control system 1600 comprises a motorized window treatment, e.g., a motorized roller shade 1620, which may be positioned in front of a window for controlling the amount of daylight entering the building. The motorized roller shade 1620 comprises a flexible shade fabric 1622 rotatably supported by a roller tube 1624, and an electronic drive unit (EDU) 1626, which may be located inside the roller tube 1624. The electronic drive unit 1626 may be powered by an external transformer (XFMR) 1628, which is coupled to the AC power source 1602 and produces a lower voltage AC supply voltage for the electronic drive unit. The electronic drive unit 1626 is operable to transmit and receive the RF signals 1606, such that the electronic drive unit may control the position of the shade fabric 1622 in response to digital messages received via the RF signals and may transmit feedback information regarding the position of the shade fabric via the RF signals.

The load control system 1600 also comprises a temperature control device 1630, which is coupled to an HVAC system 1632 via an HVAC communication link 1634, e.g., a digital communication link, such as an Ethernet link. The temperature control device 1630 measures the present temperature $T_{PRES}$ in the building and transmits appropriate digital messages to the HVAC system 1632 to thus control the present temperature $T_{PRES}$ in the building towards the setpoint temperature $T_{SET}$. The temperature control device 1630 is operable to adjust the setpoint temperature $T_{SET}$ in response to the digital messages received via the RF signals 1606. Alternatively, the HVAC communication link 1634 could comprise a more traditional analog control link for simply turning the HVAC system 1632 on and off.

Figure 21A:
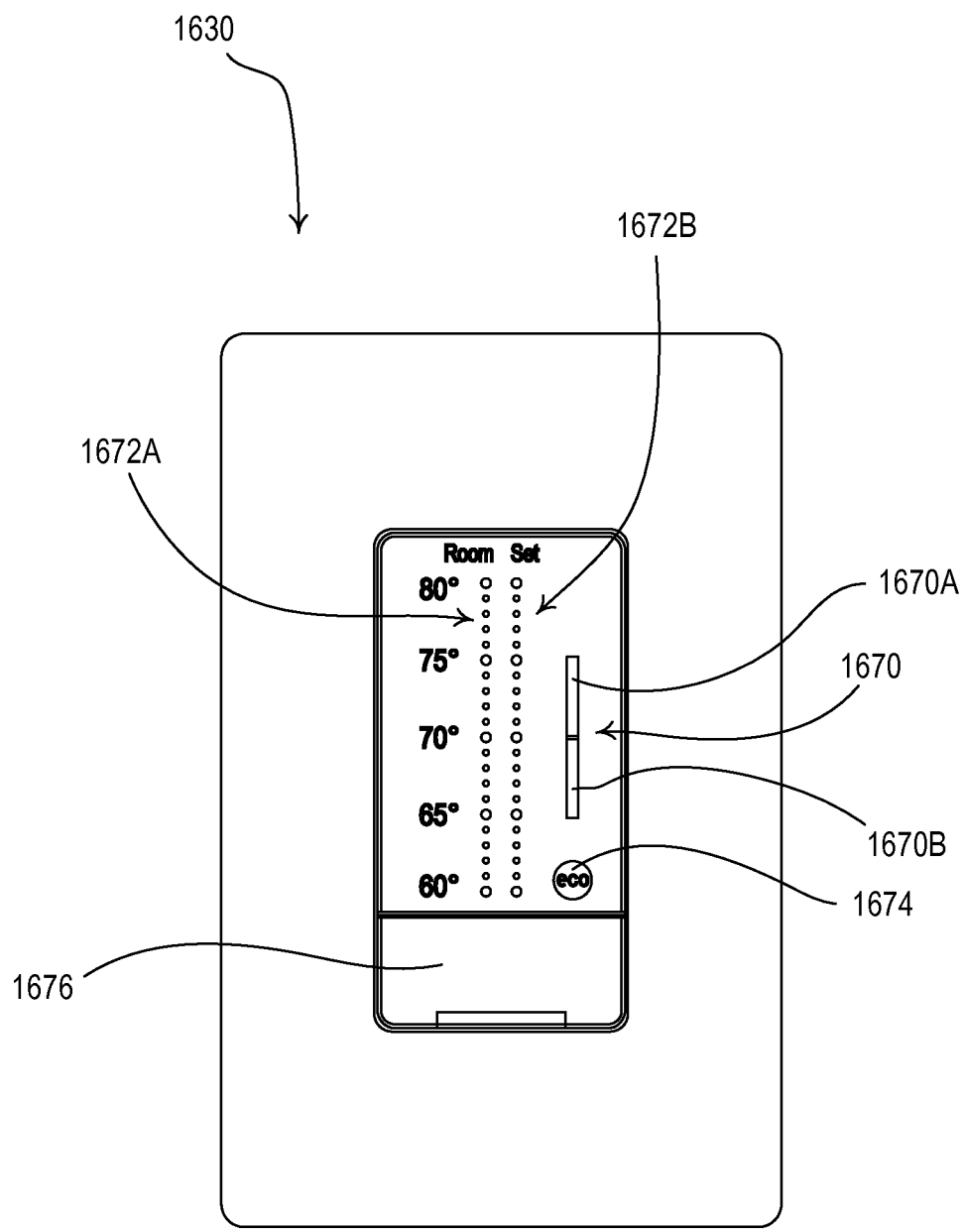
FIG. 21A is a front view of a temperature control device of the load control system of FIG. 20 showing a cover plate open.
Figure 21B:
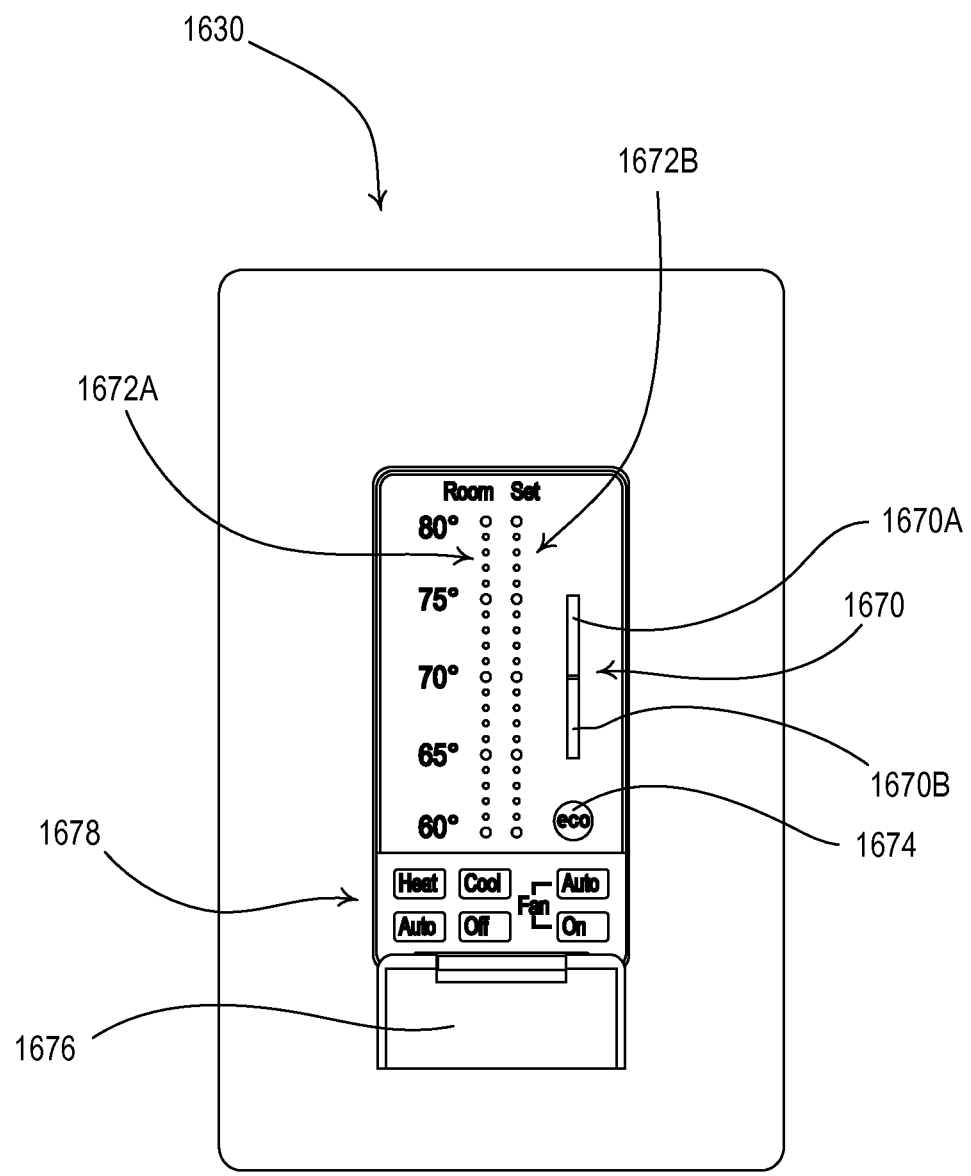
FIG. 21B is a front view of the temperature control device of FIG. 21A showing the cover plate open.

FIG. 21A is an enlarged front view of the temperature control device 1630. The temperature control device 1630 comprises a temperature adjustment actuator 1670 (e.g., a rocker switch). Actuations of an upper portion 1670A of the temperature adjustment actuator 1670 cause the temperature control device 1630 to increase the setpoint temperature $T_{SET}$, while actuations of a lower portion 1670B of the temperature adjustment actuator cause the temperature control device to decrease the setpoint temperature $T_{SET}$. The temperature control device 1630 further comprises a room temperature visual display 1672A and a setpoint temperature visual display 1672B, which each comprise linear arrays of light-emitting diodes (LEDs) arranged parallel to each other as shown in FIG. 21A. One of the individual LEDs of the room temperature visual display 1672A is illuminated to display the present temperature $T_{PRES}$ of the room in which the temperature control device 1630 is located, for example, on a linear scale between 60° F. and 80° F. In a similar manner, one of the individual LEDs of the setpoint temperature visual display 1672B is illuminated to display the setpoint temperature $T_{SET}$ of the temperature control device 1630. The temperature control device 1630 transmits digital messages to the other control devices of the load control system 1600 via the RF signals 1606 in response to actuations of an "eco-saver" actuator 1674 as will be described below. The temperature control device 1630 has a cover plate 1676, which covers a plurality of operational actuators 1678. FIG. 21B is a front view of the temperature control device 1630 in which the cover plate 1676 is open and the operational actuators 1678 are shown. Actuations of the operational actuators 1678 adjust the operation of the HVAC system 1632, for example, to change between the heating mode and the cooling mode.

Figure 22:
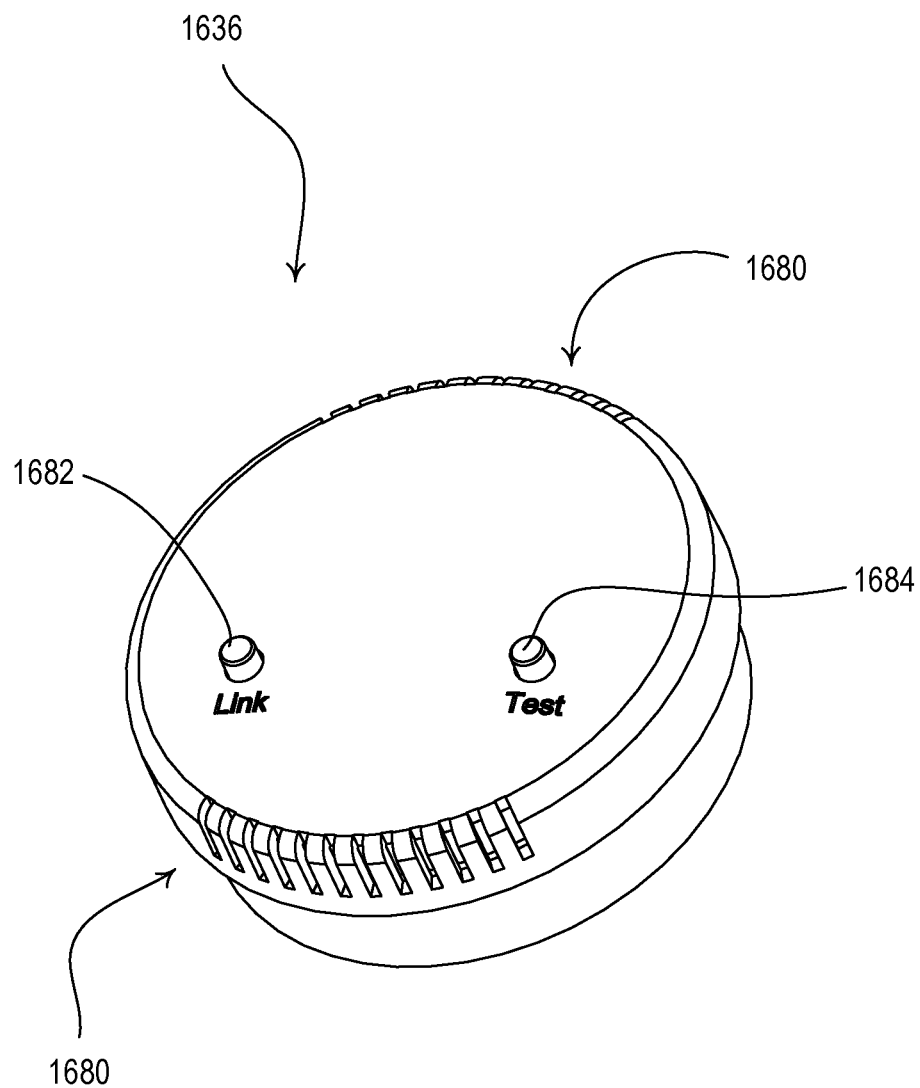
FIG. 22 is a perspective view of a wireless temperature sensor of the load control system of FIG. 20.

Referring back to FIG. 20, the load control system 1600 may also comprise a wireless temperature sensor 1636, which may be mounted remotely in a location away from the temperature control device 1630 and may also be battery-powered. FIG. 22 is an enlarged perspective view of the wireless temperature sensor 1636. The wireless temperature sensor 1636 comprises an internal temperature sensing device (not shown) for measuring the present temperature $T_{PRES}$ in the building at the location away from the temperature control device 1630. The wireless temperature sensor 1636 comprises vents 1680, which allow for air flow from the outside of the temperature sensor to the internal temperature sensing device inside the temperature sensor. The vents 1680 help to improve the accuracy of the measurement of the present temperature $T_{PRES}$ in the room in which the wireless temperature sensor 1636 is mounted (i.e., of the temperature outside the wireless temperature sensor). The wireless temperature sensor 1636 further comprises a link button 1682 and a test button 1684 for use during setup and configuration of the wireless temperature sensor. The wireless temperature sensor 1636 is operable to transmit digital messages regarding the measured temperature to the temperature control device 1630 via the RF signals 1606. In response to receiving the RF signals 1606 from the wireless temperature sensor 1636, the temperature control device is operable to update the room temperature visual display 1672A to display the present temperature $T_{PRES}$ of the room at the location of the wireless temperature sensor and to control the HVAC system 1632, so as to move the present temperature $T_{PRES}$ in the room towards the setpoint temperature $T_{SET}$.

Figure 23:
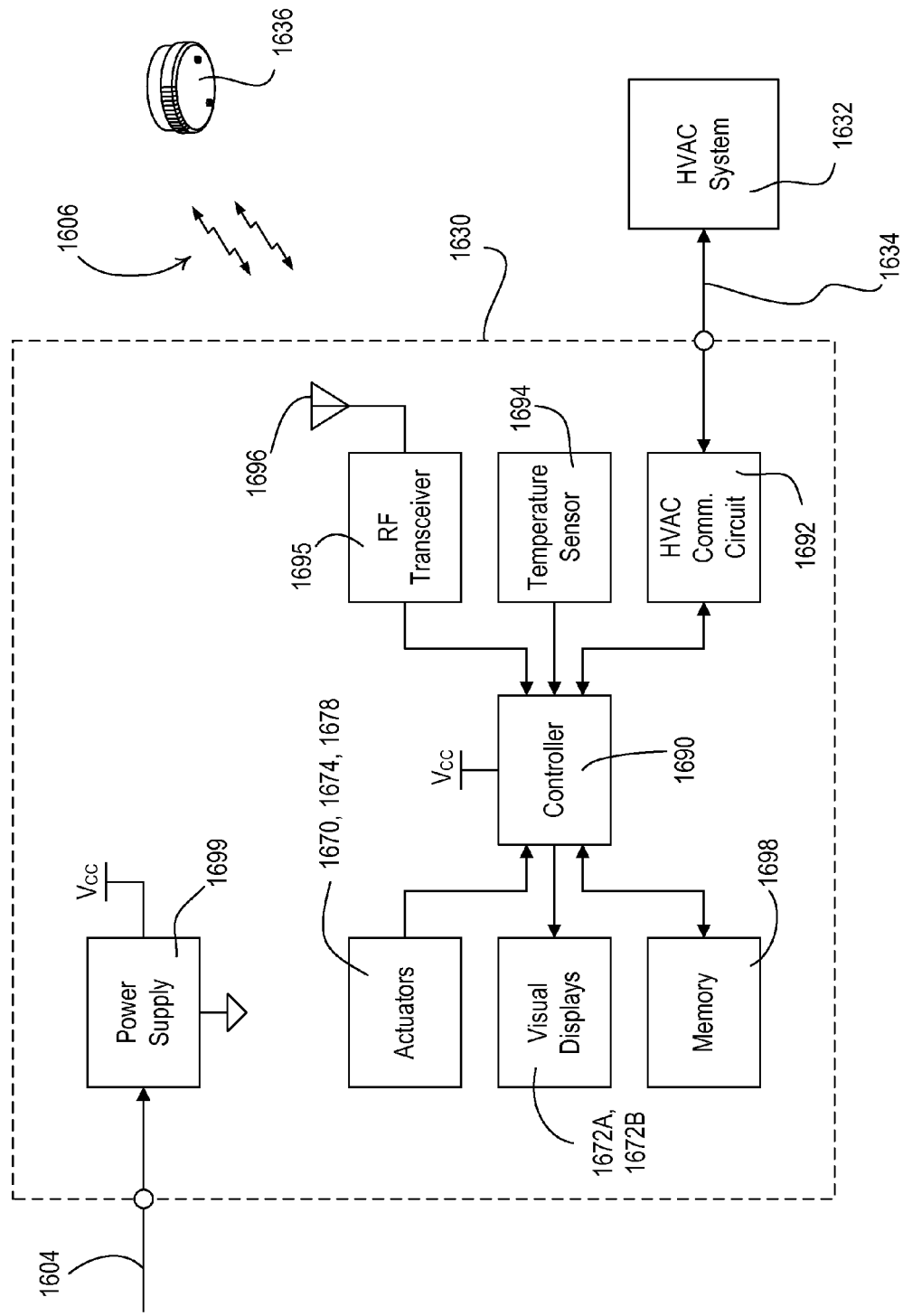
FIG. 23 is a simplified block diagram of the temperature control device of FIG. 21A.

FIG. 23 is a simplified block diagram of the temperature control device 1630. The temperature control device 1630 comprises a controller 1690, which may be implemented as, for example, a microprocessor, a microcontroller, a programmable logic device (PLD), an application specific integrated circuit (ASIC), or any suitable processing device. The controller 1692 is coupled to an HVAC communication circuit 1692 (e.g., a digital communication circuit, such as an Ethernet communication circuit), which is connected to the HVAC communication link 1634 to allow the controller to adjust the setpoint temperature $T_{SET}$ of the HVAC system 1632. If the HVAC communication circuit 1692 comprises an analog control link, the HVAC communication circuit 1692 could simply comprise a switching device for enabling and disabling the HVAC system 1632.

The controller 1690 is operable to determine the present temperature $T_{PRES}$ in the building in response to an internal temperature sensor 1694. The controller 1690 is further coupled to a wireless communication circuit, e.g., an RF transceiver 1695, which is coupled to an antenna 1696 for transmitting and receiving the RF signals 1606. The controller 1690 is operable to determine the present temperature $T_{PRES}$ in the building in response to the RF signals 1606 received from the wireless temperature sensor 1636. Alternatively, the temperature control device 1630 may simply comprise either one or the other of the internal temperature sensor 1694 and the RF transceiver 1695 for determining the present temperature $T_{PRES}$ in the room. Examples of antennas for wall-mounted control devices are described in greater detail in commonly-assigned U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference.

The temperature control device 1630 further comprises to a memory 1698 for storage of the setpoint temperature $T_{SET}$ and the present temperature $T_{PRES}$ in the building, as well as data representative of the energy usage information of the HVAC system 1632. The memory 1698 may be implemented as an external integrated circuit (IC) or as an internal circuit of the controller 1690. The controller 1690 may be operable to determine the data representative of the energy usage information of the HVAC system 1632 in a similar manner as the temperature control device 130 of the first embodiment. For example, the data representative of the energy usage information of the HVAC system 1632 may comprise values of the duty cycle defining when the HVAC system is active and inactive during a predetermined time period, or the rate at which the present temperature $T_{PRES}$ decreases or increases in the room when the HVAC system is not actively heating or cooling the space, respectively, during a predetermined time period.

A power supply 1699 receives power from the line voltage wiring 1604 and generates a DC supply voltage $V_{CC}$ for powering the controller 1690 and other low-voltage circuitry of the temperature control device 1630. The controller 1690 is coupled to the temperature adjustment actuator 1670, the eco-saver actuator 1674, and the operational actuators 1678, such that the controller is operable to adjust the operation of the HVAC system 1632 in response to actuations of these actuators. The controller 1690 is coupled to the room temperature visual display 1672A and the setpoint temperature visual display 1672B for displaying the present temperature $T_{PRES}$ and the setpoint temperature $T_{SET}$, respectively.

Referring back to FIG. 20, the load control system 100 further comprises one or more controllable electrical receptacles 1640, and plug-in load control devices 1642 for control of plug-in electrical loads, such as, for example, a table lamp 1644, a television 1646, a floor lamp, a stereo, or a plug-in air conditioner. The controllable electrical receptacle 1640 and the plug-in load control device 1642 are responsive to the digital messages received via the RF signals 1606 to turn on and off the respective plug-in loads 1644, 1646. The plug-in load control device 1642 is adapted to be plugged into a standard electrical receptacle 1648. The controllable electrical receptacle 1640 may comprise a dimmable electrical receptacle including an internal dimming circuit for adjusting the intensity of the lamp 1644. Additionally, the load control system 1600 could comprise one or more controllable circuit breakers (not shown) for control of other switched electrical loads, such as, for example, a water heater. The load control system 1600 may also comprise additional dimmer switches 1610, motorized roller shades 1620, temperature control devices 1630, controllable electrical receptacles 1640, and plug-in load control devices 1642.

According to the fourth embodiment of the present invention, the dimmer switch 1610, the motorized roller shade 1620, the temperature control device 1630, and the controllable electrical receptacles 1640, 1642 are each individually responsive to a plurality of demand response levels, i.e., predetermined energy-savings "presets". The energy-savings presets may be user selectable and may be defined to provide energy savings for different occupancy conditions of the building. For example, the energy-savings presets may comprise a "normal" preset, an "eco-saver" preset, an "away" preset, a "vacation" preset, and a "demand response" preset. Examples of the energy-savings presets are provided in the following table.

TABLE 2

Example Energy-Savings Presets of the Fourth Embodiment

| Preset | Load | | | |
|---|---|---|---|---|
| | Lighting Loads | Motorized Roller Shades | Temperature (HVAC) | Plug-In Electrical Loads |
| Normal | Reduce intensities of lighting loads by 0%. | Shade positions as controlled by user. | Temperature as controlled by user. | No change. |
| Eco-Saver | Reduce intensities of lighting loads by 15%. | Control position in response to ambient light intensity. | Increase/reduce temperature by 2° F. when heating and cooling. | No change. |
| Away | Turn off all lighting loads. | Close all shades. | Increase/reduce temperature by 6° F. when heating and cooling. | Turn off lamps, television, and stereo. |
| Vacation | Turn off all lighting loads. | Close all shades. | Increase temp. by 10° F. when cooling or reduce temp. to 45° F. when heating. | Turn off lamps, television, stereo, and water heater. |
| Demand Response | Reduce intensities of lighting loads by 20%. | Close all shades. | Increase/reduce temperature by 2° F. when heating and cooling. | No change. |

When the normal preset is selected, the load control system 1600 operates as controlled by the occupant of the building, i.e., the normal preset provides no changes to the parameters of the load control system. For example, the lighting loads 1612 may be controlled to 100%, the motorized roller shades 1620 may be opened, and the setpoint temperature $T_{SET}$ may be controlled to any temperature as determined by the occupant. The eco-saver preset provides some energy savings over the normal preset, but still provides a comfortable environment for the occupant. The away preset provides additional energy savings by turning off the lighting loads and some of the plug-in electrical loads when the occupant may be away temporarily away from the building. The vacation preset provides the maximum energy savings of the energy-savings presets shown in Table 2 for times when the occupant may be away from the building for an extended period of time.

The temperature control device 1630 is operable to increase or decrease the setpoint temperature $T_{SET}$ in response to the mode of the HVAC system 1632 (i.e., heating or cooling, respectively) as part of the energy-savings presets. The temperature control device 1630 may comprise a heating and cooling switch for changing between heating and cooling of the building. Alternatively, the temperature control device 1630 could, as part of the energy-savings presets, adjust the setpoint temperature $T_{SET}$ in response the present time of the year (i.e., the summer or the winter). For example, the lighting control device 1610 could comprise an astronomical time clock and may transmit digital messages including the present time of the year via the RF signals 1606.

The load control system 1600 may also include a keypad 1650 to allow for manual selection of the energy-savings presets, specifically, the normal preset, the eco-saver preset, the away preset, and the vacation preset. The keypad 1650 comprises a plurality of preset buttons 1652 including, for example, a preset button 1652 for each of the energy-savings presets that may be selected by the keypad 1650. The keypad 1650 transmits digital messages to the other control devices of the load control system 1600 via the RF signals 1606 in response to actuations of the preset buttons 1652. The dimmer switch 1610, the motorized roller shade 1620, the temperature control device 1630, the controllable electrical receptacles 1640, and the plug-in load control device 1642 operate as shown in Table 2 in response to the specific energy-savings preset transmitted in the digital messages from the keypad 1650. In addition, the eco-saver preset may be selected in response to an actuation of the eco-saver actuator 1674 on the temperature control device 1630. Specifically, the controller 1690 of the temperature control device 1630 is operable to transmit a digital message including an eco-saver preset command via the RF transceiver 1695 in response to an actuation of the eco-saver actuator 1674.

The load control system 1600 may also comprise a smart power meter 1660 coupled to the line voltage wiring 1604. The smart power meter 1660 is operable to receive demand response commands from the electrical utility company, for example, via the Internet or via RF signals. The smart power meter 1660 may be operable to wirelessly transmit a digital message including the received demand response command to a demand response orchestrating device 1662, which may be, for example, plugged into a standard electrical receptacle 1649. In response to receiving a digital message from the smart power meter 1660, the demand response orchestrating device 1662 is operable to subsequently transmit digital messages including, for example, the demand response preset, via the RF signals 1606 to the dimmer switch 1610, the motorized roller shade 1620, the temperature control device 1630, the controllable electrical receptacle 1640, and the plug-in load control device 1642. Accordingly, as shown by the example data in Table 1, the dimmer switch 1610 reduces the present lighting intensity $L_{PRES}$ of the lighting load 1612 by 20% and the electronic drive units 1626 move the respective shade fabrics 1622 to the fully-closed position in response to receiving the demand response command. In response to receiving the utility-company command, the temperature control device 1630 also increases the setpoint temperature $T_{SET}$ by 2° F. when the HVAC system 1632 is presently in the cooling mode, and decreases the setpoint temperature $T_{SET}$ by 2° F. when the HVAC system 1632 is presently in the heating mode. In addition, the demand response orchestrating device 1662 may comprise one or more buttons 1664 for selecting the energy-savings presets. Alternatively, the smart power meter 1660 may be operable to wirelessly transmit digital message directly to the dimmer switch 1610, the motorized roller shade 1620, the temperature control device 1630, the controllable electrical receptacle 1640, and the plug-in load control device 1642.

The load control system 1600 may further comprise a wireless occupancy sensor 1668. The occupancy sensor 1668 is operable to wirelessly transmit digital messages to the dimmer switch 1610, the motorized roller shade 1620, the temperature control device 1630, the controllable electrical receptacles 1640, and the plug-in load control device 1642 in response to detecting an occupancy condition or a vacancy condition in the space in which the occupancy sensor in mounted. For example, the dimmer switch 1610, the motorized roller shade 1620, the temperature control device 1630, the controllable electrical receptacles 1640, and the plug-in load control device 1642 operate according to the away preset in response a vacancy condition, and according to the normal preset in response to an occupied condition.

The load control system 1600 may further comprise a wireless daylight sensor 1669 for measuring the ambient light intensity $L_{AMB}$ in the room in which the daylight sensor is mounted. The daylight sensor 1669 is operable to wirelessly transmit digital messages to the dimmer switch 1610, the motorized roller shade 1620, the temperature control device 1630, the controllable electrical receptacles 1640, and the plug-in load control device 1642 in response to the ambient light intensity $L_{AMB}$ in the space in which the daylight sensor in mounted. The motorized roller shade 1620 may be operable to control the position of the shade fabric 1622 in response to amount of daylight entering the building through the window as part of the eco-saver preset. In addition, the motorized roller shade 1620 could control the position of the shade fabric 1622 in response to the present time of the year and the present time of the day as part of the eco-saver preset.

According to another embodiment of the present invention, after receiving a demand response preset, the temperature control device 1630 is operable to transmit RF signals 1606 to the control devices of the load control system 1600 in response to the data representative of the energy usage information of the HVAC system 1632 stored in the memory 1698. For example, the controller 1690 of the temperature control device 1630 may be operable to execute an HVAC monitoring procedure similar to the HVAC monitoring procedure 1150 shown in FIG. 15B to control the motorized roller shade 1620 in dependence upon the data representative of the energy usage information of the HVAC system 1632. The controller 1690 is operable to monitor the operation of the HVAC system 1632 for the predetermined time period (e.g., approximately one hour) after the motorized roller shade 1620 moves the shade fabric 1622 in a first direction from an initial position, and to determine if the HVAC system 1632 is consuming more energy than when the shade fabric was in the initial position (i.e., if the heating and cooling system is consuming more energy at the end of the predetermined time period than at the beginning of the predetermined time period). The controller 1690 is then operable to transmit a digital message to the motorized roller shade 1620, such that the motorized roller shade moves the shade fabric 1622 in a second direction opposite the first direction if the HVAC system 1632 is consuming more energy than when the shade fabric was in the initial position.

Specifically, in response to receiving a demand response preset, the motorized roller shade 1620 is operable to open the shade fabric 1622 from the initial position to allow more sunlight to enter the room when the HVAC system 1632 is heating the building, to thus attempt to warm the room using daylight. If the controller 1690 of the temperature control device 1630 then determines that the HVAC system 1632 is not subsequently saving energy, the controller may transmit a digital message including a command to close the shade fabric 1622 (e.g., to the fully-closed position) directly to the motorized roller shade 1620 via the RF transceiver 1695. Similarly, when the HVAC system 1632 is cooling the building, the motorized roller shade 1620 could close the shade fabric 1622 from the initial position to allow less sunlight to enter the room, and open the shade fabric (e.g., to the fully-open position) if the HVAC system is not subsequently saving energy. Alternatively, the controller 1690 of the temperature control device 1630 could simply transmit the data representative of the energy usage information of the HVAC system 1632 to the motorized roller shade 1620, and the motorized roller shade could response appropriately to the data representative of the energy usage information of the HVAC system.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A load control system for a building having a lighting load located in a space of the building, a heating and cooling system, and a window located in the space of the building, the load control system responsive to a demand response command, the load control system comprising:
   a lighting control device for controlling the amount of power delivered to the lighting load, the lighting control device operable to decrease the amount of power delivered to the lighting load in response to the demand response command so as to decrease the power consumption of the lighting load;
   a daylight control device for controlling the amount of natural light to be admitted through the window, the daylight control device operable to decrease the amount of natural light admitted through the window in response to the demand response command so as to decrease the power consumption of the heating and cooling system; and
   a temperature control device for controlling a setpoint temperature of the heating and cooling system to thus control a present temperature in the building, the temperature control device operable to adjust the setpoint temperature of the heating and cooling system in response to the demand response command so as to decrease the power consumption of the heating and cooling system;
   further comprising a controller coupled to the lighting control device, the daylight control device, and the temperature control device via a communication link, the controller operable to receive the demand response command and to transmit at least one digital message to the lighting control device, the daylight control device, and the temperature control device via the communication link in response to receiving the demand response command;
   wherein the lighting control device decreases the amount of power delivered to the lighting load, the daylight control device decreases the amount of natural light admitted through the window, and the temperature control device adjusts the setpoint temperature in the building in response to receiving the at least one digital message from the controller;
   wherein the temperature control device, in response to the at least one digital message, automatically increases the setpoint temperature of the heating and cooling system when the heating and cooling system is presently cooling the building so as to decrease the power consumption of the heating and cooling system, and decreases the setpoint temperature of the heating and cooling system when the heating and cooling system is presently heating the building so as to decrease the power consumption of the heating and cooling system;

further wherein, immediately after the load control system is installed and powered for the first time, the lighting control device is operable to decrease the amount of power delivered to the lighting load by a predetermined percentage in response to the at least one digital message, the daylight control device is operable to move to a fully-closed position whereby the window is covered in response to the at least one digital message, and the temperature control device is operable to increase the setpoint temperature by a predetermined amount in response to the at least one digital message when the heating and cooling system is presently cooling the building, and to decrease the setpoint temperature by a predetermined amount in response to the at least one digital message when the heating and cooling system is presently building.

2. The load control system of claim 1, wherein the daylight control device comprises a motorized window treatment having a window treatment fabric for covering the window, the motorized window treatment operable to move the fabric between a fully-open position in which the window is not covered and a fully-closed position in which the window is covered, the motorized window treatment operable to adjust the position of the fabric in response to the demand response command so as to decrease the power consumption of the heating and cooling system.

3. The load control system of claim 2, further comprising: an occupancy sensor for detecting whether the space is occupied or unoccupied.

4. The load control system of claim 3, wherein, when the space is unoccupied and the heating and cooling system is heating the building, the motorized window treatment moves the fabric to the fully-open position if the window may be receiving direct sunlight, and moves the fabric to the fully-closed position if the window may not be receiving direct sunlight.

5. The load control system of claim 4, wherein the motorized window treatment lowers the fabric to the fully-closed position when the space is unoccupied and the heating and cooling system is cooling the building.

6. The load control system of claim 3, wherein the motorized window treatment moves the fabric according to a predetermined timeclock schedule in order to limit a sunlight penetration depth in the space to a maximum penetration depth when the space is occupied, the heating and cooling system is cooling the building, and the window may not be receiving direct sunlight.

7. The load control system of claim 6, wherein the motorized window treatment moves the fabric to the fully-closed position when the space is occupied, the heating and cooling system is cooling the building, and the window may be receiving direct sunlight.

8. The load control system of claim 3, further comprising: a daylight sensor for measuring an ambient light intensity in the space;
wherein, when the space is occupied, the heating and cooling system is heating the building, and the room may not be receiving direct sunlight, the controller is operable to:

control the motorized window treatment to move the fabric to a position above the fully-closed position in response to the demand response command;

determine if the lighting load is consuming less energy when the fabric of the motorized window treatment is at the position above the fully-closed position than the lighting load would consume if the motorized window treatment was at the fully-closed position; and move the fabric to the fully-closed position if the lighting load is not consuming less energy when the fabric of the motorized window treatment is at the position above the fully-closed position.

9. The load control system of claim 3, wherein, when the space is occupied, the heating and cooling system is heating the building, and the room may be receiving direct sunlight, the motorized window treatment is operable to raise the fabric from an initial position to allow more sunlight to enter the space in response to the demand response command when the heating and cooling system is heating the building, the motorized window treatment operable to lower the fabric if the heating and cooling system is consuming more energy than when the fabric was in the initial position.

10. The load control system of claim 2, wherein, when the window may be receiving direct sunlight, the motorized window treatment lowers the fabric in response to the demand response command when the heating and cooling system is cooling the building, and raises the fabric in response to the demand response command when the heating and cooling system is heating the building.

11. The load control system of claim 2, the motorized window treatment operable to move the fabric to the fully-closed position in response to the demand response command so as to decrease the power consumption of the heating and cooling system.

12. The load control system of claim 2, the motorized window treatment comprises one of a motorized roller shade, a tensioned roller shade system, a motorized drapery, and a motorized roman shade.

13. The load control system of claim 1, wherein the demand response command comprises one of a plurality of demand response levels, the controller responsive to the demand response levels to provide a respective plurality of energy savings levels of the load control system.

14. The load control system of claim 13, wherein each successive demand response level further causes the controller to reduce the total power consumption of the load control system.

15. The load control system of claim 1, wherein the demand response command comprises a planned demand response command indicating an upcoming planned demand response event, and the controller transmits the digital messages to the lighting control device, the daylight control device, and the temperature control device to pre-condition the building prior to the upcoming demand response event.

16. The load control system of claim 15, wherein the controller is operable to decrease the setpoint temperature to pre-condition the building prior to the upcoming planned demand response event when the heating and cooling system is presently cooling the building, and increase the setpoint temperature to pre-condition the building prior to the upcoming planned demand response event when the heating and cooling system is presently heating the building.

17. The load control system of claim 1, wherein the demand response command comprises an immediate demand response command, and the controller transmits the digital messages to the lighting control device, the daylight control device, and the temperature control device immediately after receiving the immediate demand response command.

18. The load control system of claim 1, wherein the communication link comprises a wireless communication link.

19. The load control system of claim 1, wherein the communication link comprises a wired communication link.

20. The load control system of claim 1, wherein the demand response command comprises one of a plurality of energy-savings presets, the lighting control device, the daylight control device, and the temperature control device responsive to the plurality of energy-savings presets to provide a respective plurality of energy savings levels of the load control system.

21. The load control system of claim 20, further comprising:
a button adapted to be actuated by a user for manually selecting one of the plurality of energy-saving presets.

22. The load control system of claim 21, wherein the button is provided on the lighting control device.

23. The load control system of claim 21, wherein the button is provided on the temperature control device.

24. The load control system of claim 21, wherein the button is provided on a keypad coupled to the communication link.

25. The load control system of claim 21, further comprising:
a demand response orchestrating device for receiving the demand response command, the button provided on the demand response orchestrating device for selecting one of the plurality of energy-saving presets.

26. The load control system of claim 20, further comprising:
an occupancy sensor for detecting an occupancy condition in the building;
wherein the lighting control device, the daylight control device, and the temperature control device are adapted to operate according to one of the energy-saving presets in response to the occupancy sensor.

27. The load control system of claim 20, further comprising:
a daylight sensor for measuring an ambient light intensity in the building;
wherein the daylight control device is adapted to adjust the amount of natural light to be admitted through the window in response to the daylight sensor as part of one of the energy-saving presets.

28. The load control system of claim 1, wherein the temperature control device, in response to the demand response command, automatically increases the setpoint temperature of the heating and cooling system during a first portion of a year so as to decrease the power consumption of the heating and cooling system, and decreases the setpoint temperature of the heating and cooling system during a second portion of the year so as to decrease the power consumption of the heating and cooling system.

29. The load control system of claim 28, further comprising:
a controller coupled to the lighting control device, the daylight control device, and the temperature control device via a communication link, the controller operable to receive the demand response command and to transmit digital messages to the lighting control device, the daylight control device, and the temperature control device via the communication link in response to receiving the demand response command;
wherein the lighting control device decreases the amount of power delivered to the lighting load, the daylight control device controls the amount of natural light to be admitted through the window, and the temperature control device adjusts the setpoint temperature in the building in response to receiving the digital messages from the controller.

30. The load control system of claim 29, wherein the controller comprises an astronomical timeclock for determining whether a present time of the year is during the first portion of the year or the second portion of the year.

31. The load control system of claim 29, wherein the controller is coupled to the Internet for determining whether a present time of the year is during the first portion of the year or the second portion of the year.

32. The load control system of claim 1, further comprising:
a controllable switching device for turning an electrical load on and off, the controllable switching device operable to turn off the electrical load in response to the demand response command so as to decrease the power consumption of the load control system.

33. The load control system of claim 32, wherein the electrical load comprises a plug-in load and the controllable switching device comprises a controllable electrical receptacle having an electrical output adapted to have the plug-in load connected thereto, the controllable electrical receptacle operable to turn off the plug-in load in response to the demand response command so as to decrease the power consumption of the load control system.

34. The load control system of claim 32, wherein the electrical load comprises a plug-in load and the controllable switching device comprises a plug-in load control device adapted to be plugged into a standard electrical receptacle, the plug-in load control device having an electrical output adapted to have the plug-in load connected thereto, the plug-in load control device operable to turn off the plug-in load in response to the demand response command so as to decrease the power consumption of the load control system.

35. The load control system of claim 32, wherein the controllable switching device comprises a controllable circuit breaker.

36. A load control system for a building having a lighting load located in a space of the building, a heating and cooling system, and a window located in the space of the building, the load control system responsive to a demand response command, the load control system comprising:
a lighting control device for controlling the amount of power delivered to the lighting load, the lighting control device operable to decrease the amount of power delivered to the lighting load in response to the demand response command so as to decrease the power consumption of the lighting load;
a daylight control device for controlling the amount of natural light to be admitted through the window, the daylight control device operable to decrease the amount of natural light admitted through the window in response to the demand response command so as to decrease the power consumption of the heating and cooling system; and
a temperature control device for controlling a setpoint temperature of the heating and cooling system to thus control a present temperature in the building, the temperature control device operable to adjust the setpoint temperature of the heating and cooling system in response to the demand response command so as to decrease the power consumption of the heating and cooling system;
wherein the temperature control device, in response to the demand response command, automatically increases the setpoint temperature of the heating and cooling system when the heating and cooling system is presently cooling the building so as to decrease the power consumption of the heating and cooling system, and decreases the setpoint temperature of the heating and cooling system when the heating and cooling system is presently heating the building so as to decrease the power consumption of the heating and cooling system;

further comprising:

a controller coupled to the lighting control device, the daylight control device, and the temperature control device via a communication link, the controller operable to receive the demand response command and to transmit at least one digital message to the lighting control device, the daylight control device, and the temperature control device via the communication link in response to receiving the demand response command;

wherein the lighting control device decreases the amount of power delivered to the lighting load, the daylight control device decreases the amount of natural light admitted through the window, and the temperature control device adjusts the setpoint temperature in the building in response to receiving the at least one digital message from the controller;

wherein the daylight control device comprises a motorized window treatment having a window treatment fabric for covering the window, the motorized window treatment operable to move the fabric between a fully-open position in which the window is not covered and a fully-closed position in which the window is covered, the motorized window treatment operable to adjust the position of the fabric in response to the at least one digital message so as to decrease the power consumption of the heating and cooling system;

further wherein, immediately after the load control system is installed and powered for the first time, the lighting control device is operable to decrease the amount of power delivered to the lighting load by approximately 20% in response to the at least one digital message, the motorized window treatment is operable to move the fabric to the fully-closed position in response to the at least one digital message and the temperature control device is operable to increase the setpoint temperature by approximately 2° F. in response to the at least one digital message when the heating and cooling system is presently cooling the building, and to decrease the setpoint temperature by approximately 2° F. in response to the at least one digital message when the heating and cooling system is presently heating the building.

37. A load control system for a building having a lighting load, a window, and a heating and cooling system, the load control system comprising:

a lighting control device for controlling the amount of power delivered to the lighting load;

a motorized window treatment comprising a window treatment fabric for covering the window, the motorized window treatment operable to move the fabric between a fully-open position in which the window is not covered and a fully-closed position in which the window is covered;

a temperature control device for controlling a setpoint temperature of the heating and cooling system to thus control a present temperature in the building; and a controller coupled to the lighting control device, the motorized window treatment, and the temperature control device via a communication link, the controller operable to receive a demand response command and to transmit at least one digital message to the lighting control device, the motorized window treatment, and the temperature control device via the communication link in response to receiving the demand response command;

wherein the lighting control device is operable to automatically decrease the amount of power delivered to the lighting load so as to decrease the power consumption of the lighting load in response to receiving the at least one digital message from the controller, the motorized window treatment is operable to automatically move the fabric to the fully-closed position so as to decrease the power consumption of the heating and cooling system in response to receiving the at least one digital message from the controller, and the temperature control device is operable to automatically increase the setpoint temperature of the heating and cooling system during a first portion of the year and decrease the setpoint temperature of the heating and cooling system during a second portion of the year so as to decrease the power consumption of the heating and cooling system in response to receiving the at least one digital message from the controller;

further wherein, immediately after the load control system is installed and powered for the first time, the lighting control device is operable to decrease the amount of power delivered to the lighting load by a predetermined percentage in response to the at least one digital message, the motorized window treatment is operable to move the fabric to the fully-closed position in response to the at least one digital message, and the temperature control device is operable to increase the setpoint temperature by a predetermined amount in response to the at least one digital message when the heating and cooling system is presently cooling the building, and to decrease the setpoint temperature by the predetermined amount in response to the at least one digital message when the heating and cooling system is presently heating the building.

38. A method of controlling the amount of power delivered to a lighting load located in a space of a building, the amount of natural light admitted through a window located in the space, and a setpoint temperature of a heating and cooling system, the method comprising the steps of:

providing a load control system that receives a demand response command and controls a lighting control device that controls the lighting load, a motorized window treatment for the window and a temperature control device to get the set-point temperature of the heating and cooling system;

receiving the demand response command at the load control system;

adjusting the amount of power delivered to the lighting load with the lighting control device so as to decrease the power consumption of the lighting load in response to receiving the demand response command;

decreasing the amount of natural light admitted through the window with the motorized window treatment so as to decrease the power consumption of the heating and cooling system in response to receiving the demand response command; and adjusting the setpoint temperature of the heating and cooling system with the temperature control device so as to decrease the power consumption of the heating and cooling system in response to receiving the demand response command;

further comprising installing and powering the load control system, and immediately after being installed and powered for the first time, operating the load control system so as to control the lighting control device to decrease the amount of power delivered to the lighting load by a predetermined percentage in response to the demand response command, control the motorized window treatment to move the fabric to the fully-closed position in response to the demand response command, and control the temperature control device to increase the setpoint temperature by a predetermined amount in response to the demand response command when the heating and cooling system is presently cooling the building, and to decrease the setpoint temperature by a predetermined amount in response to the demand response command when the heating and cooling system is presently heating the building.

39. The method of claim 38, further comprising:
detecting whether the space is occupied or unoccupied; and
determining if the window may be receiving direct sunlight;
wherein decreasing the amount of natural light admitted through the window further comprises decreasing the amount of natural light admitted through the window in response to whether the space is occupied or unoccupied, or whether the window may or may not be receiving direct sunlight.

40. The method of claim 39, further comprising:
increasing the amount of natural light admitted through the window when the space is unoccupied, the heating and cooling system is heating the building, and the window may be receiving direct sunlight; and
decreasing the amount of natural light admitted through the window when the space is unoccupied, the heating and cooling system is heating the building, and the window may not be receiving direct sunlight.

41. The method of claim 40, further comprising:
decreasing the amount of natural light admitted through the window when the space is unoccupied and the heating and cooling system is cooling the building.

42. The method of claim 39, further comprising:
controlling the amount of natural light admitted through the window according to a predetermined timeclock schedule in order to limit a sunlight penetration depth in the space to a maximum penetration depth when the space is occupied, the heating and cooling system is cooling the building, and the window may not be receiving direct sunlight.

43. The method of claim 42, wherein decreasing the amount of natural light admitted through the window when the space is occupied, the heating and cooling system is cooling the building, and the window may be receiving direct sunlight.

44. The method of claim 39, further comprising:
measuring an ambient light intensity in the space;
allowing some amount of natural light admitted through the window in response to the demand response command when the space is occupied, the heating and cooling system is heating the building, and the room may not be receiving direct sunlight;
determining if the lighting load is consuming less energy when some amount of natural light is allowed to be admitted through the window than the lighting load would consume if no natural light was admitted through the window; and
allowing no natural light admitted through the window if the lighting load is not consuming less energy when some amount of natural light is allowed to be admitted through the window.

45. The method of claim 39, further comprising:
increasing the amount of natural light admitted through the window in response to the demand response command when the space is occupied, the heating and cooling system is heating the building, and the window may be receiving direct sunlight; and
decreasing the amount of natural light admitted through the window if the heating and cooling system is consuming more energy after the step of increasing the amount of natural light admitted through the window in response to the demand response command.

46. The method of claim 38, wherein the demand response command comprises a planned demand response command indicating an upcoming planned demand response event, the method further comprising the steps of:
decreasing the setpoint temperature to pre-condition the building prior to the upcoming planned demand response event when the heating and cooling system is presently cooling the building; and
increasing the setpoint temperature to pre-condition the building prior to the upcoming planned demand response event when the heating and cooling system is presently heating the building.

47. The method of claim 46, wherein the setpoint temperature is increased or decreased to pre-condition the building immediately after receiving the planned demand response command.

48. The method of claim 46, wherein the setpoint temperature is increased or decreased to pre-condition the building at a pre-condition time after the time when the planned demand response command.

49. The method of claim 46, further comprising:
adjusting the amount of power delivered to the lighting load, decreasing the amount of natural light admitted through the window, and adjusting the setpoint temperature of the heating and cooling system so as to decrease the power consumption of the load control system at a start time after the time at which the planned demand response command is received by the controller.

50. The method of claim 38, further comprising:
increasing the amount of natural light admitted through the window when the heating and cooling system is heating the building, and the window may be receiving direct sunlight; and
decreasing the amount of natural light admitted through the window when the heating and cooling system is heating the building, and the window may not be receiving direct sunlight.

51. The method of claim 38, further comprising the steps of:
providing a motorized window treatment having a window treatment fabric adapted to hang in front of the window, so as to control the amount of natural light to be admitted through the window; and
moving the fabric of the motorized window treatment to a fully-closed position so as to decrease the amount of natural light to be admitted through the window and to decrease the power consumption of the heating and cooling system in response to receiving the demand response command.

52. The method of claim 38, wherein adjusting the setpoint temperature of the heating and cooling system further comprises automatically increasing the setpoint temperature of the heating and cooling system when the heating and cooling system is presently cooling the building so as to decrease the power consumption of the heating and cooling system, and automatically decreasing the setpoint temperature of the heating and cooling system when the heating and cooling system is presently heating the building so as to decrease the power consumption of the heating and cooling system.

53. A load control system for a building having a lighting load located in a space of the building, a heating and cooling system, and a window located in the space of the building, the load control system responsive to a demand response command, the load control system comprising:
- a lighting control device for controlling the amount of power delivered to the lighting load;
- a motorized window treatment comprising a window treatment fabric for covering the window;
- a temperature control device for controlling a setpoint temperature of the heating and cooling system to thus control a present temperature in the building; and
- a controller coupled to the lighting control device, the motorized window treatment, and the temperature control device via a communication link, the controller operable to receive the demand response command and to transmit at least one digital message to the lighting control device, the motorized window treatment, and the temperature control device via the communication link in response to receiving the demand response command;

wherein, immediately after the load control system is installed and powered for the first time, the lighting control device is operable to decrease the amount of power delivered to the lighting load by a predetermined percentage in response to the at least one digital message, the motorized window treatment is operable to move the fabric to the fully-closed position in response to at least one digital message, and the temperature control device is operable to increase the setpoint temperature by a predetermined amount in response to the at least one digital message when the heating and cooling system is presently cooling the building, and to decrease the setpoint temperature by the predetermined amount in response to the at least one digital message when the heating and cooling system is presently heating the building;

further wherein the demand response command comprises a planned demand response command indicating an upcoming planned demand response event, the controller transmitting the at least one second digital message to the lighting control device, the daylight control device, and the temperature control device to pre-condition the building prior to the upcoming demand response event in response to the planned demand response command.

54. The load control system of claim 53, wherein the controller is operable to decrease the setpoint temperature to pre-condition the building prior to the upcoming planned demand response event when the heating and cooling system is presently cooling the building, and increase the setpoint temperature to pre-condition the building prior to the upcoming planned demand response event when the heating and cooling system is presently heating the building.

55. The load control system of claim 54, wherein the controller adjusts the setpoint temperature to pre-condition the building immediately after receiving the planned demand response command.

56. The load control system of claim 54, wherein the controller adjusts the setpoint temperature to pre-condition the building at a pre-condition time after the time when the planned demand response command.

57. The load control system of claim 54, wherein the planned demand response event begins at a start time after the time at which the planned demand response command is received by the controller, the controller operable to transmit digital messages to the lighting control device, the daylight control device, and the temperature control device to reduce the total power consumption of the load control system at the start time after the time at which the planned demand response command is received by the controller.

* * * * *